(12) United States Patent
Komatsu et al.

(10) Patent No.: US 7,917,672 B2
(45) Date of Patent: Mar. 29, 2011

(54) PATH MAINTENANCE MECHANISM

(75) Inventors: Yuki Komatsu, Yokohama (JP); Makoto Aoki, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 135 days.

(21) Appl. No.: 12/415,346

(22) Filed: Mar. 31, 2009

(65) Prior Publication Data

US 2009/0204733 A1 Aug. 13, 2009

Related U.S. Application Data

(63) Continuation of application No. 11/483,669, filed on Jul. 11, 2006, now abandoned.

(30) Foreign Application Priority Data

May 18, 2006 (JP) .................................. 2006-139092

(51) Int. Cl.
G06F 13/14 (2006.01)
(52) U.S. Cl. .......................................... 710/38; 710/15
(58) Field of Classification Search ..................... 710/38
See application file for complete search history.

(56) References Cited

U.S. PATENT DOCUMENTS

| | | | | |
|---|---|---|---|---|
| 5,297,262 A | * | 3/1994 | Cox et al. ........................ | 710/36 |
| 5,640,603 A | * | 6/1997 | Meritt et al. .................... | 710/38 |
| 5,925,111 A | * | 7/1999 | Nagasawa ....................... | 710/17 |
| 6,145,028 A | | 11/2000 | Shank et al. | |
| 6,629,189 B1 | * | 9/2003 | Sandstrom et al. .............. | 711/4 |
| 6,757,753 B1 | * | 6/2004 | DeKoning et al. .............. | 710/38 |
| 6,898,183 B1 | * | 5/2005 | Garakani ....................... | 370/238 |
| 6,986,015 B2 | * | 1/2006 | Testardi ........................ | 711/202 |
| 7,032,041 B2 | | 4/2006 | Sahara et al. | |
| 7,093,155 B2 | | 8/2006 | Aoki | |
| 7,099,904 B2 | * | 8/2006 | Nakatsuka .................... | 707/781 |
| 7,111,088 B2 | * | 9/2006 | Kawasaki et al. .............. | 710/38 |
| 7,243,160 B2 | | 7/2007 | Brahmaroutu | |
| 7,283,466 B1 | * | 10/2007 | Chen et al. .................... | 370/225 |
| 7,290,168 B1 | | 10/2007 | DeKoning | |
| 7,350,000 B2 | * | 3/2008 | Anderson et al. .............. | 710/38 |
| 7,568,052 B1 | * | 7/2009 | Cwiakala et al. ................ | 710/8 |

(Continued)

FOREIGN PATENT DOCUMENTS

JP 2005-010956 1/2005

*Primary Examiner* — Cheng-Yuan Tseng
(74) *Attorney, Agent, or Firm* — Brundidge & Stanger, P.C.

(57) ABSTRACT

In the computer system including a host computer and a storage system, the storage system includes a physical disk and a disk controller, and provides a storage area of the physical disk as at least one logical unit. The processor obtains, at a first time point and a second time point different from the first time point, a relation between a logical path and a component through which the logical path passes, stores, as logical path connection information, the relations obtained at the first time point and the second time point, refers to the logical path connection information to compare the logical paths existing at the first time point and the logical paths existing at the second time point with each other, and specifies the logical path which does not exist at the second time point among the logical paths existing at the first time point. A1

1 Claim, 32 Drawing Sheets

PATH NUMBER INFORMATION DISPLAY PROCESS

U.S. PATENT DOCUMENTS

| | | |
|---|---|---|
| 7,617,320 B2 * | 11/2009 | Alon et al. ................ 709/229 |
| 7,685,361 B2 * | 3/2010 | Nashimoto et al. ........... 711/114 |
| 2002/0001307 A1 | 1/2002 | Nguyen et al. |
| 2005/0097243 A1 | 5/2005 | Yamashita et al. |
| 2005/0120259 A1 | 6/2005 | Aoki |
| 2005/0203910 A1 | 9/2005 | Taguchi et al. |
| 2006/0020623 A1 | 1/2006 | Terai et al. |
| 2006/0143332 A1 | 6/2006 | Yagi et al. |
| 2007/0055737 A1 | 3/2007 | Yamashita et al. |
| 2007/0180188 A1 | 8/2007 | Fujibayashi et al. |

* cited by examiner

| CONFIGURATION INFORMATION CHANGE NUMBER | PATH ID | HBA NAME | CHA NAME | CHA PORT NAME | LUN | DISK NAME | IDENTICAL PATH ID |
|---|---|---|---|---|---|---|---|
| 1 | PATH 1 | HBA1 | CHA1 | CHA PORT 1 | LU1 | dk001 | PATH 4 |
| ⋮ | ⋮ | ⋮ | ⋮ | ⋮ | ⋮ | ⋮ | ⋮ |

121

HOST-SIDE PATH CONNECTION INFORMATION TABLE

| 1221 | 1222 | 1223 |
|---|---|---|
| CONFIGURATION INFORMATION CHANGE NUMBER | COMPARISON SOURCE | COMPARISON TARGET |
| 1 | O | — |
| 2 | — | O |
| ⋮ | ⋮ | ⋮ |

122
HOST-SIDE CONFIGURATION COMPARISON TABLE

FIG. 4

| 1231 | 1232 |
|---|---|
| CONFIGURATION INFORMATION CHANGE NUMBER | DATE/TIME |
| 1 | 2006/02/01 13:22:43 |
| 2 | 2006/02/21 16:12:03 |
| ⋮ | ⋮ |

123
HOST-SIDE CONFIGURATION CHANGE HISTORY TABLE

FIG. 5

| 1241 | 1242 |
|---|---|
| PATH ID | STATUS |
| PATH 1 | ONLINE |
| ⋮ | ⋮ |

124
HOST-SIDE PATH MANAGEMENT TABLE

FIG. 6

SAN CONFIGURATION ACQUISITION PROCESS
AT START OF OPERATION

SAN CONFIGURATION CHANGE PROCESS

DISCOVERY EXECUTION PROCESS

COMPARISON SUBJECT SELECTION PROCESS

PATH NUMBER INFORMATION DISPLAY PROCESS

PATH LIST INFORMATION DISPLAY PROCESS

| CONFIGURATION INFORMATION CHANGE NUMBER | HOST NAME | PATH ID | HBA NAME | CHA NAME | CHA PORT NAME | LUN | DISK NAME | IDENTICAL PATH ID |
|---|---|---|---|---|---|---|---|---|
| 1 | HOST 1 | PATH 1 | HBA1 | CHA1 | CHA PORT 1 | LU1 | dk001 | PATH 4 |
| ⋮ | ⋮ | ⋮ | ⋮ | ⋮ | ⋮ | ⋮ | ⋮ | ⋮ |

MANAGEMENT SERVER-SIDE PATH CONNECTION INFORMATION TABLE

| HOST NAME (3224) | CONFIGURATION INFORMATION CHANGE NUMBER (3221) | COMPARISON SOURCE (3222) | COMPARISON TARGET (3223) |
|---|---|---|---|
| HOST 1 | 1 | O | — |
| HOST 1 | 2 | — | O |
| ⋮ | ⋮ | ⋮ | ⋮ |

322

MANAGEMENT SERVER-SIDE CONFIGURATION COMPARISON TABLE

FIG. 21

| CONFIGURATION INFORMATION CHANGE NUMBER (3231) | DATE/TIME (3232) |
|---|---|
| 1 | 2006/02/01 13:22:43 |
| 2 | 2006/02/21 16:12:03 |
| ⋮ | ⋮ |

323

MANAGEMENT SERVER-SIDE CONFIGURATION CHANGE HISTORY TABLE

FIG. 22

| HOST NAME (3243) | PATH ID (3241) | STATUS (3242) |
|---|---|---|
| HOST 1 | PATH 1 | ONLINE |
| ⋮ | ⋮ | ⋮ |

324

MANAGEMENT SERVER-SIDE PATH MANAGEMENT TABLE

FIG. 23

COMPARISON SUBJECT SELECTION PROCESS

PATH LIST INFORMATION DISPLAY PROCESS

PATH MAINTENANCE MECHANISM

This is a continuation of U.S. Ser. No. 11/483,669, filed Jul. 11, 2006, now abandoned, the contents of which are hereby incorporated by reference into this application.

CLAIM OF PRIORITY

The present application claims priority from Japanese patent application P2006-139092 filed on May 18, 2006, the content of which is hereby incorporated by reference into this application.

BACKGROUND

This invention relates to a computer system including a host computer and a storage system, and more particularly, to a technique of detecting a status of a logical path.

A multi-path computer system in a storage area network (SAN) environment is known. The multi-path computer system includes a storage system and a host computer. The storage system and the host computer are connected over the SAN including a fibre channel switch. Details of the multi-path computer system are disclosed in JP 2005-10956 A.

In the multi-path computer system, a logical unit provided by the storage system and the host computer are connected through a plurality of logical paths. The logical path is a path that is made redundant in accordance with the combination of physical paths in a communication route between the host computer and the storage system. The physical path is an I/O path which connects the host computer and the storage system to each other. For example, the I/O path is a SCSI cable or a Fibre cable.

In the multi-path computer system, when a failure occurs in hardware such as a fibre channel switch, an administrator replaces the hardware in which the failure has occurred with another one. As a result, a SAN configuration is changed.

In the prior art, when the SAN configuration is changed, the administrator activates the logical path after confirming continuity of the logical path.

SUMMARY

In the prior art, the administrator activates the logical path after confirming merely the continuity of the logical path. Therefore, the administrator is required to verify whether or not the logical path is properly maintained by referring to information regarding the logical path after the activation of the logical path. Moreover, when the fibre channel switch is erroneously set, the administrator is required to modify the SAN configuration after stopping the I/O.

In the multi-path computer including a large number of paths, a work of verifying whether or not the logical path is properly maintained imposes a great burden on the administrator. Moreover, the work of correctly modifying the SAN configuration also imposes a great burden on the administrator.

This invention is made in view of the above-described problem, and has an object to provide a computer system for detecting a difference between paths existing at a first time point and paths existing at a second time point.

According to an exemplary embodiment of this invention, there is provided a computer system, comprising: at least one host computer including a processor, a memory, and an interface; and at least one storage system connected to the host computer, wherein the storage system comprises a physical disk which stores data requested to be written by the host computer and a disk controller which controls the physical disk, and provides the host computer with a storage area of the physical disk as at least one logical unit, wherein the processor obtains, at a first time point and a second time point different from the first time point, a relation between a logical path serving as an access route from the host computer to the logical unit and a component through which the logical path passes, wherein the processor stores, as logical path connection information, the relations obtained at the first time point and the second time point, wherein the processor refers to the logical path connection information to compare the logical paths existing at the first time point and the logical paths existing at the second time point with each other, and wherein the processor specifies the logical path which does not exist at the second time point among the logical paths existing at the first time point.

According to the representative embodiment of this invention, the difference between the paths existing at the first time point and the paths existing at the second time point can be detected.

BRIEF DESCRIPTION OF THE DRAWINGS

The present invention can be appreciated by the description which follows in conjunction with the following figures, wherein:

FIG. 4 is a schematic view of the host-side configuration comparison table stored in the host computer according to the first embodiment of this invention;

FIG. 5 is a schematic view of the host-side configuration change history table stored in the host computer according to the first embodiment of this invention;

FIG. 6 is a schematic view of the host-side path management table stored in the host computer according to the first embodiment of this invention;

FIG. 21 is a schematic view of the management server-side configuration comparison table stored in the management server according to the second embodiment of this invention;

FIG. 22 is a schematic view of the management server-side configuration change history table stored in the management server according to the second embodiment of this invention;

FIG. 23 is a schematic view of the management server-side path management table stored in the management server according to the second embodiment of this invention;

DETAILED DESCRIPTION OF THE PREFERRED EMBODIMENTS

Hereinafter, embodiments of this invention will be described with reference to the accompanying drawings.

First Embodiment

Figure 1:
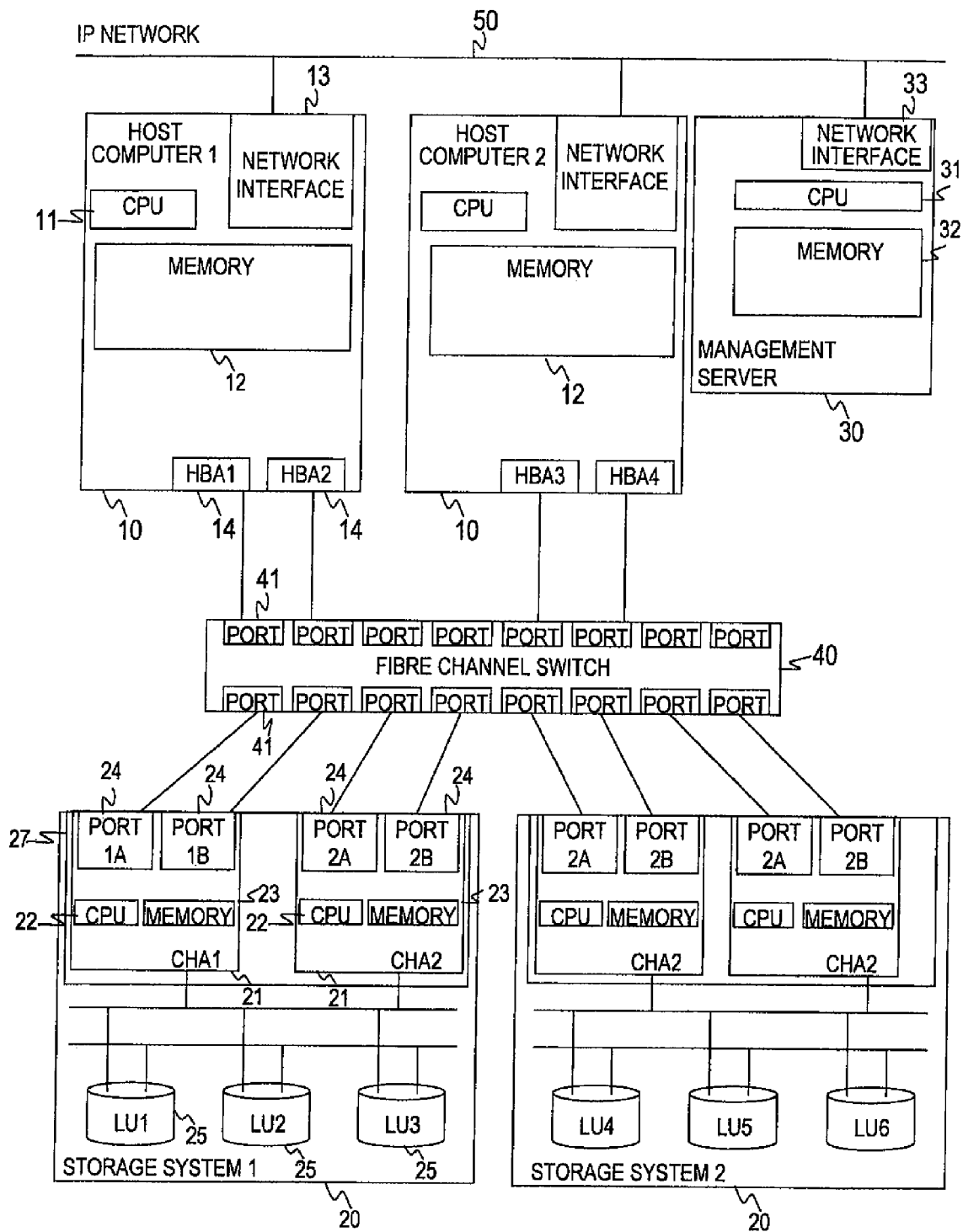
FIG. 1 is a block diagram of a configuration of a computer system according to a first embodiment of this invention.

FIG. 1 is a block diagram of a configuration of a computer system according to a first embodiment of this invention.

The computer system includes host computers 10, storage systems 20, a management server 30, and a fibre channel switch 40.

The host computer 10 and the storage system 20 are connected to each other over a SAN. The SAN is composed of at least one fibre channel switch 40. The fibre channel switch 40 controls the communication between the host computers 10 and the storage systems 20. The fibre channel switch 40 includes a plurality of ports 41. Each of the ports 41 is connected to an HBA 14 provided for the host computer 10 or a CHA port 24 provided for the storage system 20.

In this embodiment, a logical unit (LU) 25 provided by the storage system 20 and the host computer 10 are connected through a plurality of paths. The path is an access path from the host computer 10 to the LU 25. To be specific, the path is a logical path that is made redundant in accordance with the combination of physical paths in a communication route between the host computer 10 and the storage system 20.

The host computer 10 and the management server 30 are connected to each other over an IP network 50.

Although two host computers 10 are illustrated, the computer system may include any number of host computers 10. In the same way, although two storage systems 20 are illustrated, the computer system may include any number of storage systems 20.

The storage system 20 includes a disk controller 27 and a physical disk. The storage system 20 may include a flash memory in place of the physical disk.

The disk controller 27 reads and writes data from/to the physical disk. The disk controller 27 provides a storage area of the physical disk as the logical unit (LU) 25 to the host computer 10.

The disk controller 27 includes at least one channel adapter (CHA) 21. Although one disk controller 27 includes two CHAs 21 in this explanatory view, the disk controller 27 may include any number of CHAs 21.

The CHA 21 controls data transfer with the host computer 10. The CHA 21 includes a CPU 22, a memory 23, and CHA ports 24. The CPU 22 executes programs stored in the memory 23 to perform various processes. The memory 23 stores the programs executed by the CPU 22, information required by the CPU 22, and the like.

The CHA port 24 is an interface connected to the SAN. Although one CHA 21 includes two CHA ports 24 in this explanatory view, the CHA 21 may include any number of CHA ports 24.

The host computer 10 reads and writes data to/from the storage system 20. The host computer 10 includes a CPU 11, a memory 12, a network interface 13 and host bus adapters (HBAs) 14. Although one host computer 10 includes two HBAs 14 in the exemplary view, the host computer 10 may include any number of HBAs 14.

The network interface 13 is an interface connected to the IP network 50. The HBA 14 is an interface connected to the SAN.

The CPU 11 executes programs stored in the memory 12 to perform various processes. The memory 12 stores the programs executed by the CPU 11, information required by the CPU 11, and the like. The details of the programs and the information stored in the memory 12 will be described with reference to FIG. 2.

The management server 30 includes a CPU 31, a memory 32, and a network interface 33. The network interface 33 is an interface connected to the IP network 50.

The CPU 31 executes programs stored in the memory 32 to perform various processes. The memory 32 stores the programs executed by the CPU 31, information required by the CPU 31 and the like.

Figures 2, 3:
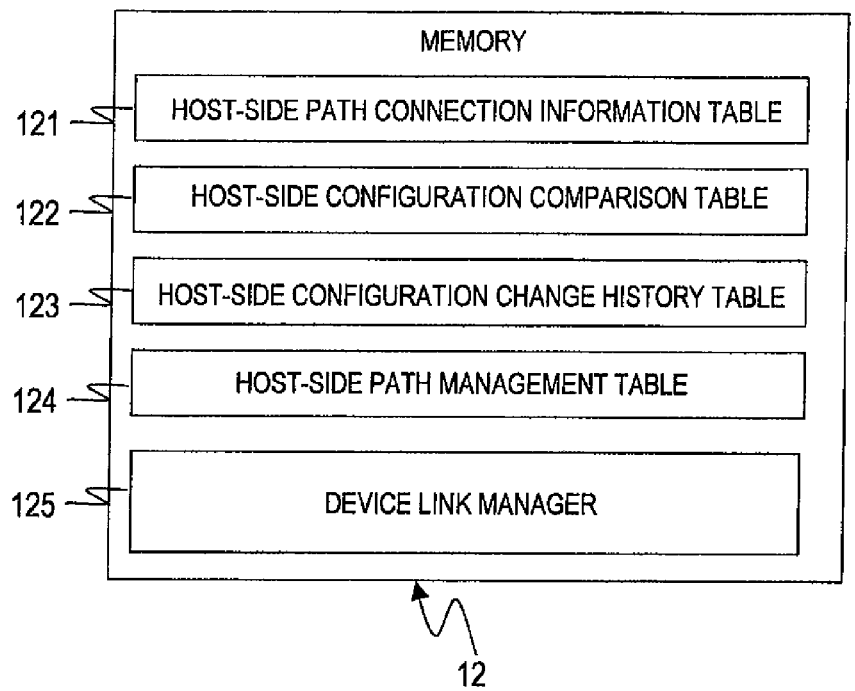
FIG. 2 is a block diagram of the memory included in the host computer according to the first embodiment of this invention.
FIG. 3 is a schematic view of the host-side path connection information table stored in the host computer according to the first embodiment of this invention.

FIG. 2 is a block diagram of the memory 12 included in the host computer 10 according to the first embodiment of this invention.

The memory 12 included in the host computer 10 includes a host-side path connection information table 121, a host-side configuration comparison table 122, a host-side configuration change history table 123, a host-side path management table 124, and a device link manager 125.

The host-side path connection information table 121 manages a component through which a path connected to the host computer 10 passes. The component includes at least one of the HBAs 14 included in the host computer 10, the CHAs port 24 included in the storage system 20, and the LUs 25 provided by the storage system 20. The details of the host-side path connection information table 121 will be described with reference to FIG. 3.

The host-side configuration comparison table 122 indicates two time points at which the SAN configuration is compared. The details of the host-side configuration comparison table 122 will be described with reference to FIG. 4.

The host-side configuration change history table 123 manages the date and time when the SAN configuration is changed. The details of the host-side configuration change history table 123 will be described with reference to FIG. 5.

The host-side path management table 124 manages the current status of the path connected to the host computer 10. The details of the host-side path management table 124 will be described with reference to FIG. 6.

The device link manager 125 is a program for managing the path. For example, the device link manager 125 provides redundancy to a physical path which connects the host computer 10 and the storage system 20 to each other, thereby providing the path.

The device link manager 125 also has a load balance function. To be specific, the device link manager 125 distributes I/O requests to different paths to balance a load on each of the paths.

For example, after transmitting a predetermined number of I/O requests by using one path, the device link manager 125 selects a next path. The device link manager 125 then uses the selected next path to transmit the I/O requests. Alternatively, the device link manager 125 may transmit the I/O requests to contiguous blocks by using the same path. The device link manager 125 refers to the host-side path management table 124 to select the path to be used for transmission of the I/O requests.

When the device link manager 125 detects a failure occurring in the path, the path whose failure has been detected is blocked (placed offline). As a result, the device link manager 125 does not transmit the I/O request by using the path whose failure has been detected. Therefore, the device link manager 125 uses an unblocked path to transmit the I/O request. The status of the path that is not blocked is referred to as online.

The device link manager 125 executes a path failure detection process (path health check).

To be specific, the device link manager 125 uses a path whose status is desired to be checked to transmit an INQUIRY SCSI command as a failure detection signal (continuity verification signal) to the storage system 20. Then, the device link manager 125 judges the status of the path based on whether or not the failure detection signal has been normally transmitted. To be specific, in the case where the device link manager 125 has normally transmitted the failure detection signal, the device link manager 125 judges that the path is normal. On the other hand, in the case where the device link manager 125 has not normally transmitted the failure detection signal, the device link manager 125 judges that a failure occurs in the path.

FIG. 3 is a schematic view of the host-side path connection information table 121 stored in the host computer 10 according to the first embodiment of this invention.

The host-side path connection information table 121 includes a configuration information change number 1211, a path ID 1212, an HBA name 1213, a CHA name 1214, a CHA port name 1215, a LUN 1216, a disk name 1217 and an identical path ID 1218.

The configuration information change number 1211 is a unique identifier of the time when the change of the SAN configuration is completed. In this embodiment, the host computer 10 sets the configuration information change number 1211 at the start of operation of the computer system to "1". Thereafter, each time the SAN configuration is changed, the host computer 10 increases the configuration information change number 1211. The configuration information change number 1211 may be a unique identifier of an arbitrary time other than the time when the change of the SAN configuration is completed.

The path ID 1212 is a unique identifier of the path existing at the time identified by the configuration information change number 1211 in the record. The path connects the LU 25 provided by the storage system 20 and the HBA 14 included in the host computer 10 to each other.

The HBA name 1213 is a unique identifier of the HBA 14 through which the path identified by the path ID 1212 in the record passes.

The CHA name 1214 is a unique identifier of the CHA 21 through which the path identifier by the path ID 1212 in the record passes. The CHA port name 1215 is a unique identifier of the CHA port 24 through which the path identified by the path ID 1212 in the record passes. The CHA port 24 identified by the CHA port name 1214 is included in the CHA 21 identified by the CHA name 1214 in the record.

The LUN 1216 is a unique identifier of the LU 25 through which the path identified by the path ID 1212 in the record passes. The disk name 1217 is a unique identifier of the physical disk constituting the LU 25 identified by the LUN 1216 in the record. When the LU 25 has a RAID configuration, a plurality of identifiers for physical disks are stored in the disk name 1217.

The identical path ID 1218 is a unique identifier of the same path as the path identified by the path ID 1212 in the record among the paths exiting at the time compared with the time identified by the configuration information change number 1211 in the record. The path is specified by the combination of the HBA 14, the CHA port 24 and the LU 25 through which the path passes. Therefore, when the HBA 14, the CHA port 24 and the LU 25 through which a first path passes and the HBA 14, the CHA port 24 and the LU 25 through which a second path passes are all the same, the host computer 10 identifies the first path and the second path as the same path.

FIG. 4 is a schematic view of the host-side configuration comparison table 122 stored in the host computer 10 according to the first embodiment of this invention.

The host-side configuration comparison table 122 includes a configuration information change number 1221, a comparison source 1222 and a comparison target 1223.

The configuration information change number 1221 is a unique identifier of the time when the change of the SAN configuration is completed. The configuration information change number 1221 may be a unique identifier of an arbitrary time other than the time when a change of the SAN configuration is completed.

The comparison source 1222 indicates whether or not the time identified by the configuration information change number 1221 in the record is a comparison source. To be specific, when the time identified by the configuration information change number 1221 in the record is a comparison source, the sign "O" is stored in the comparison source 1222.

The comparison target 1223 indicates whether or not the time identified by the configuration information change number 1221 in the record is a comparison target. To be specific, when the time identified by the configuration information change number 1221 in the record is a comparison target, the sign "O" is stored in the comparison source 1223.

In this embodiment, the host computer 10 sets the time selected by the host administrator earlier than the other of two time points at which the SAN configuration is compared as the comparison source. On the other hand, the host computer 10 sets the time selected by the host administrator later than the other of the two time points at which the SAN configuration is compared as the comparison target.

FIG. 5 is a schematic view of the host-side configuration change history table 123 stored in the host computer 10 according to the first embodiment of this invention.

The host-side configuration change history table 123 includes a configuration information change number 1231 and a date/time 1232.

The configuration information change number 1231 is a unique identifier of the time when a change of the SAN configuration is completed. The configuration information change number 1231 may be a unique identifier of arbitrary time other than the time when a change of the SAN configuration is completed.

The date/time 1232 is a date and a time identified by the configuration information change number 1231 of the record.

FIG. 6 is a schematic view of the host-side path management table 124 stored in the host computer 10 according to the first embodiment of this invention.

The host-side path management table 124 includes a path ID 1241 and a status 1242.

The path ID 1241 is a unique identifier of a path currently existing in the computer system.

The status 1242 indicates whether or not the path identified by the path ID 1241 is blocked. When the path identified by the path ID 1241 in the record is blocked, "offline" is stored in the status 1242. On the other hand, when the path identified by the path ID 1241 in the record is not blocked, "online" is stored in the status 1242

Hereinafter, a process of the computer system according to the first embodiment of this invention will be described.

Figure 7:
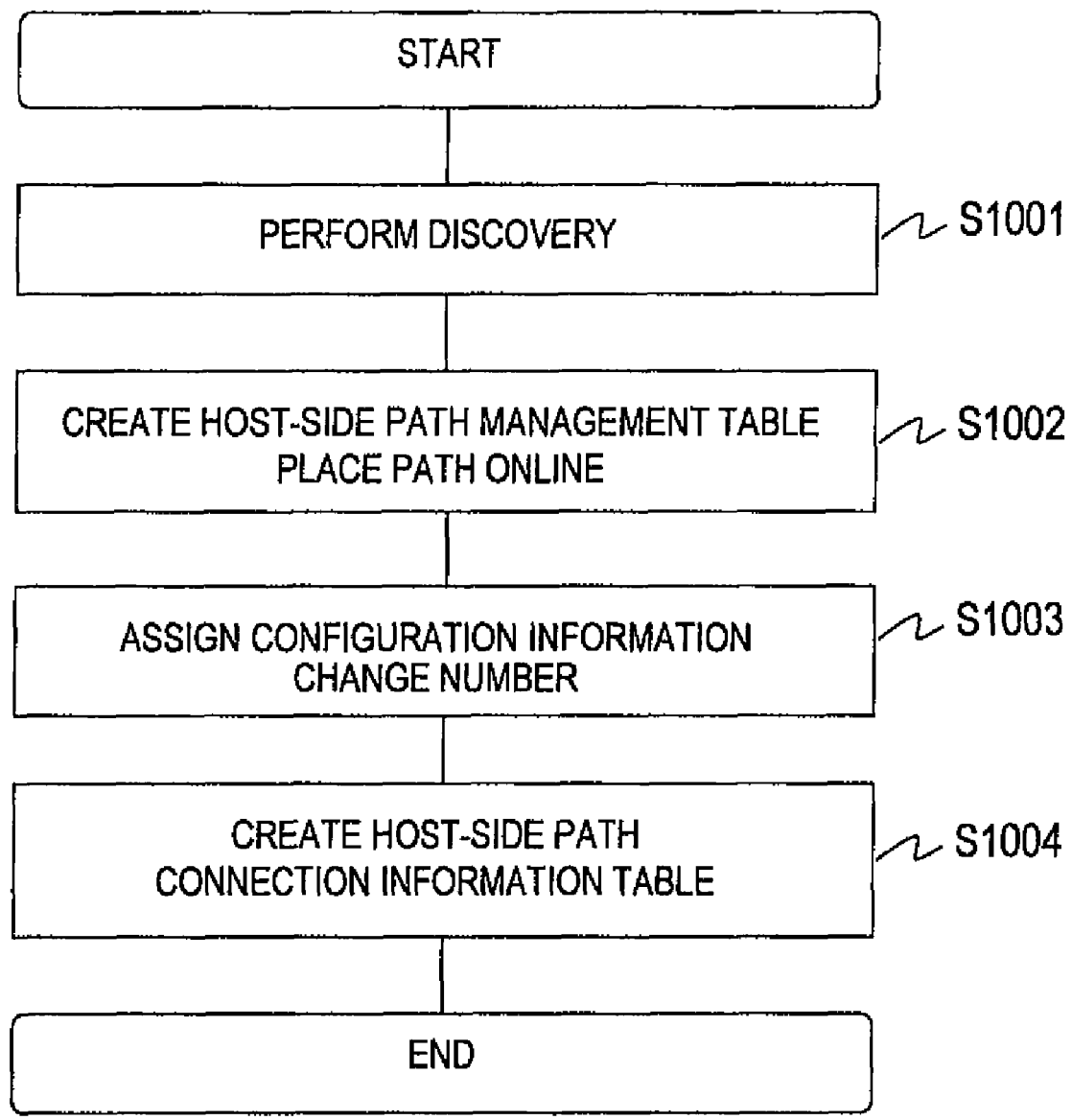
FIG. 7 is a flowchart of a SAN configuration acquisition process at the start of the operation, which is executed by the host computer according to the first embodiment of this invention.

FIG. 7 is a flowchart of a SAN configuration acquisition process at the start of the operation, which is executed by the host computer 10 according to the first embodiment of this invention.

Upon start of the operation of the computer system according to this embodiment, the host computer 10 performs discovery of the storage system 20 (S1001).

To be specific, the host computer 10 uses each of the HBAs 14 included in the host computer 10 to transmit a discovery request. Then, the host computer 10 receives the result of discovery from the storage system 20. The result of discovery contains an identifier of a path passing through the HBA 14 used for transmitting the discovery request, an identifier of the CHA 21 through which the path passes, an identifier of the CHA port 24 through which the path passes, an identifier of the LU 25 through which the path passes, an identifier of the physical disk constituting the LU 25, and the like.

Next, the host computer 10 creates the host-side path management table 124 based on the received result of discovery. Further, the host computer 10 places all the paths online (S1002).

To be specific, the host computer 10 stores the identifier of the path contained in the result of discovery in the path ID 1241 of the host-side path management table 124. Next, the host computer 10 stores "online" as the status 1242 in each of all the records included in the host-side path management table 124. As a result, the host computer 10 places all the paths online.

Next, the host computer 10 assigns "1" to the current date/time as the configuration information change number (S1003). To be specific, the host computer 10 assigns "1" to the time of the start of operation of the computer system as the configuration information change number.

Next, the host computer 10 creates the host-side path connection information table 121 (S1004).

To be specific, the host computer 10 stores "1" corresponding to the configuration information change number in the configuration information change number 1211 of the host-side path connection information table 121. Next, the host computer 10 stores the identifier of the path contained in the received result of discovery in the path ID 1212 of the host-side path connection information table 121.

Next, the host computer 10 stores an identifier of the HBA 14 used for transmitting the discovery request in the HBA name 1213 of the host-side path connection information table 121. Next, the host computer 10 stores an identifier of the CHA 21 contained in the received result of discovery in the CHA name 1214 of the host-side path connection information table 121. Subsequently, the host computer 10 stores an identifier of the CHA port 24 contained in the received result of discovery in the CHA port name 1215 of the host-side path connection information table 121.

Next, the host computer 10 stores an identifier of the LU 25 contained in the received result of discovery in the LUN 1216 of the host-side path connection information table 121. Then, the host computer 10 stores an identifier of the physical disk contained in the received result of discovery in the disk name 1217 of the host-side path connection information table 121.

Next, the host computer 10 creates the host-side configuration change history table 123.

To be specific, the host computer 10 stores "1" assigned as the configuration information change number in the configuration information change number 1231 of the host-side configuration change history table 123. Next, the host computer 10 stores the current date/time in the date/time 1232 of the host-side configuration change history table 123.

After creating the host-side path connection information table 121 and the host-side configuration change history table 123, the host computer 10 terminates the SAN configuration acquisition process at the start of operation.

Figure 8:
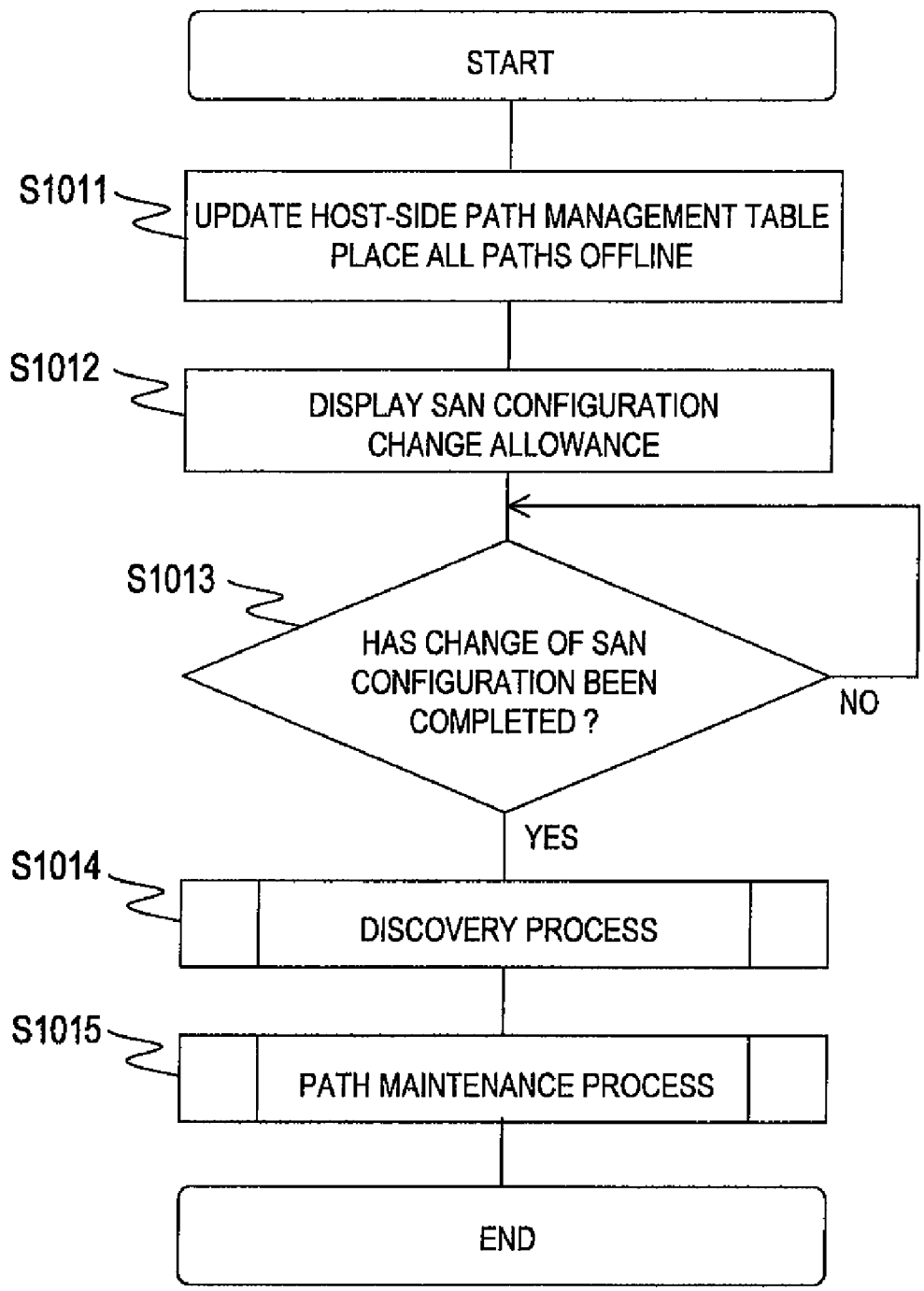
FIG. 8 is a flowchart of a SAN configuration change process executed by the host computer according to the first embodiment of this invention.

FIG. 8 is a flowchart of a SAN configuration change process executed by the host computer 10 according to the first embodiment of this invention.

When the SAN configuration is changed by the host administrator, the host computer 10 executes the SAN configuration change process. For example, when a SAN configuration change allowance request is input by the host administrator, the host computer 10 executes the SAN configuration change process.

First, the host computer 10 updates the host-side path management table 124. To be specific, the host computer 10 stores "offline" in the status 1242 of each of all the records contained in the host-side path management table 124. As a result, the host computer 10 blocks all the paths (S1011).

Next, the host computer 10 notifies the host administrator of a SAN configuration change allowance. For example, the host computer 10 displays the SAN configuration change allowance on a display section (S1012). Upon notification of the SAN configuration change allowance, the host administrator changes the SAN configuration. For example, the host administrator replaces the fibre channel switch 40 constituting the SAN with another one.

At this time, the host computer 10 judges whether or not the change of the SAN configuration has been completed (S1013). For example, upon input of SAN configuration change completion, the host computer 10 judges that the change of the SAN configuration has been completed. In addition, the host computer 10 may judge the completion of change of the SAN configuration upon detection of the change of the SAN configuration.

In the case where the change of the SAN configuration has not been completed yet, the host computer 10 waits until the change of the SAN configuration is completed.

On the other hand, in the case where the change of the SAN configuration has been completed, the host computer 10 executes a discovery execution process (S1014). The details of the discovery execution process will be described with reference to FIG. 9.

Next, the host computer 10 executes a path maintenance process (S1015). The details of the path maintenance process will be described with reference to FIG. 10.

Next, the host computer 10 terminates the SAN configuration change process.

Figure 9:
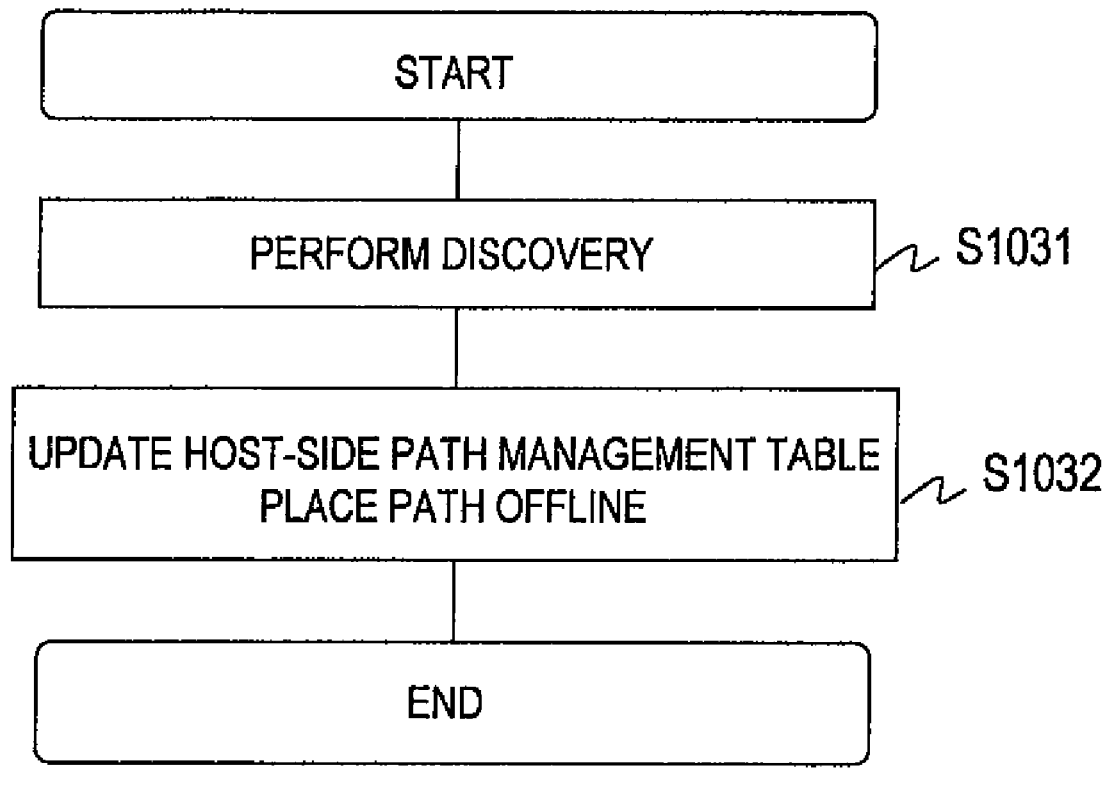
FIG. 9 is a flowchart of the discovery execution process executed by the host computer according to the first embodiment of this invention.

FIG. 9 is a flowchart of the discovery execution process executed by the host computer 10 according to the first embodiment of this invention.

Figure 10:
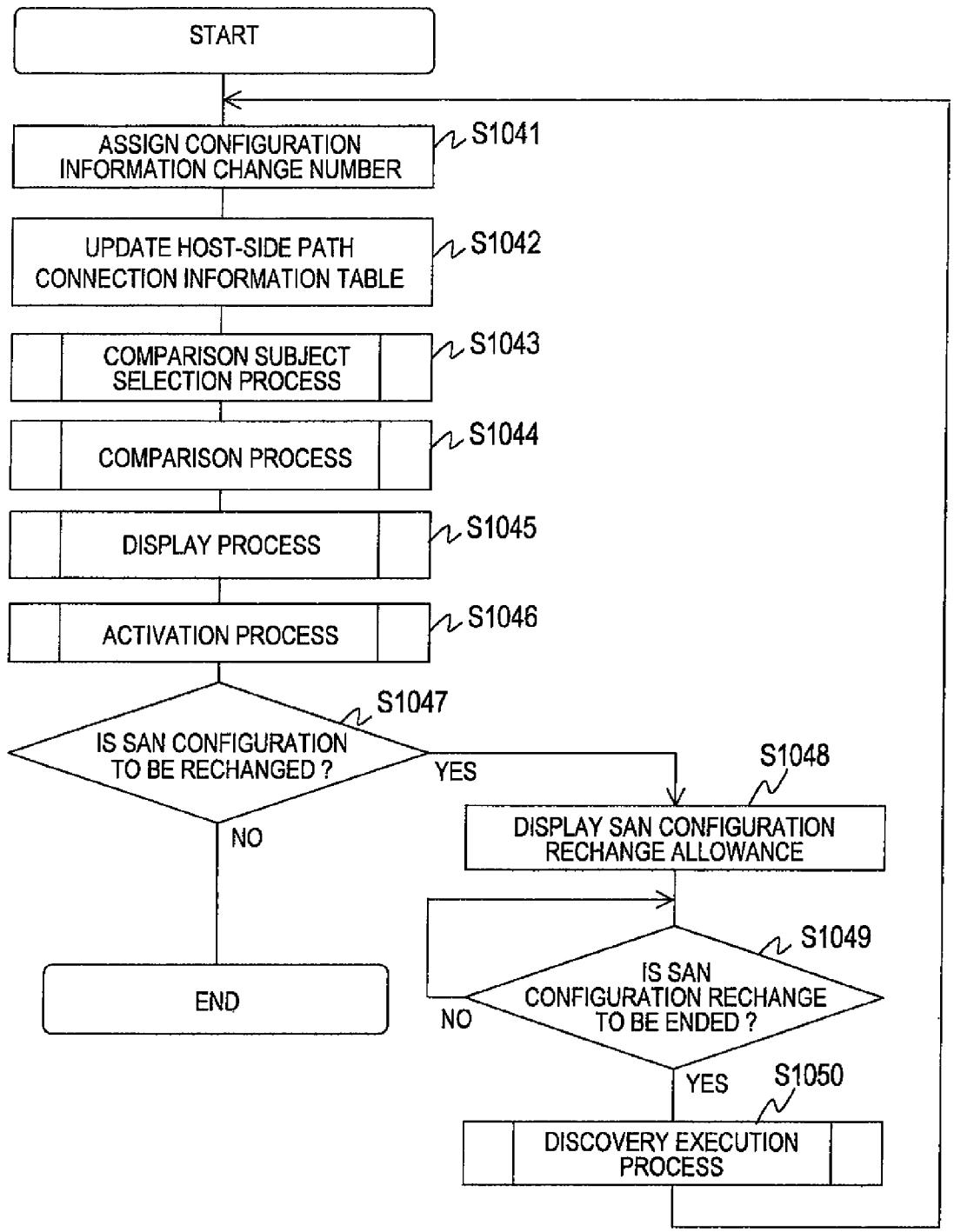
FIG. 10 is a flowchart of the path maintenance process executed by the host computer according to the first embodiment of this invention.

The discovery execution process is executed in Step S1014 of the SAN configuration change process shown in FIG. 8 and in Step S1050 of the path maintenance process shown in FIG. 10.

First, the host computer 10 performs discovery of the storage system 20 (S1031).

To be specific, the host computer 10 uses each of the HBAs 14 included in the host computer 10 to transmit a discovery request. Then, the host computer 10 receives the result of discovery from the storage system 20. The result of discovery contains an identifier of a path passing through the HBA 14 used for transmitting the discovery request, an identifier of the CHA 21 through which the path passes, an identifier of the CHA port 24 through which the path passes, an identifier of the LU 25 through which the path passes, an identifier of a physical disk constituting the LU 25, and the like.

Next, the host computer 10 updates the host-side path management table 124 based on the received result of discovery. Further, the host computer 10 blocks all the paths (places them offline) (S1032).

To be specific, the host computer 10 stores the identifier of the path contained in the result of discovery in the path ID 1241 of the host-side path management table 124. Next, the host computer 10 stores "offline" as the status 1242 in each of all the records included in the host-side path management table 124. As a result, the host computer 10 blocks all the paths.

Then, the host computer 10 terminates the discovery execution process.

FIG. 10 is a flowchart of the path maintenance process executed by the host computer 10 according to the first embodiment of this invention.

The path maintenance process is executed in Step S1015 of the SAN configuration change process shown in FIG. 8.

First, the host computer 10 extracts the largest value from the configuration information change number 1231 in the host-side configuration change history table 123. Then, the host computer 10 adds "1" to the extracted largest value.

Next, the host computer 10 assigns the result of addition to the current date/time as the configuration information change number (S1041). To be specific, the host computer 10 assigns the result of addition to the time when the SAN configuration is changed as the configuration information change number.

Next, the host computer 10 updates the host-side configuration change history table 123. To be specific, the host computer 10 creates a new record in the host-side configuration change history table 123. Next, the host computer 10 stores the result of addition in the configuration information change number 1231 of the new record. Then, the host computer 10 stores the current date and time in the date/time 1232 of the new record.

Next, the host computer 10 updates the host-side path connection information table 121 based on the result of discovery received in the discovery execution process shown in FIG. 9 and the like (S1042).

To be specific, the host computer 10 creates a new record in the host-side path connection information table 121. Next, the host computer 10 stores the assigned configuration information change number in the configuration information change number 1211 of the new record. Then, the host computer 10 stores an identifier of the path contained in the received result of discovery in the path ID 1212 of the new record.

Subsequently, the host computer 10 stores an identifier of the HBA 14 used for transmitting the discovery request in the HBA name 1213 of the new record. Next, the host computer 10 stores an identifier of the CHA 21 contained in the received result of discovery in the CHA name 1214 of the new record. Then, the host computer 10 stores an identifier of the CHA port 24 contained in the received result of discovery in the CHA port name 1215 of the new record.

Next, the host computer 10 stores an identifier of the LU 25 contained in the received result of discovery in the LUN 1216 of the new record. Next, the host computer 10 stores an identifier of the physical disk contained in the received result of discovery in the disk name 1217 of the new record.

Subsequently, the host computer 10 executes a comparison subject selection process (S1043). In this process, the host computer 10 determines the configuration information change number corresponding to a comparison source and the configuration information change number corresponding to a comparison target. The details of the comparison subject selection process will be described with reference to FIG. 11.

Next, the host computer 10 executes a comparison process (S1044). In this process, the host computer 10 grasps the relation between a path existing at the time corresponding to the configuration information change number determined as the comparison source (comparison source path) and a path existing at the time corresponding to the configuration information change number determined as the comparison target (comparison target path). The details of the comparison process will be described with reference to FIG. 12.

Next, the host computer 10 performs a display process (S1045). The details of the display process will be described with reference to FIG. 13. The host computer 10 performs the display process to display a path information screen. The path information screen contains information regarding the comparison source path and information regarding the comparison target path. The details of the path information screen will be described with reference to FIG. 14.

The host administrator refers to the displayed path information screen to determine whether or not to place the path online. The host administrator can determine whether or not to place the path online for each path. The host administrator designates the path to be placed online to input an online request for the path to the host computer 10.

Further, the host administrator refers to the displayed path information screen to determine whether or not to rechange the SAN configuration. When the SAN configuration is to be rechanged, the host administrator inputs a SAN configuration rechange allowance request to the host computer 10.

Next, the host computer 10 executes an activation process (S1046). In this process, the host computer 10 places the path designated by the host administrator online. The details of the activation process will be described with reference to FIG. 18.

Next, the host computer 10 determines whether or not the SAN configuration rechange allowance has been requested by the host administrator (S1047). In the case where the SAN configuration rechange allowance has not been requested, the host computer 10 terminates the path maintenance process.

On the other hand, in the case where the SAN configuration rechange allowance has been requested, the host computer 10 allows the SAN configuration to be rechanged (S1048). To be specific, the host computer 10 displays the allowance for the rechange of the SAN configuration.

Then, the host computer rechanges the SAN configuration. Upon completion of the rechange of the SAN configuration, the host administrator inputs the termination of rechange of the SAN configuration to the host computer 10.

The host computer 10 judges whether or not the rechange of the SAN configuration has been terminated (S1049). To be specific, upon input of the termination of rechange of the SAN configuration, the host computer 10 judges that the rechange of the SAN configuration has been terminated.

When the rechange of the SAN configuration is not terminated, the host computer 10 waits until the rechange of the SAN configuration terminates.

On the other hand, when the rechange of the SAN configuration is terminated, the host computer 10 performs the discovery execution process shown in FIG. 9 (S1050). Then, the host computer 10 returns to Step S1041. In this manner, the host computer 10 repeats the path maintenance process for the rechanged SAN configuration.

Figure 11:
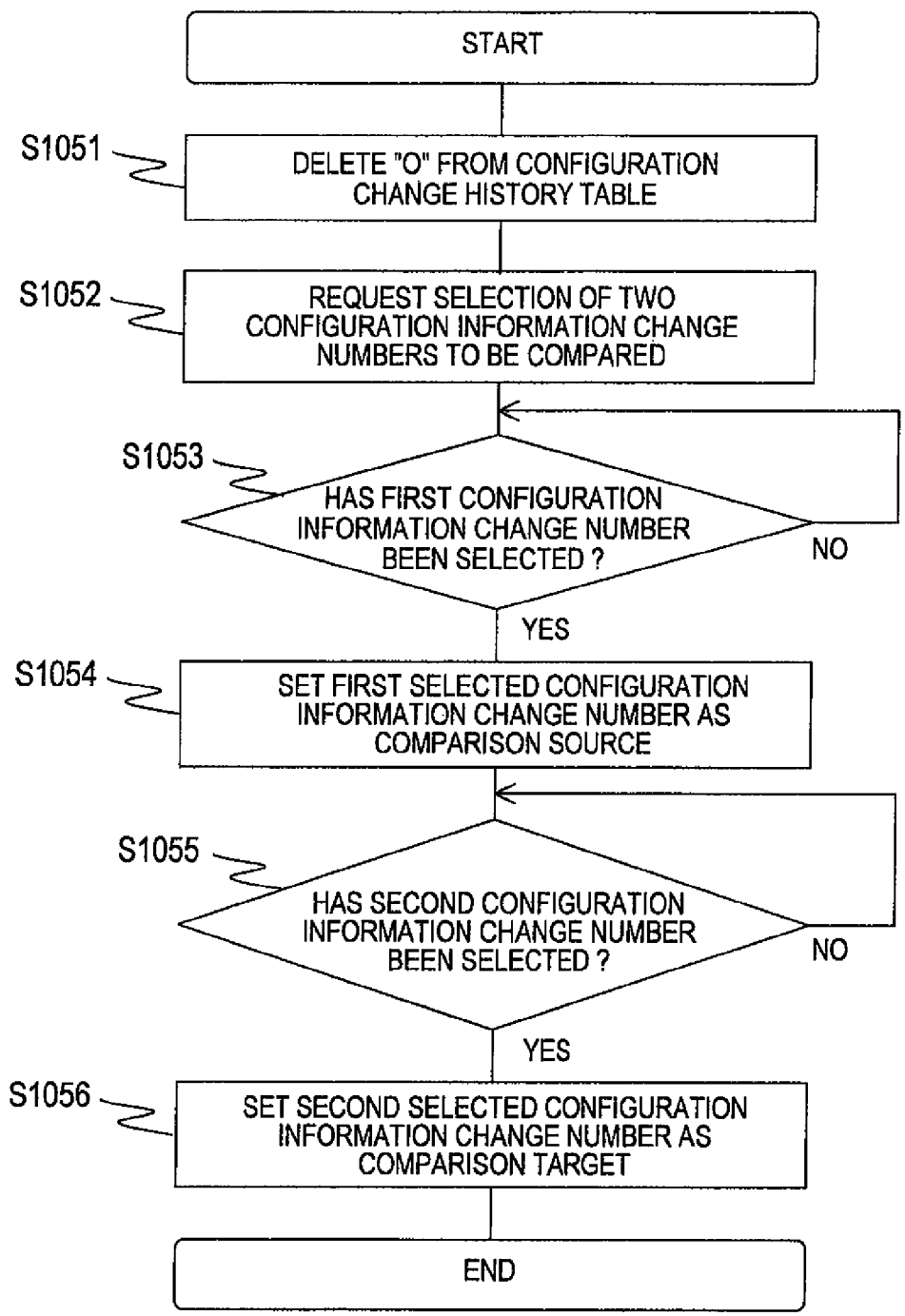
FIG. 11 is a flowchart of the comparison subject selection process executed by the host computer according to the first embodiment of this invention.

FIG. 11 is a flowchart of the comparison subject selection process executed by the host computer 10 according to the first embodiment of this invention.

The comparison subject selection process is executed in Step S1043 of the path maintenance process shown in FIG. 10.

First, the host computer 10 deletes all the signs "O" from the comparison source 1222 and the comparison target 1223 of the host-side configuration comparison table 122 (S1051).

Next, the host computer 10 requests the host administrator to select two configuration information change numbers to be compared (S1052). To be specific, the host computer 10 displays a screen which requests the selection of two configuration information change numbers to be compared. The host administrator then selects two configuration information change numbers with which the SAN configurations are desired to be compared.

In this step, the host computer 10 may also display the host-side configuration change history table 123 on the screen at the same time. As a result, the host administrator can grasp the configuration information change numbers corresponding to the dates/times desired to be compared.

The host computer 10 judges whether or not the host administrator has selected the first configuration information change number (S1053). In the case where the first configuration information change number has not been selected yet, the host computer 10 waits until the first configuration information change number is selected.

On the other hand, upon selection of the first configuration information change number, the host computer 10 sets the selected first configuration information change number as the comparison source (S1054). Then, the host computer 10 selects the record including the configuration information change number 1221 which is identical with the selected first configuration information change number, from the host-side configuration comparison table 122. Next, the host computer 10 stores "O" in the comparison source 1222 of the selected record.

Subsequently, the host computer 10 judges whether or not the host administrator has selected the second configuration information change number (S1055). In the case where the second configuration information change number has not been selected yet, the host computer 10 waits until the second configuration information change number is selected. When the selected two configuration information change numbers are the same, the host computer 10 judges that the second configuration information change number has not been selected yet.

Upon selection of the second configuration information change number, the host computer 10 sets the selected second configuration information change number as the comparison target (S1056). Then, the host computer 10 selects the record including the configuration information change number 1221 which is identical with the selected second configuration information change number, from the host-side configuration comparison table 122. Next, the host computer 10 stores "O" in the comparison target 1223 of the selected record.

Then, the host computer 10 terminates the comparison subject selection process.

Figure 12:
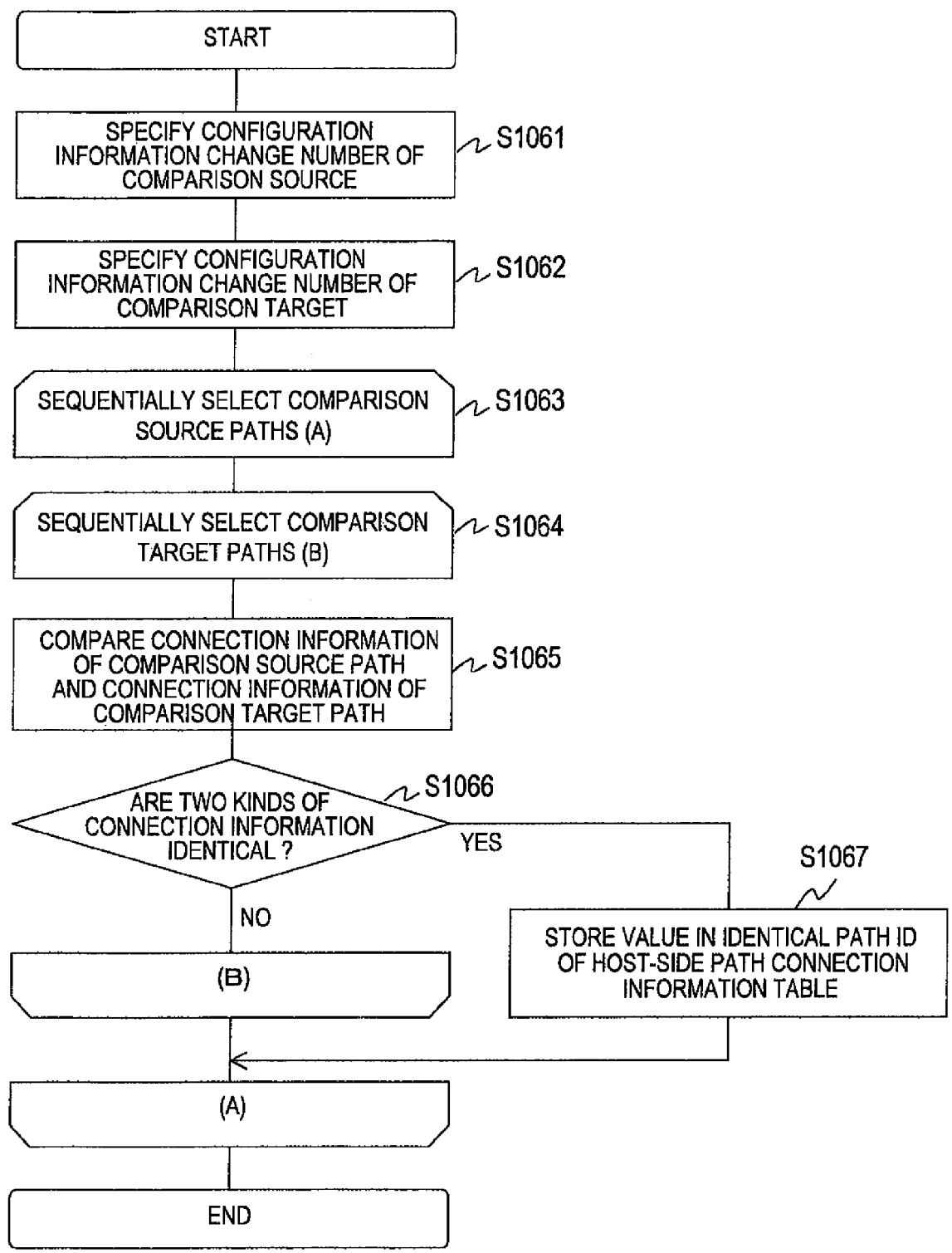
FIG. 12 is a flowchart of the comparison process executed by the host computer according to the first embodiment of this invention.

FIG. 12 is a flowchart of the comparison process executed by the host computer 10 according to the first embodiment of this invention.

The comparison process is executed in Step S1044 of the path maintenance process shown in FIG. 10.

First, the host computer 10 specifies the configuration information change number of the comparison source (S1061). To be specific, the host computer 10 selects the record including the sign "O" stored in the comparison source 1222 of the host-side configuration comparison table 122 from the host-side configuration comparison table 122. Next, the host computer 10 extracts the configuration information change number 1221 from the selected record. Then, the host computer 10 specifies the extracted configuration information change number 1221 as the configuration information change number of the comparison source.

Next, the host computer 10 specifies the configuration information change number of the comparison target (S1062). To be specific, the host computer 10 selects the record including the sign "O" stored in the comparison target 1223 of the host-side configuration comparison table 122 from the host-side configuration comparison table 122. Next, the host computer 10 extracts the configuration information change number 1221 from the selected record. Then, the host computer 10 specifies the extracted configuration information change number 1221 as the configuration information change number of the comparison target.

Next, the host computer 10 successively selects paths (comparison source paths) existing at the time corresponding to the specified configuration information change number of the comparison source (S1063).

To be specific, the host computer 10 selects all the records, each including the configuration information change number 1211 which is identical with the specified configuration information change number of the comparison source, from the host-side path connection information table 121. Next, the host computer 10 successively selects the path IDs 1212 from the selected records. Then, the host computer 10 determines the path identified by the selected path ID 1212 as the comparison source path.

Next, the host computer 10 executes Steps S1064 to S1067 for the selected comparison source path.

The host computer 10 successively selects paths (comparison target paths) existing at the time corresponding to the specified configuration information change number of the comparison target (S1064).

To be specific, the host computer 10 selects all the records, each including the configuration information change number 1211 which is identical with the specified configuration information change number of the comparison target, from the host-side path connection information table 121. Next, the host computer 10 successively selects the path IDs 1212 from the selected records. Then, the host computer 10 determines the path identified by the selected path ID 1212 as the comparison target path.

Next, the host computer 10 executes Steps S1065 to S1067 for the selected comparison target path.

The host computer 10 compares connection information of the selected comparison source path and that of the selected comparison target path (S1065). Then, the host computer 10 judges whether or not the compared two connection information are identical (S1066).

To be specific, the host computer 10 selects the record including the configuration information change number 1211 which is identical with the specified configuration information change number of the comparison source, from the host-side path connection information table 121. Next, the host computer 10 selects the record including the path ID 1212 which is identical with the selected identifier of the comparison source path (record for the comparison source path), from the selected records. Next, the host computer 10 extracts the HBA name 1213, the CHA name 1214, the CHA port name 1215 and the LUN 1216 from the selected record for the comparison source path.

Next, the host computer 10 selects the record including the configuration information change number 1211 which is identical with the specified configuration information change number of the comparison target, from the host-side path connection information table 121. Next, the host computer 10 selects the record including the path ID 1212 which is identical with the selected identifier of the comparison target path (record for the comparison target path), from the selected record. Next, the host computer 10 extracts the HBA name 1213, the CHA name 1214, the CHA port name 1215 and the LUN 1216 from the selected record for the comparison target path.

Then, the host computer 10 judges whether or not the HBA name 1213, the CHA name 1214, the CHA port name 1215 and the LUN 1216 extracted from the record for the comparison source path are respectively identical with the HBA name 1213, the CHA name 1214, the CHA port name 1215 and the LUN 1216 extracted from the record for the comparison target path.

When even any one of the HBA name 1213, the CHA name 1214, the CHA port name 1215 and the LUN 1216 differs, the host computer 10 judges that the connection information of the selected comparison source path and the connection information of the selected comparison target path are not identical.

Therefore, the host computer 10 returns to Step S1064. The host computer 10 selects a next comparison target path. Then, the host computer 10 executes Steps S1065 to S1067 for the selected comparison target path.

When all the comparison target paths are selected in Step S1064, the host computer 10 returns to Step S1063. Then, the host computer 10 selects a next comparison source path.

On the other hand, when the HBA name 1213, the CHA name 1214, the CHA port name 1215 and the LUN 1216 are all identical, the host computer 10 judges that the connection information of the selected comparison source path and that of the selected comparison target path are identical with each other. Then, the host computer 10 judges that the comparison source path and the comparison target path are the same path.

Therefore, the host computer 10 stores an identifier of the comparison target path in the identical path ID 1218 of the record for the selected comparison source path. The host computer 10 also stores an identifier of the comparison source path in the identical path ID 1218 of the record for the selected comparison target path (S1067).

Next, the host computer 10 returns to Step S1063 to select a next comparison source path. The host computer 10 executes Steps S1064 to S1067 for the selected comparison source path.

When all the comparison source paths are selected in Step S1063, the host computer 10 terminates the comparison process.

As described above, the host computer 10 specifies the same path as that existing at a first time point from the paths existing at a second time point. When the components through which the paths pass are all the same, the host computer 10 judges that the two paths are the same.

Figure 13:
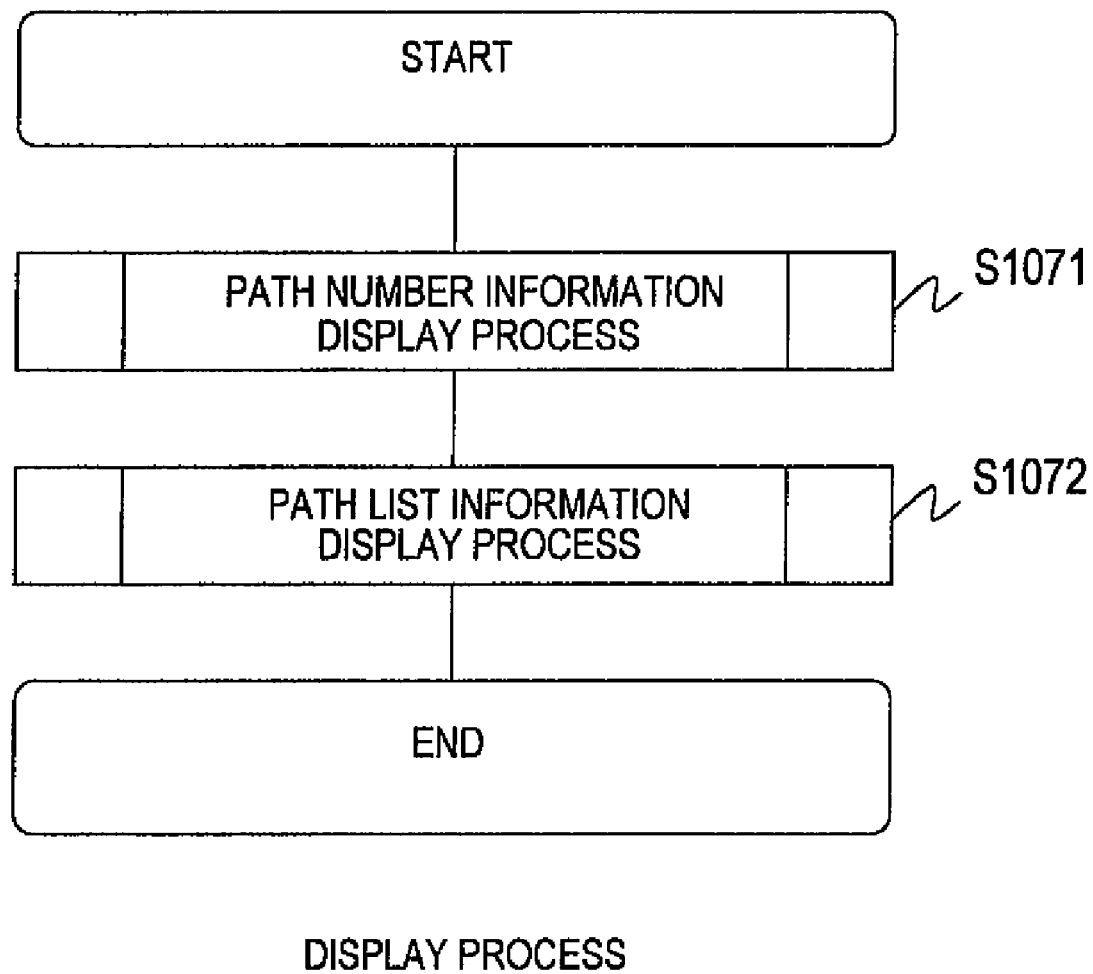
FIG. 13 is a flowchart of the display process executed by the host computer according to the first embodiment of this invention.

FIG. 13 is a flowchart of the display process executed by the host computer 10 according to the first embodiment of this invention.

The display process is executed in Step S1045 of the path maintenance process shown in FIG. 10.

First, the host computer 10 executes a path number information display process (S1071). In this process, the host computer 10 displays the number of paths passing through each of the components. The details of the path number information display process will be described with reference to FIG. 15.

Next, the host computer 10 executes a path list information display process (S1072). In this process, the host computer 10 displays connection information of the path. The details of the path list information display process will be described with reference to FIG. 16.

Then, the host computer 10 terminates the display process. For example, the host computer 10 executes the display process to display a path information screen shown in FIG. 14.

Figure 14:
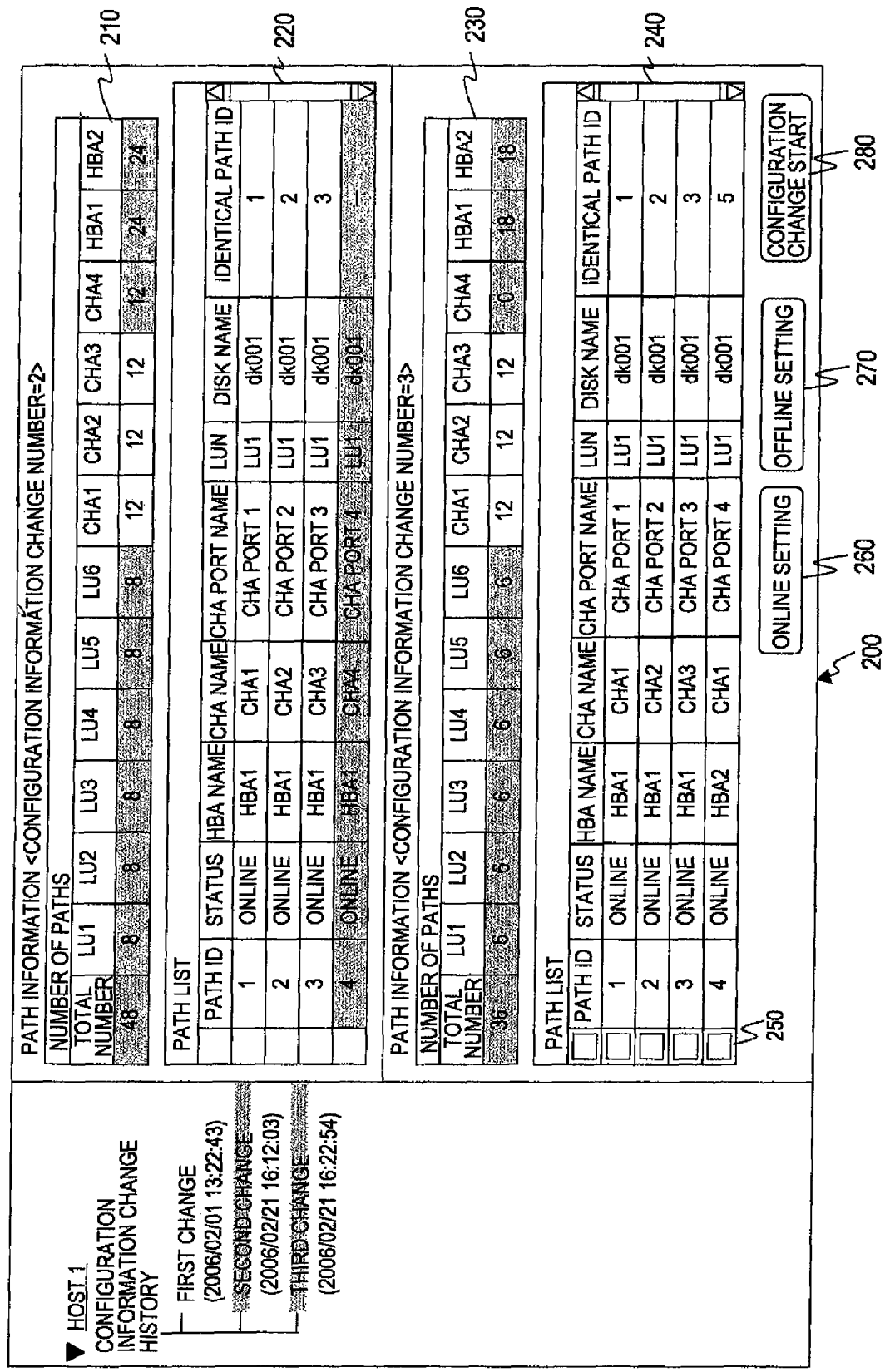
FIG. 14 is an explanatory view of a path information screen displayed on the host computer according to the first embodiment of this invention.

FIG. 14 is an explanatory view of a path information screen 200 displayed on the host computer 10 according to the first embodiment of this invention.

On the path information screen 200 in this explanatory view, "2" corresponding to the configuration information change number is selected as the comparison source and "3" corresponding to the configuration information change number is selected as the comparison target.

The path information screen 200 contains information regarding the comparison source path and information regarding the comparison target path.

The information regarding the comparison source path contains path number information 210 and path list information 220.

The path number information 210 contains a total number of paths (comparison source paths) existing at the time corresponding to the configuration information change number of the comparison source. Further, the path number information 210 also contains the number of comparison source paths passing through each of the components. To be specific, the path number information 210 contains the number of comparison source paths passing through each of the LUs 25, the number of comparison source paths passing through each of the CHAs 21, and the number of comparison source paths passing through each of the HBAs 14.

In the path number information 210, information regarding the component, for which the number of passing comparison source paths differs from the number of passing comparison target paths, is displayed in an emphasized manner. In the path number information 210 in this explanatory view, the numbers of comparison source paths passing through "LU1", "LU2", "LU3", "LU4", "LU5", "LU6", "CHA4", "HBA1", and "HBA2" are displayed in an emphasized manner.

The path list information 220 contains a record for the comparison source path in the host-side path connection information table 121. Further, the path list information 220 contains a status of the comparison source path. The status of the comparison source path indicates whether or not the comparison source path is blocked.

In the path list information 220, the record including the identical path ID that does not store any value is displayed in an emphasized manner. In the path list information 220 in this explanatory view, the record for the path identified by the path ID "4" is displayed in an emphasized manner.

The path list information 220 may contain exclusively the records, each including the identical path ID that does not store any value, or may contain exclusively the records, each including the identical path ID that stores a value.

The information regarding the comparison target path contains path number information 230 and path list information 240.

The path number information 230 contains a total number of paths (comparison target paths) existing at the time corresponding to the configuration information change number of the comparison target. Further, the path number information 230 contains the number of comparison target paths passing through each of the components. To be specific, the path number information 230 contains the number of comparison target paths passing through each of the LUs 25, the number of comparison target paths passing through each of the CHAs 21, and the number of comparison target paths passing through each of the HBAs 14.

In the path number information 230, information regarding the component, for which the number of passing comparison source paths differs from the number of passing comparison target paths, is displayed in an emphasized manner. In the path number information 230 in this explanatory view, the numbers of comparison source paths passing through "LU1", "LU2", "LU3", "LU4", "LU5", "LU6", "CHA4", "HBA1", and "HBA2" are displayed in an emphasized manner.

The path list information 240 contains a record for the comparison target path in the host-side path connection information table 121. Further, the path list information 240 contains a status of the comparison target path. The status of the comparison target path indicates whether or not the comparison target path is blocked. The path list information 240 may contain exclusively the records, each including the identical path ID that does not store any value.

In the path list information 240, the record including the identical path ID that does not store any value is displayed in an emphasized manner. In the path list information 240 in this explanatory view, there is no record to be displayed in an emphasized manner because the identification target path ID of each of all the records stores a value.

The path list information 240 may contain exclusively the records, each including the identical path ID that does not store any value, or may contain exclusively the records, each including the identical path ID that stores a value.

When the configuration information change number of the comparison source is the largest value, the information regarding the comparison source path further contains a check box 250, an online setting button 260, an offline setting button 270 and a configuration change start button 280. When the configuration information change number of the comparison source is the largest value, the time corresponding to the configuration information change number of the comparison source is the latest. To be specific, no change occurred in the SAN configuration after the time corresponding to the configuration information change number of the comparison source.

In the same way, when the configuration information change number of the comparison target is the largest value, the information regarding the comparison target path further contains the check box 250, the online setting button 260, the offline setting button 270, and the configuration change start button 280. When the configuration information change number of the comparison target is the largest value, the time corresponding to the configuration information change number of the comparison target is the latest. To be specific, no change occurred in the SAN configuration after the time corresponding to the configuration information change number of the comparison target.

In the check box 250, the record of the path list information 220 or 240 is selected. When the online setting button 260 is operated, the host computer 10 places a path corresponding to the record selected in the check box 250 online. When the offline setting button 270 is operated, the host computer 10 places a path corresponding to the record selected in the check box 250 offline.

When the configuration change start button 270 is operated, the host computer 10 judges that a rechange of the SAN configuration has been requested.

The host administrator refers to the path information screen 200 displayed on the host computer 10, thereby being able to easily judge whether or not the SAN configuration has been correctly changed.

For example, the host administrator compares the path list information 220 and the path list information 240 with each other. As a result, the host administrator can easily grasp a difference between the paths existing at the first time point and those existing at the second time point.

In particular, the host administrator refers to the identical path IDs contained in the path list information 220 and 240 on the path display screen 200. When no value is stored in the identical path ID, the host administrator can grasp that a path existing at one of the time points does not exist at the other time point.

Moreover, the host administrator refers to the path number information 210 and 230 on the path display screen 200, thereby being able to easily specify an erroneous part of setting of the fibre channel switch 40.

As described above, the host administrator can easily and correctly change the SAN configuration by referring to the path information screen 200.

Figure 15:
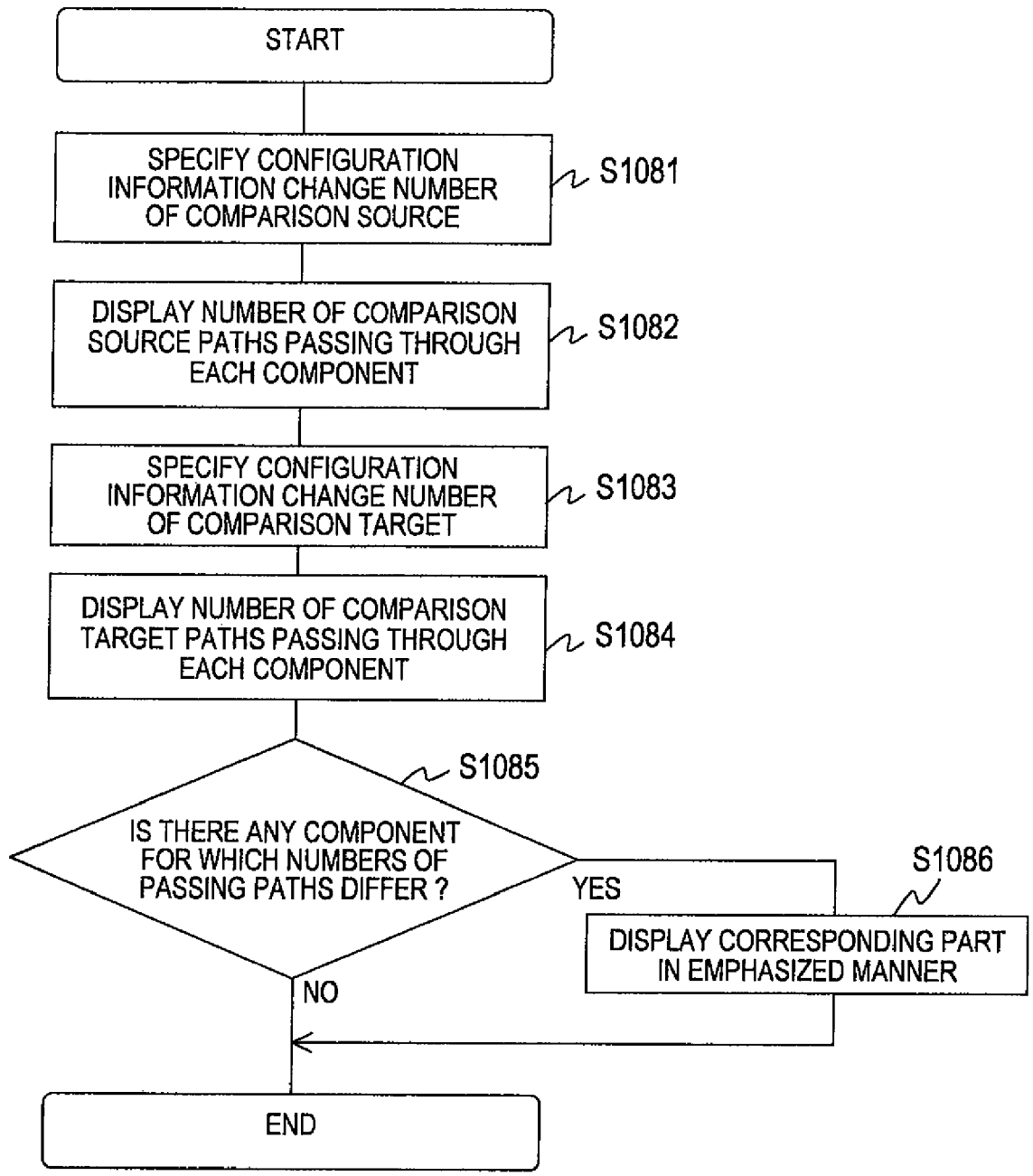
FIG. 15 is a flowchart of the path number information display process executed by the host computer according to the first embodiment of this invention.

FIG. 15 is a flowchart of the path number information display process executed by the host computer 10 according to the first embodiment of this invention.

The path number information display process is executed in Step S1071 of the display process shown in FIG. 13.

First, the host computer 10 specifies the configuration information change number of the comparison source by the same process as that in Step S1061 of the comparison process shown in FIG. 12 (S1081).

Next, the host computer 10 selects all the records (records for the comparison source paths), each including the configuration information change number 1211 which is identical with the specified configuration information change number of the comparison source, from the host-side path connection information table 121.

Then, the host computer 10 calculates a total number of comparison source paths based on the selected records for the comparison source paths. To be specific, the host computer 10 calculates the number of selected records for the comparison source paths as a total number of comparison source paths.

Next, the host computer 10 calculates the number of comparison source paths passing through each of the components based on the selected records for the comparison target paths.

To be specific, the host computer 10 sequentially selects identifiers of the LUs 25. Next, the host computer 10 specifies the record including the LUN 1216 which is identical with the selected identifier of the LU 25 from the selected records for the comparison source paths. Then, the host computer 10 calculates the number of specified records as the number of comparison source paths passing through the LU 25.

In the same way, the host computer 10 sequentially selects identifiers of the CHAs 21. Next, the host computer 10 specifies the record including the CHA name 1214 which is identical with the selected identifier of the CHA 21 from the selected records for the comparison source paths. Then, the host computer 10 calculates the number of specified records as the number of comparison source paths passing through the CHA 21.

In the same way, the host computer 10 sequentially selects identifiers of the HBAs 14 included in the host computer 10. Next, the host computer 10 specifies the record including the HBA name 1213 which is identical with the selected identifier of the HBA 14 from the selected records for the comparison source paths. Then, the host computer 10 calculates the number of specified records as the number of comparison source paths passing through the HBA 14.

Next, the host computer 10 displays the calculated total number of comparison source paths and the calculated number of comparison source paths passing through each of the components (S1082). As a result, the host computer 10 displays the path number information 210 on the path information screen 200.

Next, the host computer 10 specifies the configuration information change number of the comparison target by the same process as that in Step S1062 of the comparison process shown in FIG. 12 (S1083).

Next, the host computer 10 selects all the records (records for the comparison target paths), each including the configuration information change number 1211 which is identical with the specified configuration information change number of the comparison target, from the host-side path connection information table 121.

Then, the host computer 10 calculates a total number of comparison target paths based on the selected records for the comparison target paths. To be specific, the host computer 10 sets the number of selected records for the comparison target paths as a total number of comparison target paths.

Next, the host computer 10 calculates the number of comparison target paths passing through each of the components based on the selected record for the comparison target path.

To be specific, the host computer 10 sequentially selects identifiers of the LUs 25. Next, the host computer 10 specifies the record including the LUN 1216 which is identical with the selected identifier of the LU 25, from the selected records for the comparison target paths. Then, the host computer 10 calculates the number of specified records as the number of comparison target paths passing through the LU 25.

In the same way, the host computer 10 sequentially selects identifiers of the CHAs 21. Next, the host computer 10 specifies the record including the CHA name 1214 which is identical with the selected identifier of the CHA 21, from the selected records for the comparison target paths. Then, the host computer 10 calculates the number of specified records as the number of comparison target paths passing through the CHA 21.

In the same way, the host computer 10 sequentially selects identifiers of the HBAs 14 included in the host computer 10. Next, the host computer 10 specifies the record including the HBA name 1213 which is identical with the selected identifier of the HBA 14, from the selected records for the comparison target paths. Then, the host computer 10 calculates the number of specified records as the number of comparison target paths passing through the HBA 14.

Next, the host computer 10 displays the calculated total number of comparison target paths and the calculated number of comparison target paths passing through each of the components (S1084). As a result, the host computer 10 displays the path number information 230 on the path information screen 200.

Subsequently, the host computer 10 judges whether or not there is any component for which the number of passing comparison source paths differs from the number of passing comparison target paths (S1085).

When there is no component for which the number of passing comparison source paths differs from the number of passing comparison target paths, the host computer 10 does not need any display in an emphasized manner. Therefore, the host computer 10 terminates the path number information display process without any further process.

On the other hand, when there is a component for which the number of passing comparison source paths differs from the number of passing comparison target paths, the host computer 10 displays the number of comparison source paths and the number of comparison target paths, which pass through the corresponding component, in an emphasized manner (S1086). Then, the host computer 10 terminates the path number information display process.

Figure 16:
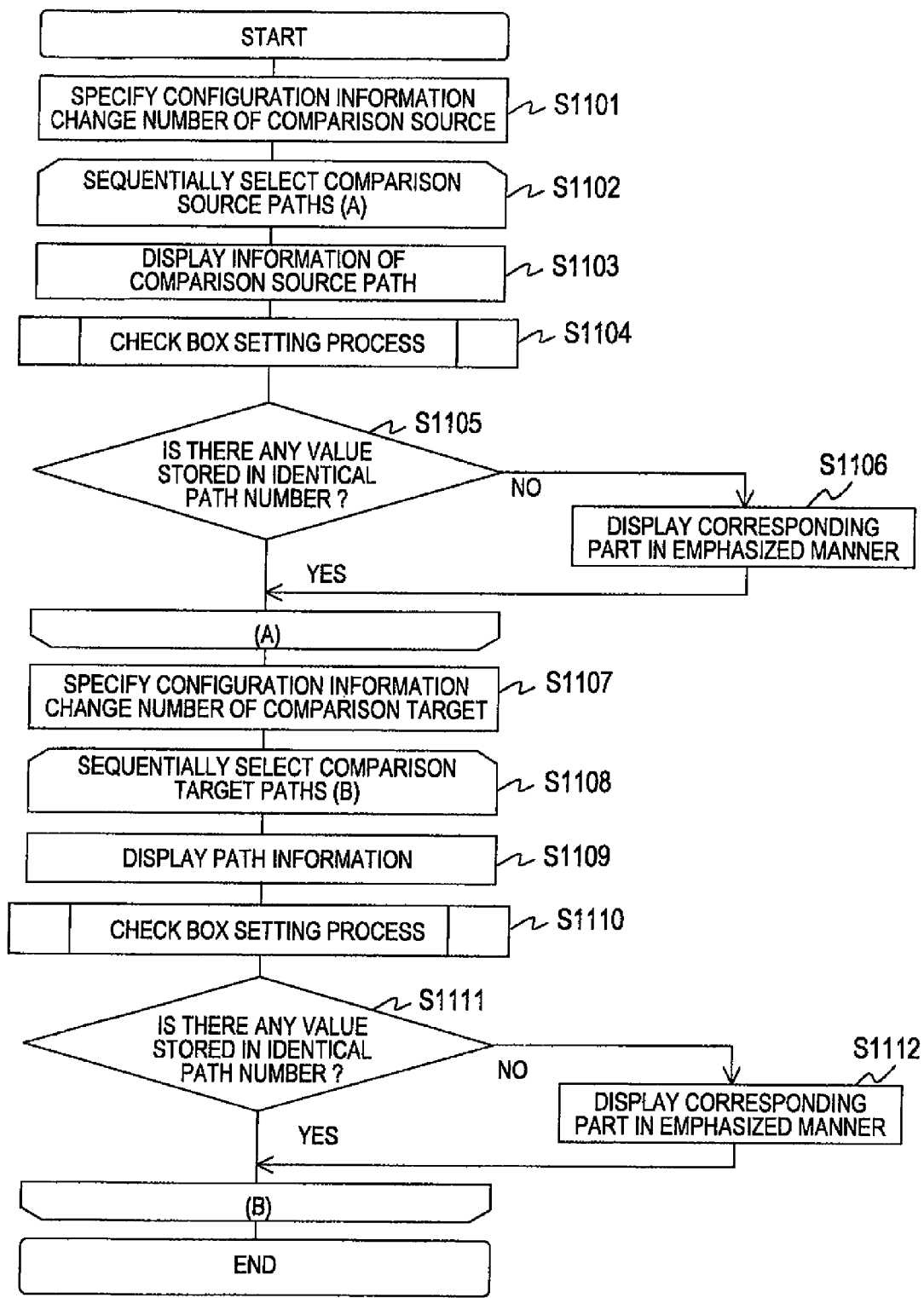
FIG. 16 is a flowchart of the path list information display process executed by the host computer according to the first embodiment of this invention.

FIG. 16 is a flowchart of the path list information display process executed by the host computer 10 according to the first embodiment of this invention.

The path list information display process is executed in Step S1072 of the display process shown in FIG. 13.

First, by the same process as that in Step S1061 of the comparison process shown in FIG. 12, the host computer 10 specifies the configuration information change number of the comparison source (S1101).

Next, the host computer 10 sequentially selects the paths (comparison source paths) existing at the time corresponding to the specified configuration information change number of the comparison source (S1102). Next, the host computer 10 extracts the record for the selected comparison source path from the host-side path connection information table 121. Then, the host computer 10 displays information contained in the extracted record for the comparison source path (S1103).

To be specific, the host computer 10 sequentially extracts the records, each including the configuration information change number 1211 which is identical with the specified configuration information change number of the comparison source (records for the comparison source paths), from the host-side path connection information table 121. Then, the host computer 10 displays information contained in the extracted record for the comparison source path.

The host computer 10 may display all the information contained in the extracted record for the comparison source path or may display only a part thereof.

Moreover, the host computer 10 may also display the status of the selected comparison source path.

To be specific, the host computer 10 selects the record including the path ID 1241 which is identical with the path ID 1212 of the record extracted from the host-side path connection information table 121, from the host-side path management table 124. Next, the host computer 10 extracts the status 1242 from the selected record. Then, the host computer 10 displays the extracted status 1242.

As a result, the host computer 10 displays the path list information 220 on the path information screen 200.

Next, the host computer 10 executes a check box setting process (S1104). The details of the check box setting process will be described with reference to FIG. 17.

Next, the host computer 10 judges whether or not a value is stored in the identical path ID 1218 of the extracted record for the comparison source path (S1105).

When a value is stored in the identical path ID 1218, the same path as the selected comparison source path exists even at the time corresponding to the configuration information change number of the comparison target. Therefore, the host computer 10 is not required to display the extracted record for the comparison source path in an emphasized manner. Therefore, the host computer 10 terminates the process for the comparison source path selected in Step S1102.

On the other hand, when no value is stored in the identical path ID 1218, the same path as the selected comparison source path does not exist at the time corresponding to the configuration information change number of the comparison target. Therefore, the host computer 10 displays the extracted record for the comparison source path in an emphasized manner (S1106). Then, the host computer 10 terminates the process for the comparison source path selected in Step S1102.

Next, the host computer 10 returns to Step S1102 to select a next comparison source path. Then, the host computer 10 executes Steps S1103 to S1106 with respect to the selected comparison source path.

When all the comparison source paths are selected in Step S1102, the host computer proceeds to Step S1107.

Next, by the same process as that in Step S1062 of the comparison process shown in FIG. 12, the host computer 10 specifies the configuration information change number of the comparison target (S1107).

Next, the host computer 10 sequentially selects paths (comparison target paths) existing at the time corresponding to the specified configuration information change number of the comparison target (S1108). Next, the host computer 10 extracts the selected record for the comparison target path from the host-side path connection information table 121. Then, the host computer 10 displays information contained in the extracted record for the comparison target path (S1109).

To be specific, the host computer 10 sequentially extracts the records (records for the comparison target paths), each including the configuration information change number 1211 which is identical with the specified configuration information change number of the comparison target, from the host-side path connection information table 121. Then, the host computer 10 displays information contained in the extracted record for the comparison target path.

The host computer 10 may display all the information contained in the extracted record for the comparison target path or may display only a part thereof.

The host computer 10 may also display the status of the selected comparison target path.

To be specific, the host computer 10 selects the record including the path ID 1241 which is identical with the path ID 1212 of the record extracted from the host-side path connection information table 121, from the host-side path management table 124. Next, the host computer 10 extracts the status 1242 from the selected record. Then, the host computer 10 displays the extracted status 1242.

As a result, the host computer 10 displays the path list information 240 on the path information screen 200.

Next, the host computer 10 performs the check box setting process (S1110). The details of the check box setting process will be described with reference to FIG. 17.

Next, the host computer 10 judges whether or not a value is stored in the identical path ID 1218 of the extracted record for the comparison target path (S1111).

When a value is stored in the identical path ID 1218, the same path as the selected comparison target path exists even at the time corresponding to the configuration information change number of the comparison source. Therefore, the host computer 10 is not required to display the extracted record for the comparison target path in an emphasized manner. Accordingly, the host computer 10 terminates the process for the comparison target path selected in Step S1108.

On the other hand, when no value is stored in the identical path ID 1218, the same path as the selected comparison target path does not exist at the time corresponding to the configuration information change number of the comparison source. Therefore, the host computer 10 displays the extracted record for the comparison target path in an emphasized manner (S1112). Then, the host computer 10 terminates the process for the comparison target path selected in Step S1108.

Subsequently, the host computer 10 returns to Step S1108 to select a next comparison target path. Then, the host computer 10 executes Steps S1109 to S112 with respect to the selected comparison target path.

When all the comparison target paths are selected in Step S1108, the host computer 10 terminates the path list information display process.

Figure 17:
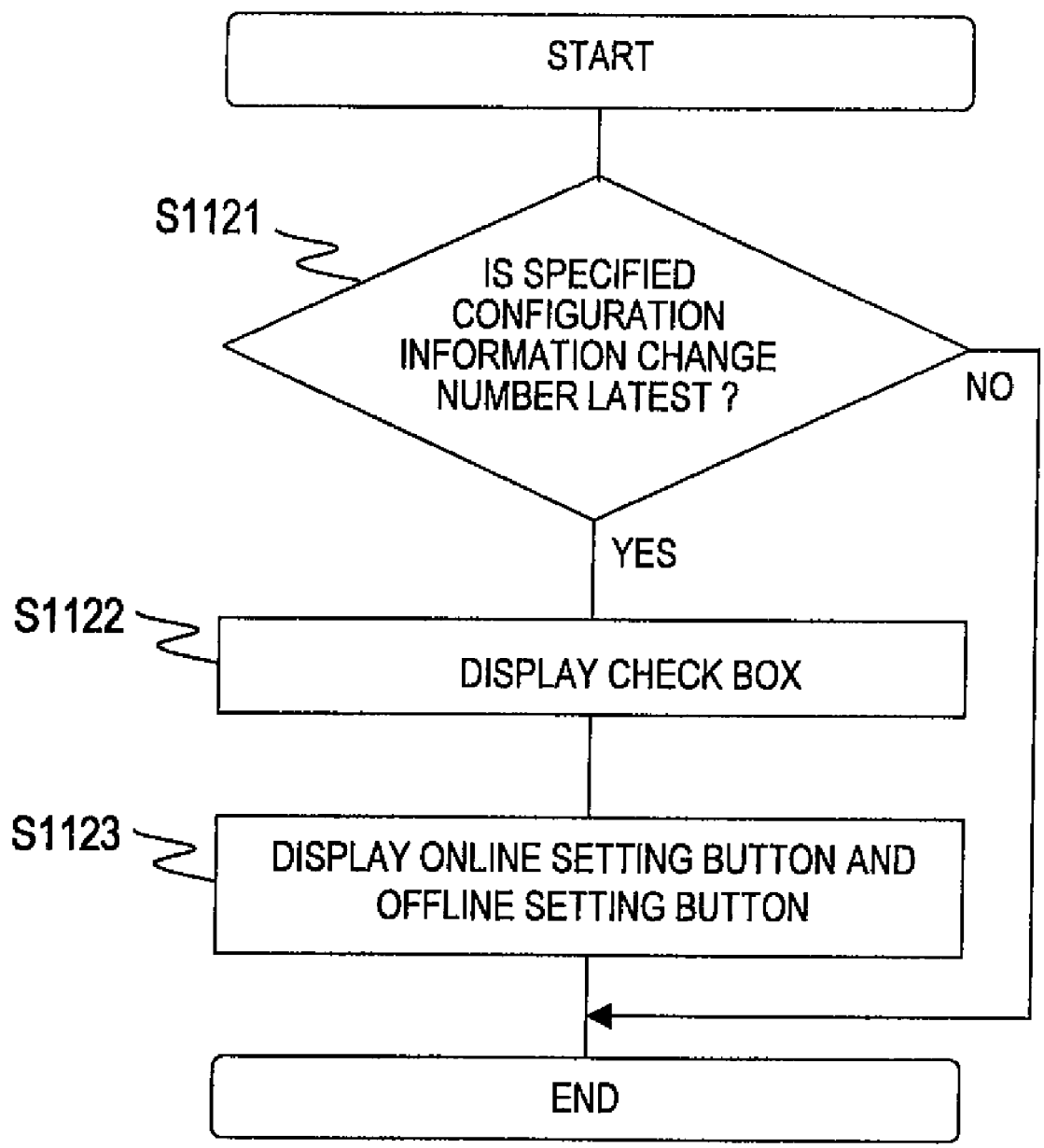
FIG. 17 is a flowchart of the check box setting process executed by the host computer according to the first embodiment of this invention.

FIG. 17 is a flowchart of the check box setting process executed by the host computer 10 according to the first embodiment of this invention.

The check box setting process is executed in Steps S1104 and S1110 of the path list information display process shown in FIG. 16.

First, the host computer 10 judges whether or not the specified configuration information change number is the largest value (S1121).

When the check box setting process is executed in Step S1104 of the path list information display process shown in FIG. 16, the host computer 10 judges whether or not the configuration information change number of the comparison source, which is specified in Step S1101 of the path list information display process, is the largest value.

On the other hand, when the check box setting process is executed in Step S1110 of the path list information display process shown in FIG. 16, the host computer 10 judges whether or not the configuration information change number of the comparison target, which is specified in Step S1107 of the path list information display process, is the largest value.

When the specified configuration information change number is not the largest value, the time corresponding to the configuration information change number is not the latest. To be specific, the SAN configuration is changed after the time corresponding to the configuration information change number. Therefore, since the host computer 10 is not required to display a check box and the like, the host computer 10 terminates the check box setting process without any further process.

On the other hand, when the specified configuration information change number is the largest value, the time corresponding to the configuration information change number is the latest. To be specific, the SAN configuration is not changed after the time corresponding to the configuration information change number. Therefore, the host computer 10 displays the check box 250 on the path information screen 200 as shown in FIG. 14 (S1122).

Further, the host computer 10 displays the online setting button 260, the offline setting button 270, and the configuration change start button 280 on the path information screen 200 (S1123). Then, the host computer 10 terminates the check box setting process.

Figure 18:
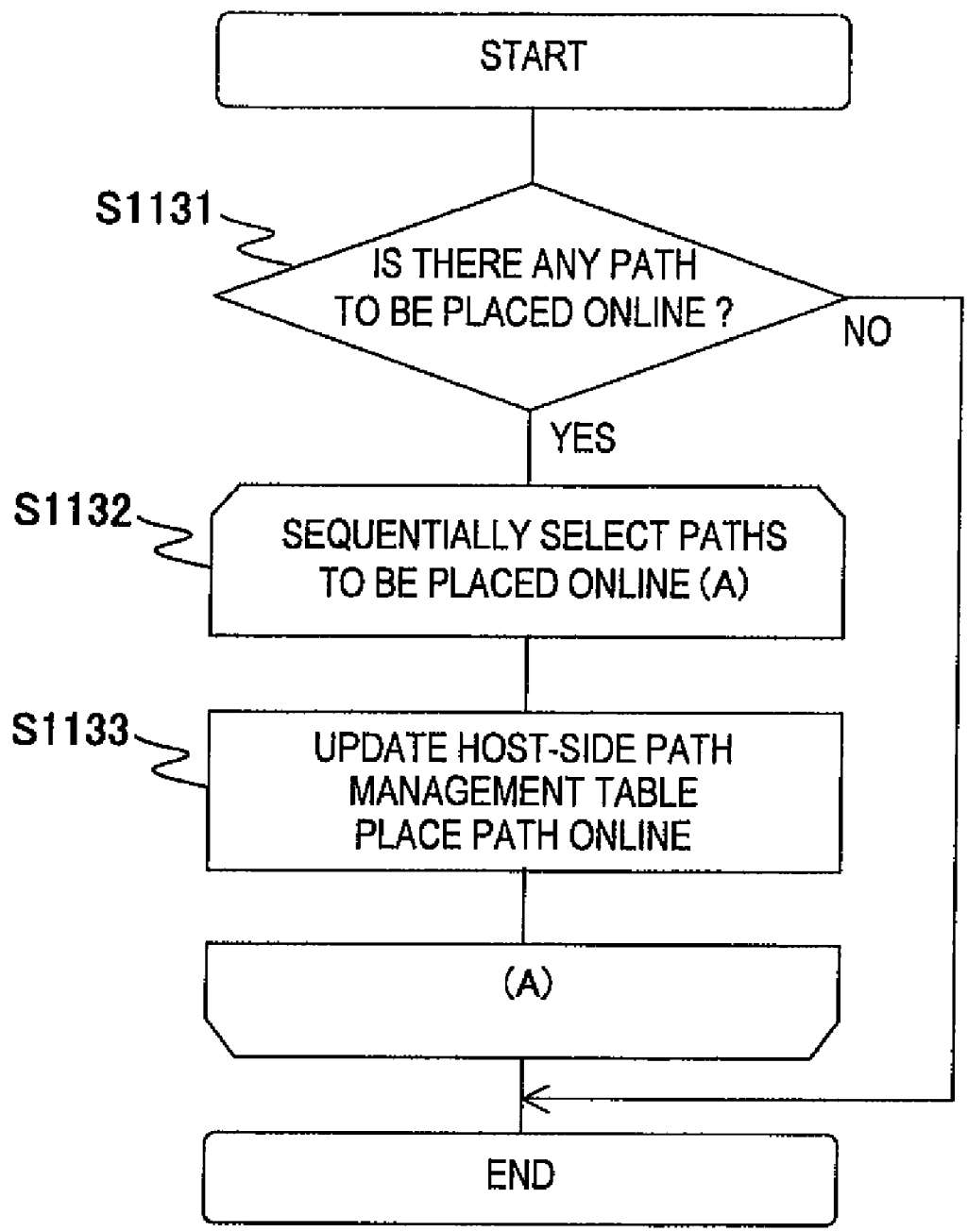
FIG. 18 is a flowchart of the activation process executed by the host computer according to the first embodiment of this invention.

FIG. 18 is a flowchart of the activation process executed by the host computer 10 according to the first embodiment of this invention.

The activation process is executed in Step S1046 of the path maintenance process shown in FIG. 10.

First, the host computer 10 judges whether or not there is any path to be placed online (S1131).

The host administrator selects the check box 250 corresponding to the path to be placed online from the check boxes 250 displayed on the path information screen 200. Then, the host administrator operates the online setting button 260 to request the host computer 10 to place the path online.

Therefore, when the online setting button 260 is operated by the host administrator, the host computer 10 judges that there is a path to be placed online.

When there is no path to be placed online, the host computer 10 terminates the activation process without any further process.

On the other hand, when there is a path to be placed online, the host computer 10 sequentially selects the paths to be placed online (S1132). Next, the host computer 10 updates the host-side path management table 124. Then, the host computer 10 places the selected paths online (S1133).

To be specific, the host computer 10 sequentially selects the records selected in the check boxes 250 on the path information screen 200 from the top. Next, the host computer 10 extracts the path ID from the selected record. Next, the host computer 10 selects the record including the path ID 1241 which is identical with the extracted path ID from the host-side path management table 124. Next, the host computer 10 stores "online" in the status 1242 of the selected record. As a result, the host computer 10 places the selected path online.

Next, the host computer 10 returns to Step S1132 to select a next path to be placed online. The host computer 10 executes Step S1133 for the selected next path. When all the paths to be placed online are selected in Step S1132, the host computer 10 terminates the activation process.

According to the first embodiment, the host computer 10 specifies and outputs a difference between the paths existing at the first time point and those existing at the second time point. To be specific, the host computer 10 displays the path information screen 200. The host administrator refers to the path information screen 200 to be able to easily judge whether or not the SAN configuration has been correctly changed.

For example, the case where the first time point is situated before the change of the SAN configuration and the second time point is situated after the change of the SAN configuration will be described. In this case, the host administrator compares the path list information 220 and the path list information 240 contained in the path information screen 200 with each other. As a result, the host administrator can grasp a difference between the paths existing before the change of the SAN configuration and those existing after the change of the SAN configuration. When the paths existing before the change of the SAN configuration and those existing after the change of the SAN configuration are all the same, the host administrator judges that the fibre channel switch 40 has been correctly set.

On the other hand, when the paths existing before the change of the SAN configuration differ from those existing after the change of the SAN configuration, the host administrator judges that the fibre channel switch 40 has not been correctly set. Therefore, the host administrator is required to rechange the SAN configuration.

Before rechanging the SAN configuration, the host administrator specifies the paths to be placed online at this time. For example, the paths existing both before and after the change of the SAN configuration may be placed online at this time. Therefore, the host administrator specifies, as the path to be placed online, the path corresponding to the record whose identical path ID of the path list information 240 on the path information screen 200 stores a value.

As described above, the host administrator can easily grasp the SAN configuration by referring to the path information screen 200. Further, the host administrator can correctly set the SAN configuration by referring to the path information screen 200.

Second Embodiment

In a second embodiment of this invention, in place of the host computer 10, the management server 30 creates and displays the path information screen.

A configuration of the computer system according to the second embodiment is the same as that of the computer system shown in FIG. 1 according to the first embodiment except for programs and information stored in a memory 32 of the management server 30. Therefore, description thereof is herein omitted.

Figures 19, 20:
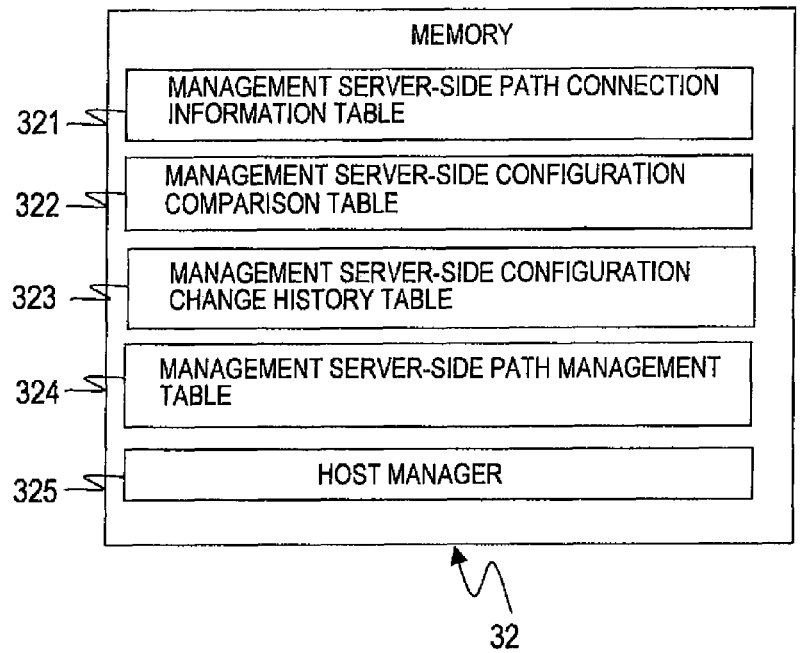
FIG. 19 is a block diagram of the memory included in the management server according to the second embodiment of this invention.
FIG. 20 is a schematic view of the management server-side path connection information table stored in the management server according to the second embodiment of this invention.

FIG. 19 is a block diagram of the memory 32 included in the management server 30 according to the second embodiment of this invention.

The memory 32 included in the management server 30 stores a management server-side path connection information table 321, a management server-side configuration comparison table 322, a management server-side configuration change history table 323, a management server-side path management table 324, and a host manager 325.

The management server-side path connection information table 321 manages the components through which the path connecting the host computer 10 and the LU 25 provided by the storage system 20 to each other passes. The details of the management server-side path connection information table 321 will be described with reference to FIG. 20.

The management server-side configuration comparison table 322 shows two time points at which the SAN configuration is compared. The details of the management server-side configuration comparison table 322 will be described with reference to FIG. 21.

The management server-side configuration change history table 323 manages the date and time when the SAN configuration is changed. The details of the management server-side configuration change history table 323 will be described with reference to FIG. 22.

The management server-side path management table 324 manages the current status of the path which connects the host computer 10 and the LU 25 provided by the storage system 20 to each other. The details of the management server-side path management table 324 will be described with reference to FIG. 23.

The host manager 325 is a program which manages information regarding the connection between the host computer 10 and the component of the storage system 20.

FIG. 20 is a schematic view of the management server-side path connection information table 321 stored in the management server 30 according to the second embodiment of this invention.

The management server-side path connection information table 321 contains a configuration information change number 3211, a host name 3219, a path ID 3212, an HBA name 3213, a CHA name 3214, a CHA port name 3215, a LUN 3216, a disk name 3217, and an identical path ID 3218.

The configuration information change number 3211 is a unique identifier of the time when the change of the SAN configuration is completed. In this embodiment, the management server 30 sets the configuration information change number 3211 at the time of introduction of the management server 30 to "1". Thereafter, each time the SAN configuration is changed, the management server 30 increases the configuration information change number 3211. The configuration information change number 3211 may be a unique identifier of arbitrary time other than the time when the change of the SAN configuration is completed.

The host name 3219 is a unique identifier of the host computer 10 included in the computer system.

The path ID 3212 is a unique identifier of a path existing at the time identified by the configuration information change number 3211 in the record. The path connects the LU 25 provided by the storage system 20 and the HBA 14 included in the host computer 10 to each other.

The HBA name 3213 is a unique identifier of the HBA 14 through which the path identified by the path ID 3212 in the record passes.

The CHA name 3214 is a unique identifier of the CHA 21 through which the path identified by the path ID 3212 in the record passes. The CHA port name 3215 is a unique identifier of the CHA port 24 through which the path identified by the path ID 3212 in the record passes. The CHA port 24 identified by the CHA port name 3214 is included in the CHA 21 identified by the CHA name 3214 in the record.

The LUN 3216 is a unique identifier of the LU 25 through which the path identified by the path ID 3212 in the record passes. The disk name 3217 is a unique identifier of the physical disk constituting the LU 25 identified by the LUN 3216 in the record. When the LU 25 has a RAID configuration, a plurality of identifiers for physical disks are stored as the disk name 3217.

The identical path ID 3218 is a unique identifier of the path that is the same as the path identified by the path ID 3212 in the record among the paths exiting at the time compared with the time identified by the configuration information change number 3211 in the record. The path is specified by the combination of the HBA 14, the CHA port 24, and the LU 25 through which the path passes. Therefore, when the HBA 14, the CHA port 24, and the LU 25 through which a first path passes and those through which a second path passes are all the same, the management server 30 identifies the first path and the second path as the same path.

FIG. 21 is a schematic view of the management server-side configuration comparison table 322 stored in the management server 30 according to the second embodiment of this invention.

The management server-side configuration comparison table 322 includes a host name 3224, a configuration information change number 3221, a comparison source 3222, and a comparison target 3223.

The host name 3224 is a unique identifier of the host computer 10 included in the computer system. The configuration information change number 3221 is a unique identifier of the time when the change of the SAN configuration is completed. The comparison source 3222 indicates whether or not the time identified by the configuration information change number 3221 in the record is a comparison source. The comparison source 3222 further indicates whether or not the host computer 10 identified by the host name 3224 in the record is to be compared.

To be specific, when the time identified by the configuration information change number 3221 in the record is a comparison source and the host computer 10 identified by the host name 3224 in the record is to be compared, the sign "O" is stored in the comparison source 3222.

The comparison target 3223 indicates whether or not the time identified by the configuration information change number 3221 in the record is a comparison target. The comparison target 3223 further indicates whether or not the host computer 10 identified by the host name 3224 in the record is to be compared.

To be specific, when the time identified by the configuration information change number 3221 in the record is a comparison target and the host computer 10 identified by the host name 3224 in the record is to be compared, the sign "O" is stored in the comparison target 3223.

In the second embodiment, the management server 30 sets, as the comparison source, the time first selected by a management server administrator from the two time points at which the SAN configuration is compared. On the other hand, the management server 30 sets, as the comparison target, the time next selected by the management server administrator from the two time points at which the SAN configuration is compared. The management server 30 sets the host computer 10 selected by the management server administrator as a target to be managed.

FIG. 22 is a schematic view of the management server-side configuration change history table 323 stored in the management server 30 according to the second embodiment of this invention.

The management server-side configuration change history table 323 includes a configuration information change number 3231 and a date/time 3232.

The configuration information change number 3231 is a unique identifier of the time when the change of the SAN configuration is completed. The configuration information change number 3231 may be a unique identifier of arbitrary time other than the time when the change of the SAN configuration is completed.

The date/time 3232 is a date and time of the time point identified by the configuration information change number 3231 in the record.

FIG. 23 is a schematic view of the management server-side path management table 324 stored in the management server 30 according to the second embodiment of this invention.

The management server-side path management table 324 includes a host name 3243, a path ID 3241, and a status 3242.

The host name 3243 is a unique identifier of the host computer 10 included in the computer system. The path ID 3241 is a unique identifier of a path connected to the host computer 10 identified by the host name 3243 in the record.

The status 3242 indicates whether or not the path identified by the path ID 3241 is blocked. When the path identified by the path ID 3241 in the record is blocked, "offline" is stored in the status 3242. On the other hand, when the path identified by the path ID 3241 in the record is not blocked, "online" is stored in the status 3242.

Hereinafter, a process of the computer system according to the second embodiment of this invention will be described.

Figure 24:
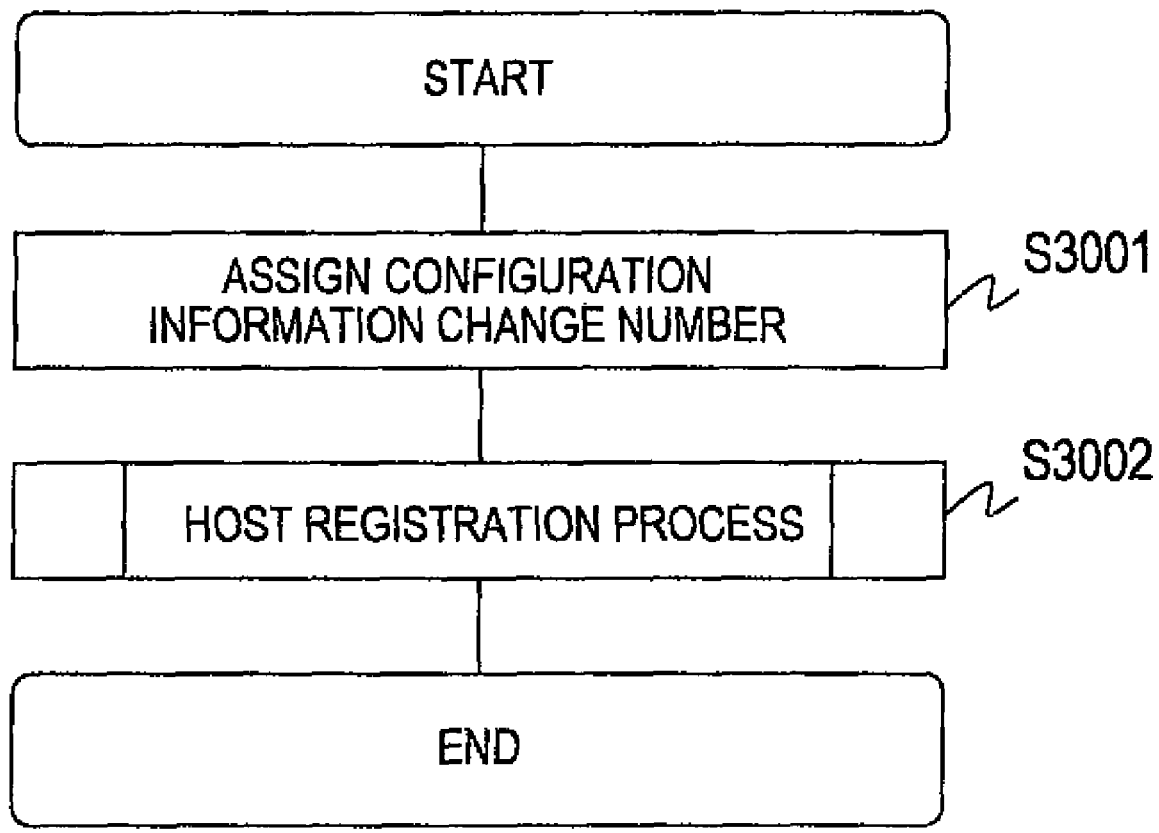
FIG. 24 is a flowchart of a process at the time of introduction of the management server, which is executed by the management server according to the second embodiment of this invention.

FIG. 24 is a flowchart of a process at the time of introduction of the management server 30, which is executed by the management server 30 according to the second embodiment of this invention.

First, the management server 30 assigns "1" to the current date/time as the configuration information change number (S3001). To be specific, the management server 30 assigns "1" to the time of introduction of the management server 30 as the configuration information change number.

Next, the management server 30 creates the management server-side configuration change history table 323.

To be specific, the management server 30 stores "1" assigned as the configuration information change number in the configuration information change number 3231 of the management server-side configuration change history table 323. Next, the management server 30 stores the current date and time in the date/time 3232 of the management server-side configuration change history table 323.

Subsequently, the management server 30 executes a host registration process (S3002). In this process, the management server 30 obtains information regarding the host computer 10 to be managed. Then, the management server 30 stores the obtained information. The details of the host registration process will be described with reference to FIG. 25.

Then, the management server 30 terminates the process at the time of introduction of the management server.

Figure 25:
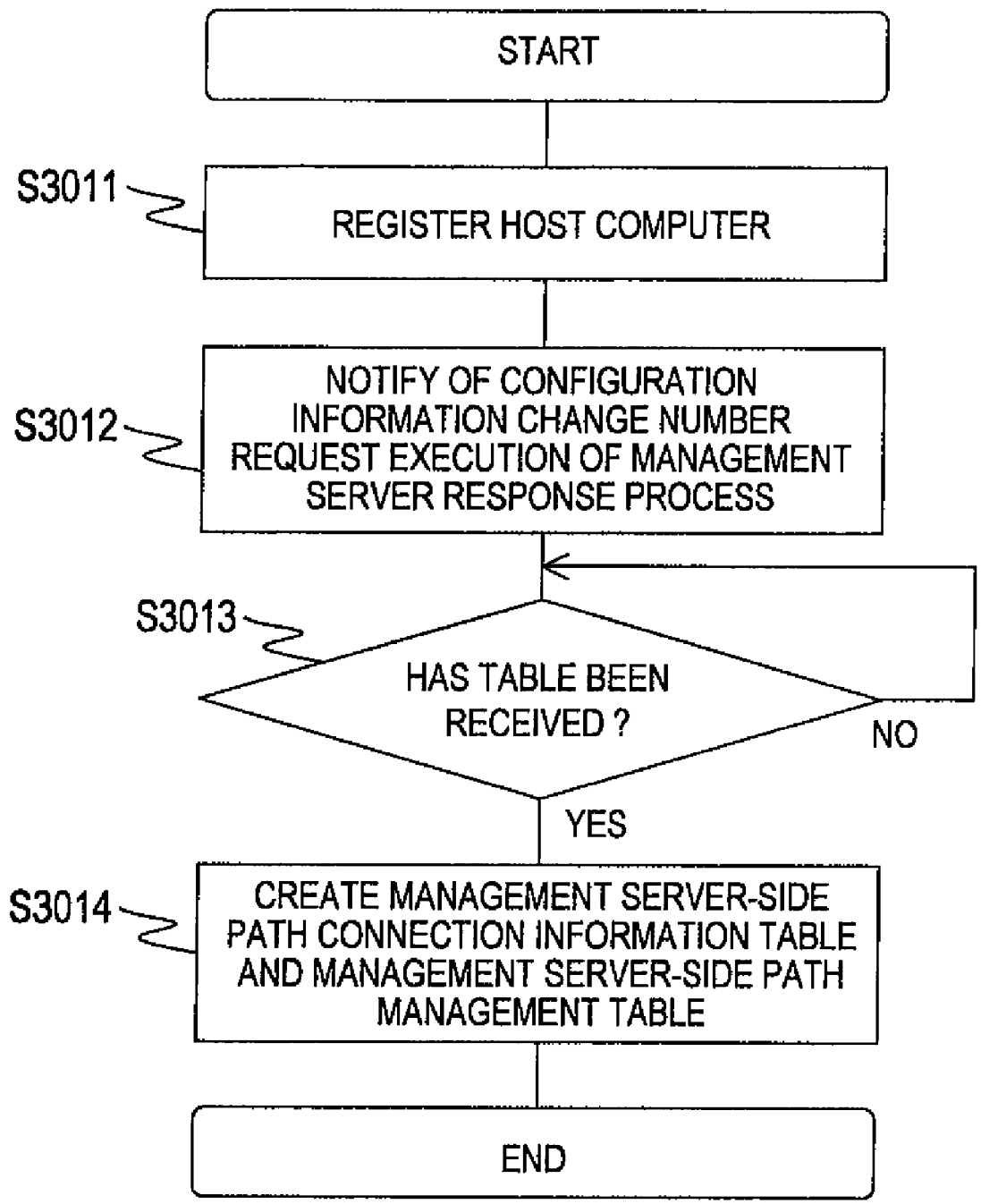
FIG. 25 is a flowchart of the host registration process executed by the management server according to the second embodiment of this invention.

FIG. 25 is a flowchart of the host registration process executed by the management server 30 according to the second embodiment of this invention.

The host registration process is executed in Step S3002 of the process at the time of introduction of the management server as shown in FIG. 24.

The management server administrator selects the host computer 10 to be managed by the management server 30. Then, the management server 30 registers the host computer 10 selected by the management server administrator as a target to be managed (S3011). In this step, the management server 30 registers all the host computers 10 included in the computer system according to the second embodiment as targets to be managed.

Next, the management server 30 notifies all the host computers 10 of "1" corresponding to the configuration information change number assigned to the time of introduction of the management server 30. Further, the management server 30 requests all the host computers 10 to execute a management server response process (S3012).

Upon reception of the request from the management server 30, each of the host computers 10 executes the management server response process. In this process, each of the host computers 10 transmits the host-side path connection information table 121 and the host-side path management table 124 to the management server 30. The details of the management server response process will be described with reference to FIG. 26.

On the other hand, the management server 30 judges whether or not the host-side path connection information table 121 and the host-side path management table 124 have been received from all the host computers 10 (S3013).

In the case where the host-side path connection information table 121 and the host-side path management table 124 have not been received from all the host computers 10, the management server 30 waits until the host-side path connection information table 121 and the host-side path management table 124 are received from all the host computers 10.

On the other hand, in the case where the host-side path connection information table 121 and the host-side path management table 124 have been received from all the host computers 10, the management server 30 creates the management server-side path connection information table 321 based on the received host-side path connection information table 121.

To be specific, the management server 30 specifies an identifier of the host computer 10 which has transmitted the host-side path connection information table 121. Next, the management server 30 stores the specified identifier of the host computer 10 in the host name 3219 of the management server-side path connection information table 321.

Further, the management server 30 stores the configuration information change number 1211 of the received host-side path connection information table 121 in the configuration information change number 3211 of the management server-side path connection information table 321. Next, the management server 30 stores the path ID 1212 of the received host-side path connection information table 121 in the path ID 3212 of the management server-side path connection information table 321. Then, the management server 30 stores the HBA name 1213 of the received host-side path connection information table 121 in the HBA name 3213 of the management server-side path connection information table 321.

Subsequently, the management server 30 stores the CHA name 1214 of the received host-side path connection information table 121 in the CHA name 3214 of the management server-side path connection information table 321. Next, the management server 30 stores the CHA port name 1215 of the received host-side path connection information table 121 in the CHA port name 3215 of the management server-side path connection information table 321.

Subsequently, the management server 30 stores the LUN 1216 of the received host-side path connection information table 121 in the LUN 3216 of the management server-side path connection information table 321. Next, the management server 30 stores the disk name 1217 of the received host-side path connection information table 121 in the disk name 3217 of the management server-side path connection information table 321. Then, the management server 30 stores the identical path ID 1218 of the received host-side path connection information table 121 in the identical path ID 3218 of the management server-side path connection information table 321.

Next, the management server 30 creates the management server-side path management table 324 based on the received host-side path management table 124 (S3014).

To be specific, the management server 30 specifies an identifier of the host computer 10 which has transmitted the host-side path management table 124. Next, the management server 30 stores the specified identifier of the host computer 10 in the host name 3243 of the management server-side path management table 324.

Next, the management server 30 stores the path ID 1241 of the received host-side path management table 124 in the path ID 3241 of the management server-side path management table 324. Further, the management server 30 stores the status 1242 of the received host-side path management table 124 in the status 3242 of the management server-side path management table 324.

After creating the management server-side path connection information table 321 and the management server-side path management table 324, the management server 30 terminates the host registration process.

Figure 26:
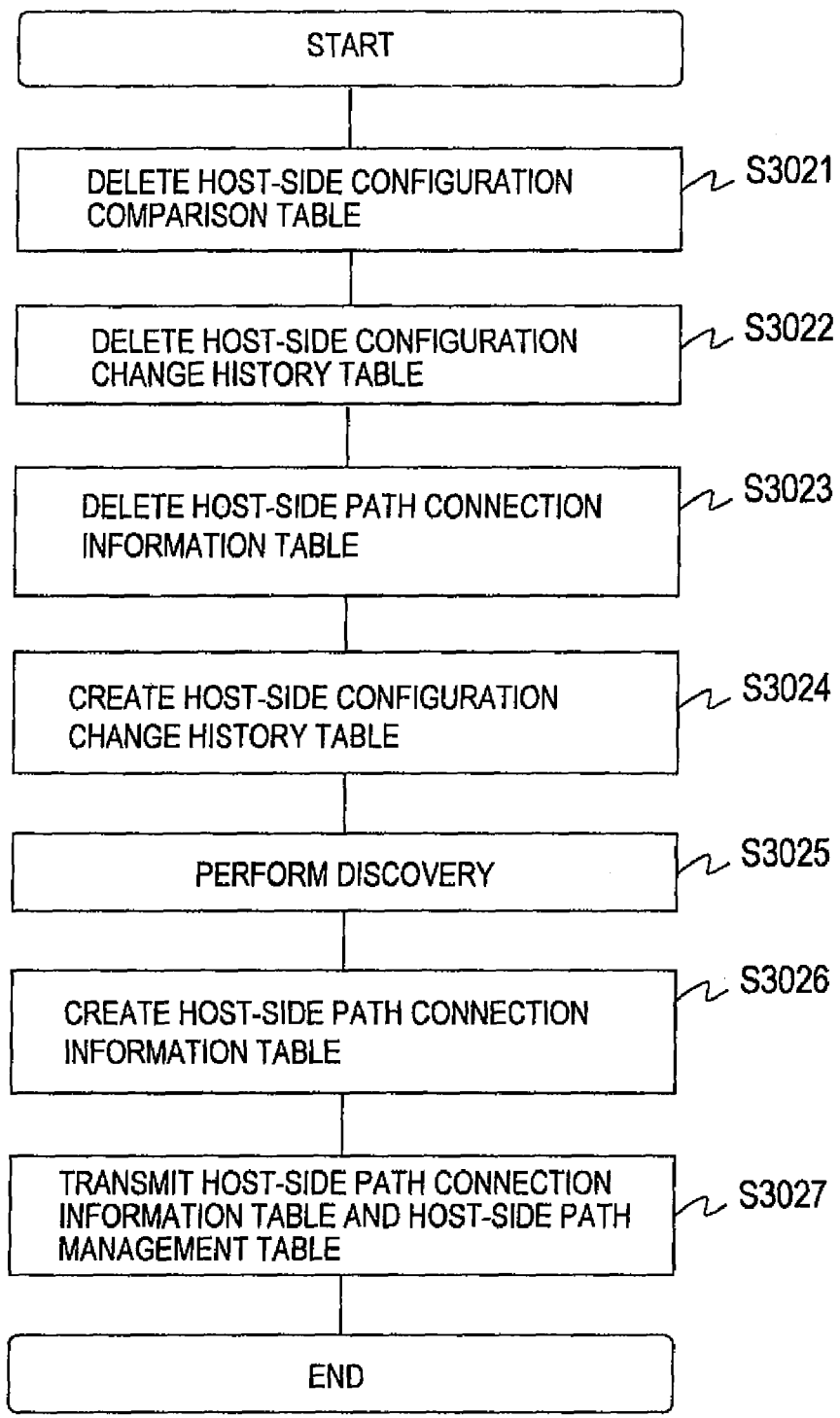
FIG. 26 is a flowchart of the management server response process executed by the host computer according to the second embodiment of this invention.

FIG. 26 is a flowchart of the management server response process executed by the host computer 10 according to the second embodiment of this invention.

Upon reception of the request in Step S3012 of the host registration process shown in FIG. 25, the host computer 10 executes the management server response process.

First, in the case where the host computer 10 stores the host-side configuration comparison table 122, the host computer 10 deletes the host-side configuration comparison table 122 (S3021). In the same way, in the case where the host computer 10 stores the host-side configuration change history table 123, the host computer 10 deletes the host-side configuration change history table 123 (S3022). In the same way, in the case where the host computer 10 stores the host-side path connection information table 121, the host computer 10 deletes the host-side path connection information table 121 (S3023).

Next, the host computer 10 creates the new host-side configuration change history table 123 (S3024). To be specific, the host computer 10 stores "1" corresponding to the configuration information change number notified by the management server 30 in the configuration information change number 1231 of the host-side configuration change history table 123. Next, the host computer 10 stores the current date and time in the date/time 1232 of the host-side configuration change history table 123.

As a result, the host computer 10 assigns "1" corresponding to the configuration information change number to the time of introduction of the management server 30.

Next, the host computer 10 performs discovery of the storage system 20 (S3025).

To be specific, the host computer 10 uses each of the HBAs 14 included in the host computer 10 to transmit a discovery request. Then, the host computer 10 receives the result of discovery from the storage system 20. The result of discovery contains an identifier of the path passing through the HBA 14 used for transmitting the discovery request, an identifier of the CHA 21 through which the path passes, an identifier of the CHA port 24 through which the path passes, an identifier of the LU 25 through which the path passes, an identifier of the physical disk constituting the LU 25, and the like.

Next, the host computer 10 creates the host-side path connection information table 121 (S3026).

To be specific, the host computer 10 stores "1" corresponding to the configuration information change number notified by the management server 30 in the configuration information change number 1211 of the host-side path connection information table 121. Next, the host computer 10 stores the identifier of the path contained in the received result of discovery in the path ID 1212 of the host-side path connection information table 121.

Next, the host computer 10 stores the identifier of the HBA 14 used for transmitting the discovery request in the HBA name 1213 of the host-side path connection information table 121. Next, the host computer 10 stores the identifier of the CHA 21 contained in the received result of discovery in the CHA name 1214 of the host-side path connection information table 121. Next, the host computer 10 stores the identifier of the CHA port 24 contained in the received result of discovery in the CHA port name 1215 of the host-side path connection information table 121.

Next, the host computer 10 stores the identifier of the LU 25 contained in the received result of discovery in the LUN 1216 of the host-side path connection information table 121. Next, the host computer 10 stores the identifier of the physical disk contained in the received result of discovery in the disk name 1217 of the host-side path connection information table 121.

The host computer 10 may update the host-side path management table 124 based on the result of discovery.

Next, the host computer 10 transmits the stored host-side path management table 124 and the created host-side path connection information table 121 to the management server 30. Then, the host computer 10 terminates the management server response process.

Figure 27:
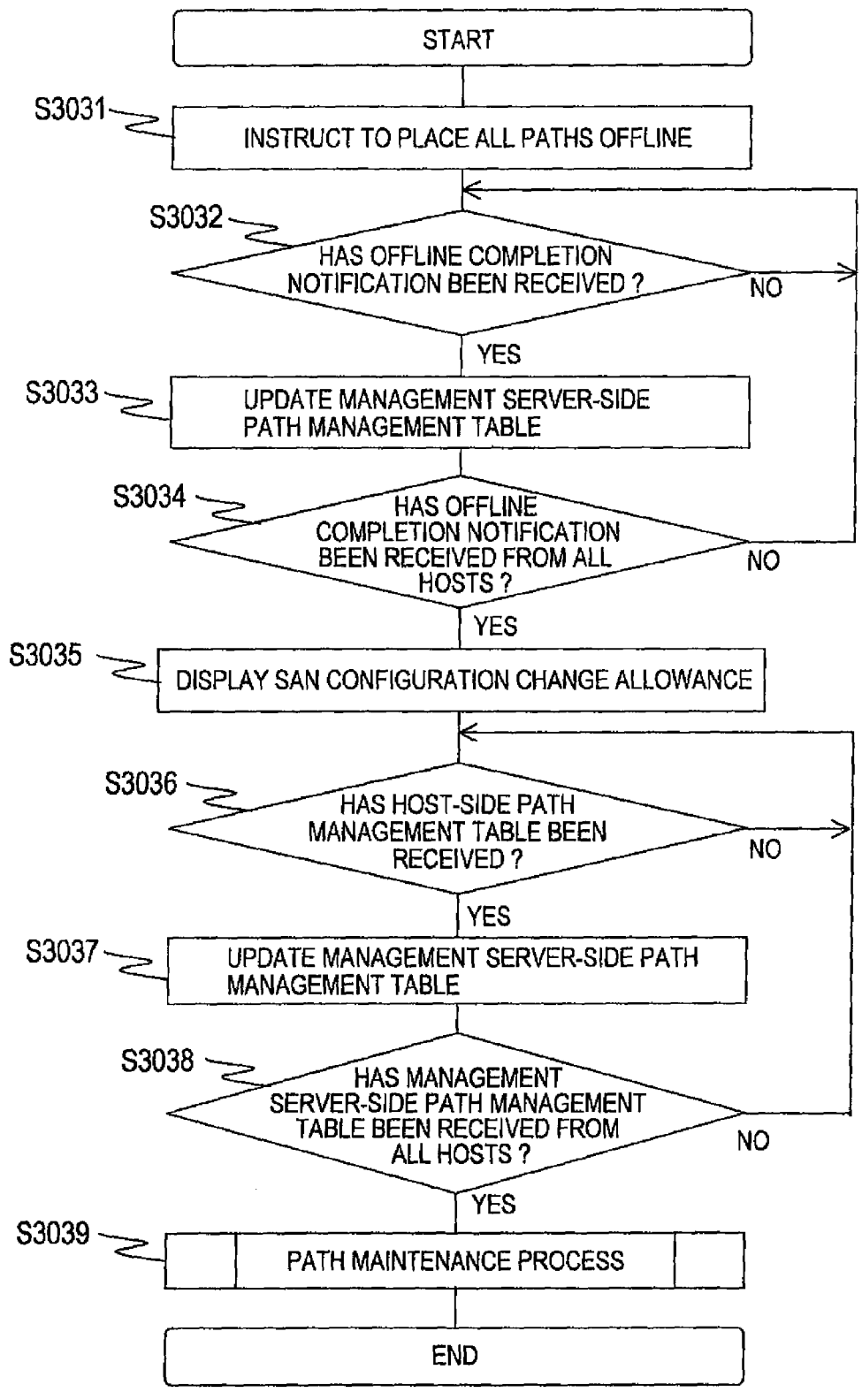
FIG. 27 is a flowchart of a SAN configuration change process executed by the management server according to the second embodiment of this invention.

FIG. 27 is a flowchart of a SAN configuration change process executed by the management server 30 according to the second embodiment of this invention.

When the SAN configuration is changed by the management server administrator, the management server 30 executes the SAN configuration change process. For example, when a SAN configuration change allowance request is inputted by the management server administrator, the management server 30 executes the SAN configuration change process.

First, the management server 30 instructs all the host computers 10 to place all the paths offline (S3031).

Then, the host computer 10 updates the host-side path management table 124. To be specific, the host computer 10 stores "offline" in the status 1242 in all the records contained in the host-side path management table 124. As a result, the host computer 10 blocks all the paths.

Then, after blocking all the paths, the host computer 10 transmits an offline completion notification to the management server 30.

The management server 30 judges whether or not the offline completion notification has been received from any of the host computers 10 (S3032). In the case where the offline completion notification has not been received, the management server 30 waits for reception of the notification.

On the other hand, upon reception of the offline completion notification, the management server 30 updates the management server-side path management table 324 (S3033). To be specific, the management server 30 specifies an identifier of the host computer 10 which has transmitted the offline completion notification. Next, the management server 30 selects all the records, each including the host name 3243 which is identical with the specified identifier of the host computer 10, from the management server-side path management table 324. Next, the management server 30 stores "offline" in the status 3242 in each of the selected records.

Subsequently, the management server 30 judges whether or not the offline completion notification has been received from all the host computers 10 (S3034). In the case where the offline completion notification has not been received from all the host computers 10, the management server 30 returns to Step S3032. Then, the management server 30 repeats the process in Steps 3032 to 3034 until the offline completion notification is received from all the host computers 10.

On the other hand, when the offline completion notification is received from all the host computers 10, the management server 30 notifies the management server administrator of the allowance for a SAN configuration change. For example, the management server 30 displays the SAN configuration change allowance on the display section (S3035). Upon notification of the SAN configuration change allowance, the management server administrator changes the SAN configuration. For example, the management server administrator replaces the fibre channel switch 40 constituting the SAN.

Then, when the SAN configuration change is completed, the host computer 10 executes the discovery execution process. As a result, the host computer 10 transmits the host-side path management table 124 to the management server 30. The details of the discovery execution process will be described with reference to FIG. 28.

On the other hand, the management server 30 judges whether or not the host-side path management table 124 has been received from any of the host computers 10 (S3036). In the case where the management server 30 has not received the host-side path management table 124, the management server 30 waits for reception of the table.

On the other hand, upon reception of the host-side path management table 124, the management server 30 updates the management server-side path management table 324 based on the received host-side path management table 124 (S3037).

To be specific, the management server 30 specifies the host computer 10 which has transmitted the host-side path management table 124. Next, the management server 30 selects all the records, each including the host name 3243 which is identical with an identifier of the specified host computer 10, from the management server-side path management table 324. Next, the management server 30 stores the path ID 1241 of the received host-side path management table 124 in the path ID 3241 of the selected record. Next, the management server 30 stores the status 1242 of the received host-side path management table 124 in the status 3242 of the selected record.

Next, the management server 30 judges whether or not the host-side path management table 124 has been received from all the host computers 10 (S3038). In the case where the management server 30 has not received the host-side path management table 124 from all the host computers 10, the management server 30 returns to Step S3036. Then, the management server 30 repeats the process in Steps S3036 to S3038 until the reception of the host-side path management table 124 from all the host computers 10.

On the other hand, in the case where the host-side path management table 124 has been received from all the host computers 10, the management server 30 executes the path maintenance process (S3039). The details of the path maintenance process will be described with reference to FIG. 28. Then, the management server 30 terminates the SAN configuration change process.

Figure 28:
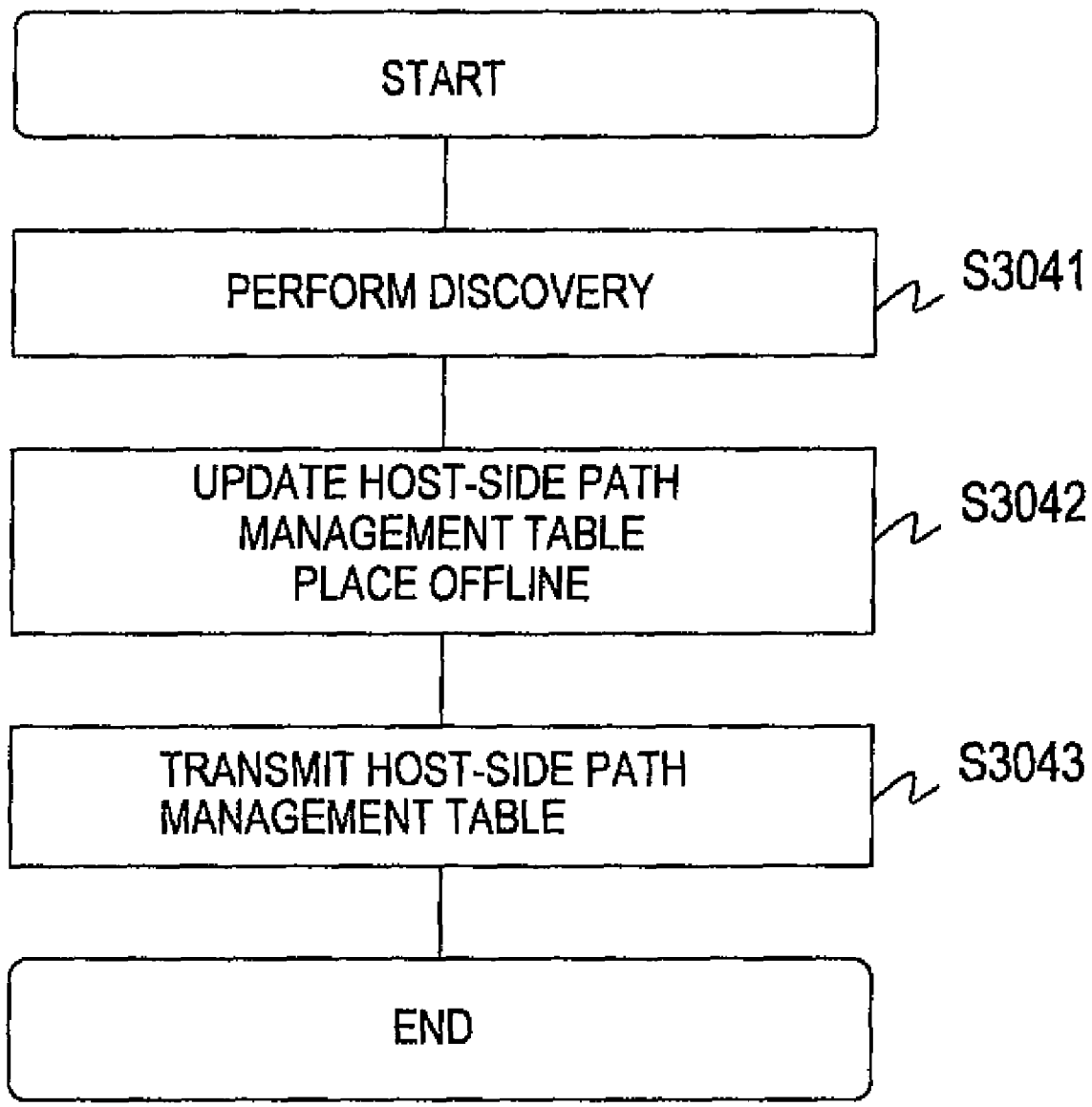
FIG. 28 is a flowchart of the discovery execution process executed by the host computer according to the second embodiment of this invention.

FIG. 28 is a flowchart of the discovery execution process executed by the host computer 10 according to the second embodiment of this invention.

Upon detection of the change of the SAN configuration after Step S3035 in the SAN configuration change process shown in FIG. 27, the host computer 10 executes the discovery execution process. The host computer 10 also executes the discovery execution process upon detection of the change of the SAN configuration after Step 3061 of the path maintenance process shown in FIG. 29.

First, the host computer 10 performs discovery of the storage system 20 (S3041). Next, the host computer 10 updates the host-side path management table 124 based on the result of discovery. Further, the host computer 10 places all the paths offline (S3042). Since Steps S3041 and S3042 are the same as Steps S1031 and S1032 of the discovery execution process according to the first embodiment shown in FIG. 9, the detailed description thereof is herein omitted.

Next, the host computer 10 transmits the updated host-side path management table 124 to the management server 30 (S3043). Then, the host computer 10 terminates the discovery execution process.

Figure 29:
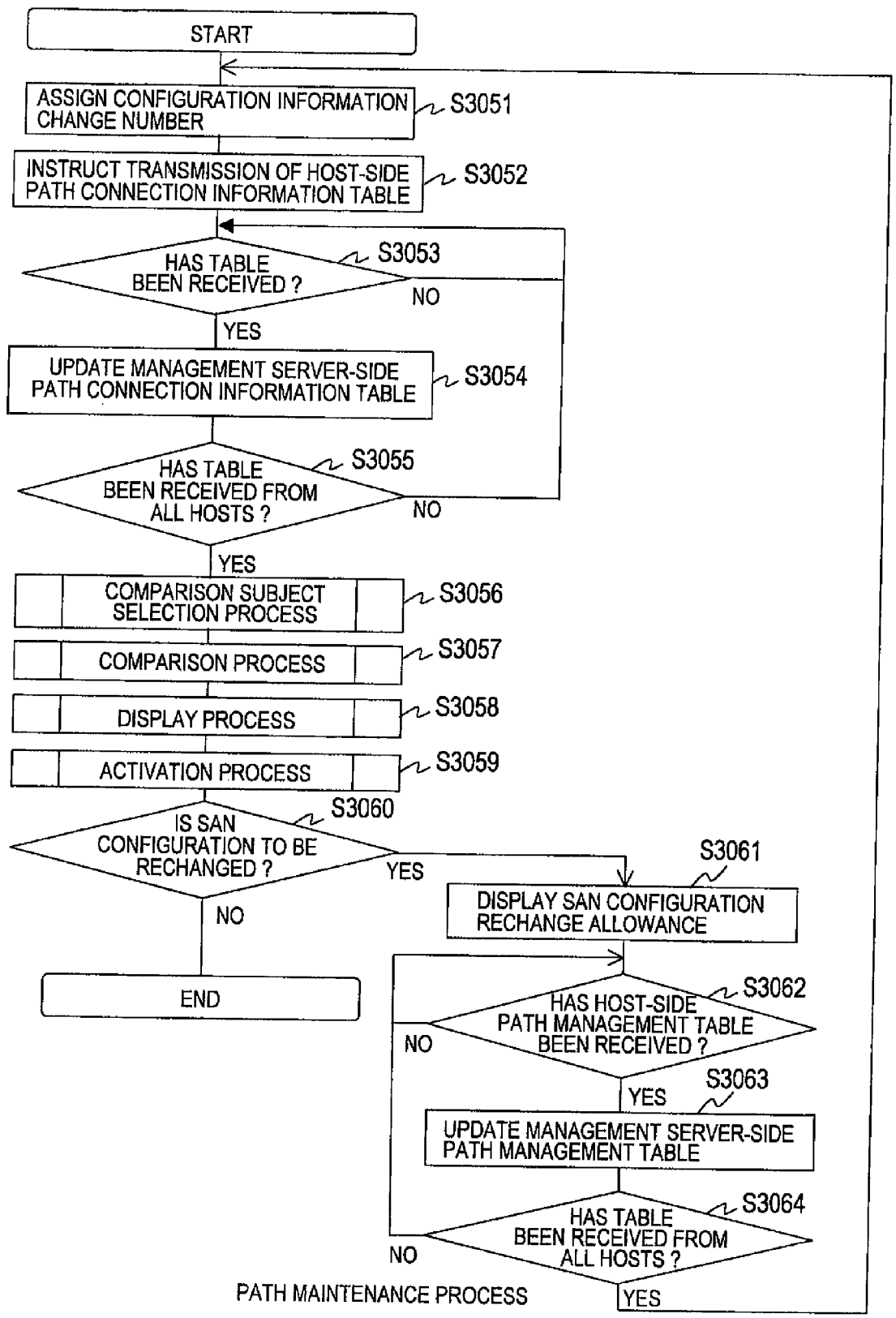
FIG. 29 is a flowchart of the path maintenance process executed by the management server according to the second embodiment of this invention.

FIG. 29 is a flowchart of the path maintenance process executed by the management server 30 according to the second embodiment of this invention.

The path maintenance process is executed in Step 3039 of the SAN configuration change process shown in FIG. 27.

First, the management server 30 extracts the largest value from the configuration information change number 3231 of the management server-side configuration change history table 323. Then, the management server 30 adds "1" to the extracted largest value.

Next, the management server 30 assigns the result of addition to the current date and time as the configuration information change number (S3051). To be specific, the management server 30 assigns the result of addition to the time of change of the SAN configuration as the configuration information change number.

Next, the management server 30 updates the management server-side configuration change history table 323. To be specific, the management server 30 creates a new record in the management server-side configuration change history table 323. Next, the management server 30 stores the result of addition in the configuration information change number 3231 of the new record. Then, the management server 30 stores the current date and time in the date/time 3232 of the new record.

Subsequently, the management server 30 notifies all the host computers 10 of the configuration information change number assigned to the current date and time. Further, the management server 30 instructs all the host computers 10 to transmit the host-side path connection information table 121 (S3052).

Upon receiving an instruction of transmission of the host-side path connection information table 121, each of the host computers 10 performs an update information transmission process. In this process, each of the host computers 10 transmits the host-side path connection information table 121 to the management server 30.

The management server 30 judges whether or not the host-side path connection information table 121 has been received from any of the host computers 10 (S3053). In the case where the host-side path connection information table 121 has not been received yet, the management server 30 waits for reception.

On the other hand, upon reception of the host-side path connection information table 121, the management server 30 updates the management server-side path connection information table 321 based on the received host-side path connection information table 121 (S3054). To be specific, the management server 30 updates the management server-side path connection information table 321 by the same process as that in Step S3014 of the host registration process shown in FIG. 25.

Next, the management server 30 judges whether or not the host-side path connection information table 121 has been received from all the host computers 10 (S3055). In the case where the host-side path connection information table 121 has not been received from all the host computers 10, the management server 30 returns to Step S3053. Then, the management server 30 repeats the process in Steps S3053 to S3055 until the host-side path connection information table 121 is received from all the host computers 10.

On the other hand, in the case where the host-side path connection information table 121 has been received from all the host computers 10, the management server 30 executes a comparison subject selection process (S3056). In this process, the management server 30 determines the host computer 10 to be compared, the configuration information change number to be a comparison source, and the configuration information change number to be a comparison target. The details of the comparison subject selection process will be described with reference to FIG. 31.

Next, the management server 30 executes a comparison process (S3057). In this process, the management server 30 grasps correlations between the paths existing at the time corresponding to the configuration information change number determined as the comparison source (the comparison source paths) and those existing at the time corresponding to the configuration information change number determined as the comparison target (the comparison target paths). The details of the comparison process will be described with reference to FIG. 32.

Next, the management server 30 executes the display process (S3058). The details of the display process will be described with reference to FIG. 33. By performing the display process, the management server 30 displays the path information screen. The path information screen contains information regarding the comparison source paths and information regarding the comparison target paths. The details of the path information screen will be described with reference to FIG. 34.

The management server administrator refers to the displayed path information screen to determine whether or not to place the path online. The management server administrator can determine whether or not to place the path online for each path. The management server administrator designates the path to be placed online to input a path online request to the management server 30.

Further, the management server administrator refers to the displayed path information screen to determine whether or not to rechange the SAN configuration. Then, when the SAN configuration is to be rechanged, the management server administrator inputs a SAN configuration rechange allowance request to the management server 30.

Next, the management server 30 executes the activation process (S3059). In this process, the management server 30 places the path designated by the management server administrator online. The details of the activation process will be described with reference to FIG. 38.

Next, the management server 30 judges whether or not the SAN configuration rechange allowance has been requested by the management server administrator (S3060). When the SAN configuration rechange allowance is not requested, the management server 30 terminates the path maintenance process.

On the other hand, when the SAN configuration rechange allowance is requested, the management server 30 allows the SAN configuration to be rechanged (S3061). To be specific, the management server 30 displays a SAN configuration rechange allowance.

Then, the management server administrator rechanges the SAN configuration. Upon completion of the change of the SAN configuration, the host computer 10 executes the discovery execution process shown in FIG. 28. In this process, the host computer 10 transmits the host-side path management table 124 to the management server 30.

On the other hand, the management server 30 judges whether or not the host-side path management table 124 has been received from any of the host computers 10 (S3062). In the case where the host-side path management table 124 has not been received yet, the management server 30 waits for reception of the table.

On the other hand, upon reception of the host-side path management table 124, the management server 30 updates the management server-side path management table 324 based on the received host-side path management table 124 (S3063). To be specific, the management server 30 updates the management server-side path management table 324 by the same process as that in Step S3037 of the SAN configuration change process shown in FIG. 27.

Next, the management server 30 judges whether or not the path management table 124 has been received from all the host computers 10 (S3064). In the case where the host-side path management table 124 has not been received from all the host computers 10, the management server 30 returns to Step S3062. Then, the management server 30 repeats the process in Steps S3062 to S3064 until the management server 30 receives the host-side path management table 124 from all the host computers 10.

On the other hand, when the management server 30 receives the host-side path management table 124 from all the host computers 10, the management server 30 returns to Step S3051. By this process, the host computer 10 repeats the path maintenance process for the rechanged SAN configuration.

Figure 30:
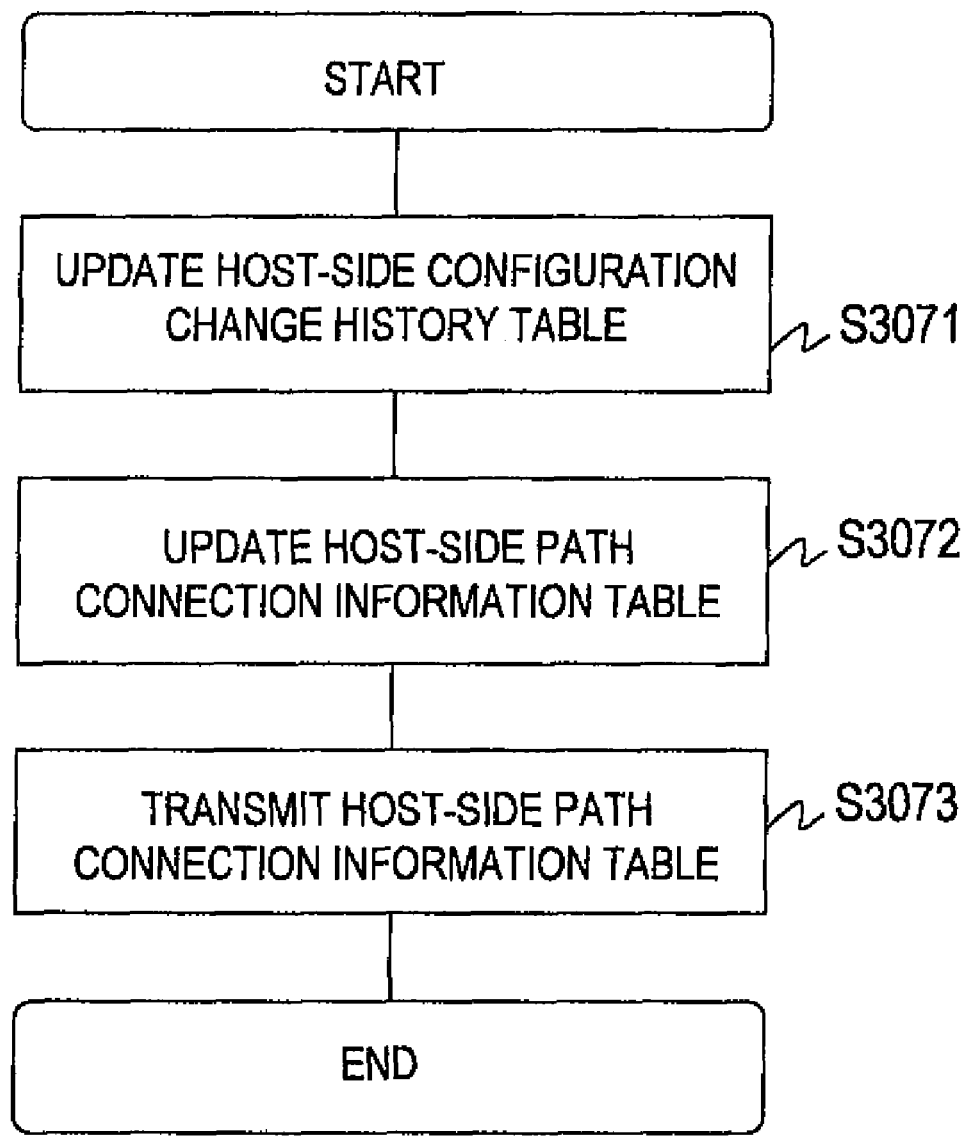
FIG. 30 is a flowchart of the update information transmission process executed by the host computer according to the second embodiment of this invention.

FIG. 30 is a flowchart of the update information transmission process executed by the host computer 10 according to the second embodiment of this invention.

Upon instruction of transmission of the host-side path connection information table 121 in Step S3052 of the path maintenance process shown in FIG. 29, the host computer 10 executes the update information transmission process.

First, the host computer 10 updates the host-side configuration change history table 123 (S3071). To be specific, the host computer 10 creates a new record in the host-side configuration change history table 123. Next, the host computer 10 stores the configuration information change number notified from the management server 30 in the configuration information change number 1231 of the new record. Next, the host computer 10 stores the current date and time in the date/time 1232 of the new record.

In this manner, the host computer 10 assigns the configuration information change number to the time when the SAN configuration is changed.

Next, the host computer 10 updates the host-side path connection information table 121 based on the result of discovery received in the discovery execution process shown in FIG. 28 and the like (S3072). To be specific, the host computer 10 updates the host-side path connection information table 121 by the same process as that in Step S1042 of the path maintenance process shown in FIG. 10 according to the first embodiment.

Next, the host computer 10 transmits the updated host-side path connection information table 121 to the management server 30. Then, the host computer 10 terminates the update information transmission process.

Figure 31:
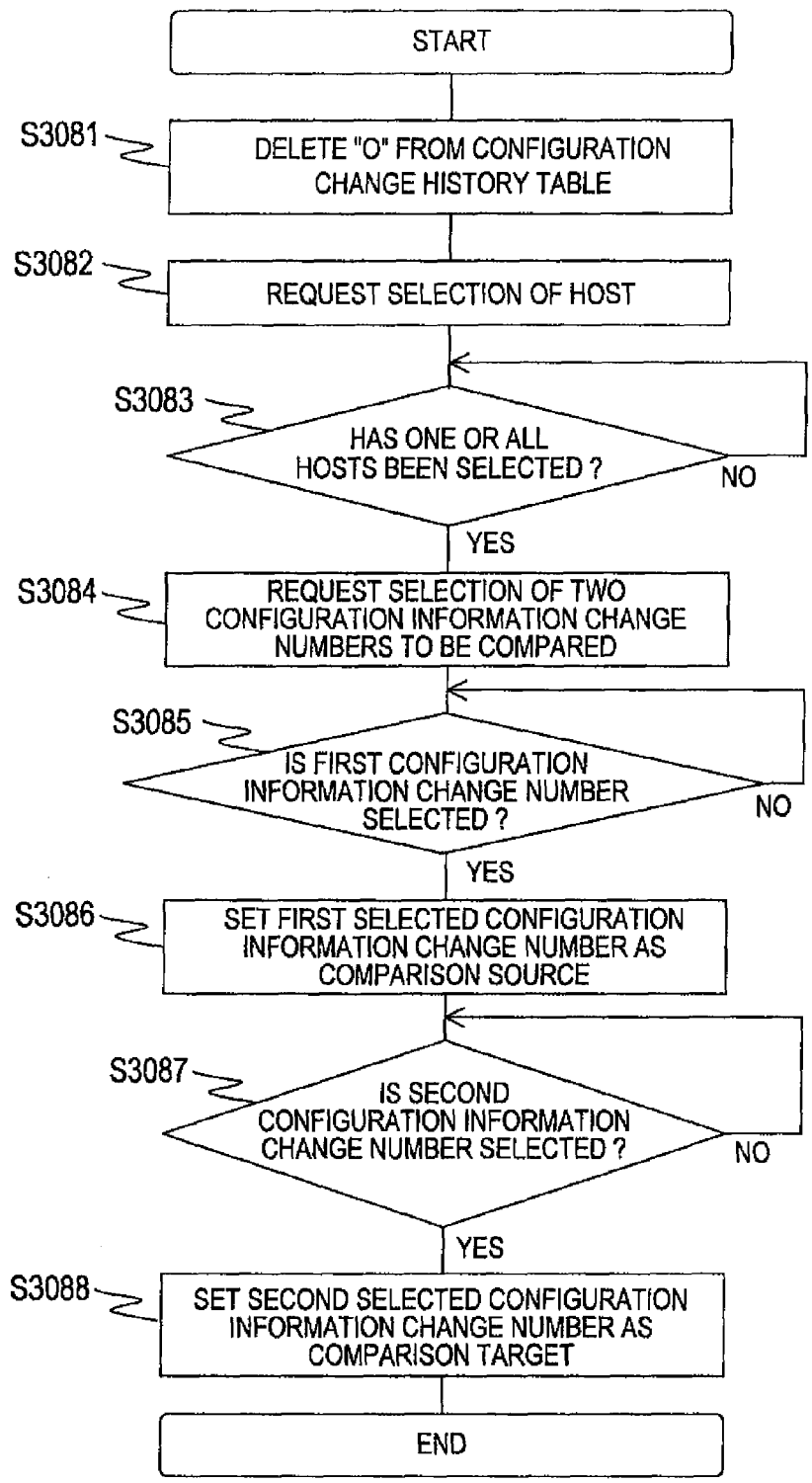
FIG. 31 is a flowchart of the comparison subject selection process executed by the management server according to the second embodiment of this invention.

FIG. 31 is a flowchart of the comparison subject selection process executed by the management server 30 according to the second embodiment of this invention.

The comparison subject selection process is executed in Step S3056 of the path maintenance process shown in FIG. 29.

First, the management server 30 deletes all the signs "O" from the comparison source 3222 and the comparison target 3223 in the management server-side configuration comparison table 322 (S3081).

Next, the management server 30 requests the management server administrator to select the host computer 10 to be compared (S3082).

The management server 30 judges whether or not one of or all the host computers 10 has (have) been selected (S3083). In the case where one of or all the host computers 10 has (have) not been selected yet, the management server 30 waits for selection.

On the other hand, in the case where one of or all the host computers 10 has (have) been selected, the management server 30 requests the management server administrator to select two configuration information change numbers to be compared (S3084). To be specific, the management server 30 displays a screen which requests the selection of two configuration information change numbers to be compared. Then, the management server administrator selects two configuration information change numbers for which the SAN configuration is desired to be compared.

In this step, the management server 30 may also display the management server-side configuration change history table 323 at the same time. As a result, the management server administrator can grasp the configuration information change numbers corresponding to the dates and times desired to be compared.

The management server 30 judges whether or not the management server administrator has selected the first configuration information change number (S3085). In the case where the first configuration information change number has not been selected yet, the management server 30 waits for selection of the first configuration information change number.

On the other hand, upon selection of the first configuration information change number, the management server 30 sets the selected first configuration information change number as the comparison source (S3086).

First, the case where one host computer 10 is selected to be compared will be described. In this case, the management server 30 selects records, each including the host name 3224 which is identical with an identifier of the host computer 10 selected to be compared, from the management server-side configuration comparison table 322. Next, the management server 30 selects the record including the configuration information change number 3221 which is identical with the selected first configuration information change number, from the selected records. Next, the management server 30 stores "O" in the comparison source 3222 of the selected record.

Next, the case where all the host computers 10 are selected to be compared will be described. In this case, the management server 30 selects all the records, each including the configuration information change number 3221 which is identical with the selected first configuration information change number, from the management server-side configuration comparison table 322. Next, the management server 30 stores "O" in the comparison source 3222 of all the selected records.

Next, the management server 30 judges whether or not the management server administrator has selected the second configuration information change number (S3087). In the case where the second configuration information change number has not been selected yet, the management server 30 waits for selection of the second configuration information change number. When the two selected configuration information change numbers are the same, the management server 30 judges that the second configuration information change number has not been selected.

Upon selection of the second configuration information change number, the management server 30 sets the selected second configuration information change number as the comparison target (S3088).

First, the case where one host computer 10 is selected as the comparison target will be described. In this case, the management server 30 selects the records, each including the host name 3224 which is identical with an identifier of the host computer 10 selected to be compared, from the management server-side configuration comparison table 322. Next, the management server 30 selects the record including the configuration information change number 3221 which is identical with the selected second configuration information change number, from the selected records. Next, the management server stores "O" in the comparison target 3223 of the selected record.

Next, the case where all the host computers 10 are selected to be compared will be described. In this case, the management server 30 selects all records, each including the configuration information change number 3221 which is identical with the selected second configuration information change number, from the management server-side configuration comparison table 322. Next, the management server 30 stores "O" in the comparison target 3223 of all the selected records.

Then, the management server 30 terminates the comparison subject selection process.

Figure 32:
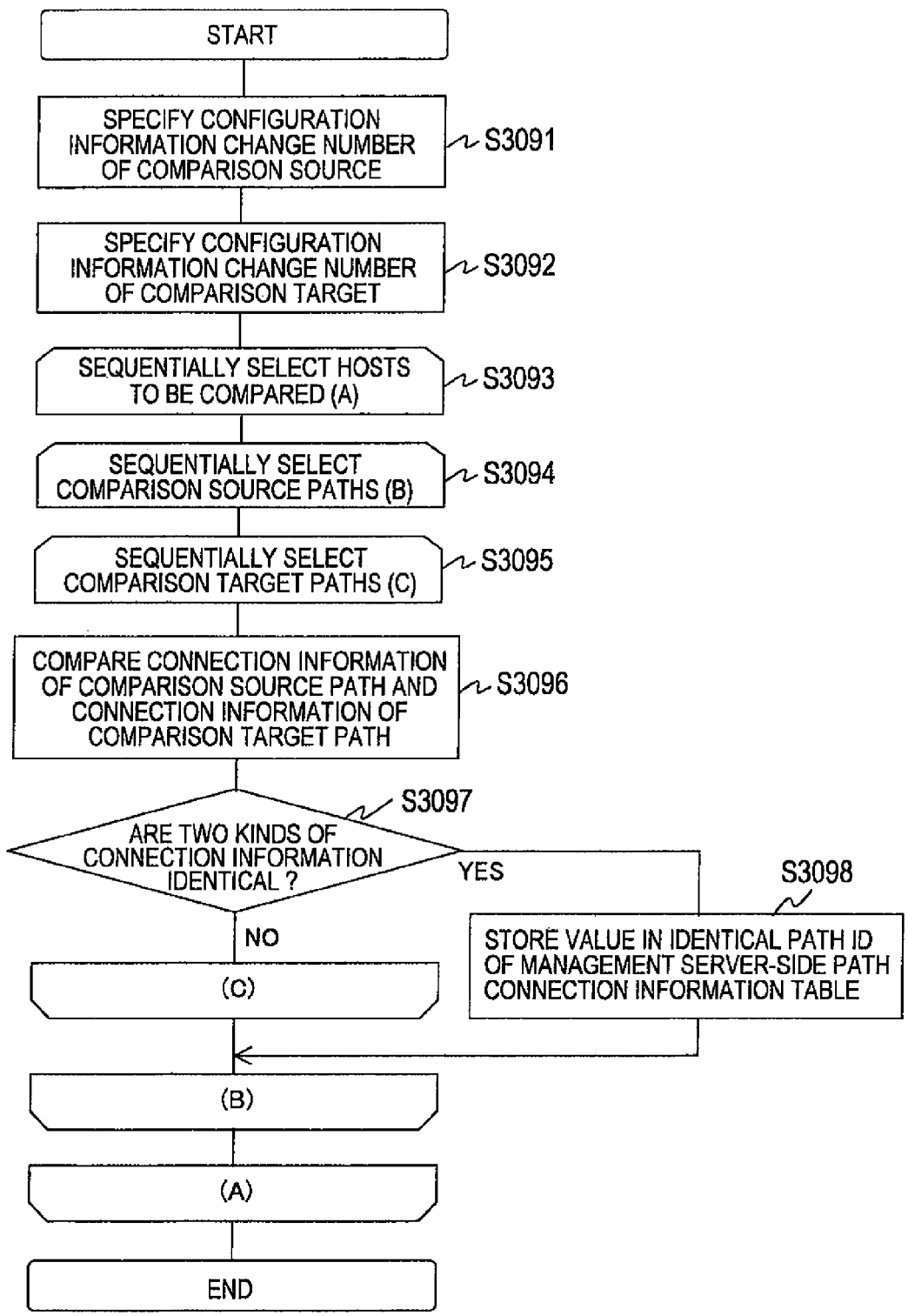
FIG. 32 is a flowchart of the comparison process executed by the management server according to the second embodiment of this invention.

FIG. 32 is a flowchart of the comparison process executed by the management server 30 according to the second embodiment of this invention.

The comparison process is executed in Step S3057 of the path maintenance process shown in FIG. 29.

First, the management server 30 specifies the configuration information change number of the comparison source (S3091). To be specific, the management server 30 selects the record including "O" stored in the comparison source 3222 from the management server-side configuration comparison table 322. Next, the management server 30 extracts the configuration information change number 3221 from the selected record. Then, the management server 30 specifies the extracted configuration information change number 3221 as the configuration information change number of the comparison source.

Next, the management server 30 specifies the configuration information change number of the comparison target (S3092). To be specific, the management server 30 selects the record including "O" stored in the comparison target 3223 from the management server-side configuration comparison table 322. Next, the management server 30 extracts the configuration information change number 3221 from the selected record. The management server 30 then specifies the extracted configuration information change number 3221 as the configuration information change number of the comparison target.

Next, the management server 30 sequentially selects the host computers 10 to be compared (S3093). To be specific, the management server 30 sequentially selects the records, each including "O" stored in the comparison source 3222 from the management server-side configuration comparison table 322. Next, the management server extracts the host name 3224 from the selected record. The management server 30 then sets the host computers 10 identified by the extracted host name 3224 as the sequentially selected host computers 10.

When the number of host computers 10 to be compared is one, the management server 30 selects the host computer 10.

Next, the management server 30 sequentially selects the paths (comparison source paths) existing at the time corresponding to the specified configuration information change number of the comparison source (S3094).

To be specific, the management server 30 selects all the records, each including the configuration information change number 3211 which is identical with the specified configuration information change number of the comparison source, from the management server-side path connection information table 321. Next, the management server 30 selects the records, each including the host name 3219 which is identical with the identifier of the host computer 10 to be compared that is selected in Step S3093, from the selected records. Next, the management server 30 sequentially selects the path IDs 3212 from the selected records. Then, the management server 30 sets the paths identified by the selected paths ID 3212 as the comparison source paths.

Next, the management server 30 executes Steps S3095 to S3098 for the selected comparison source path.

The management server 30 sequentially selects the paths (comparison target paths) existing at the time corresponding to the specified configuration information change number of the comparison target (S3095).

To be specific, the management server 30 selects all the records, each including the configuration information change number 3211 which is identical with the specified configuration information change number of the comparison target, from the host-side path connection information table 121. Next, the management server 30 selects the records, each including the host name 3219 which is identical with the selected identifier of the host computer 10 to be compared that is selected in Step S3093, from the selected records. Next, the management server 30 sequentially selects the path IDs 3212 from the selected records. Then, the management server 30 sets the paths identified by the selected path IDs 3212 as the comparison target paths.

Next, the management server 30 executes Steps S3096 to S3098 for the selected comparison target paths.

The management server 30 compares connection information of the selected comparison source path and that of the selected comparison target path (S3096). Then, the management server 30 judges whether or not the compared two connection information are the same (S3097).

To be specific, the management server 30 selects the records, each including the configuration information change number 3211 which is identical with the specified configuration information change number of the comparison source, from the management server-side path connection information table 321. Next, the management server 30 selects the records, each including the host name 3219 which is identical with the identifier of the host computer 10 to be compared that is selected in Step S3093, from the selected records.

Further, the management server 30 selects the records (records for the comparison source paths), each including the path ID 3212 which is identical with the selected identifier of the comparison source path, from the selected records. Next, the management server 30 extracts the HBA name 3213, the CHA name 3214, the CHA port name 3215, and the LUN 3216 from the record for the selected comparison source path.

Next, the management server 30 selects the records, each including the configuration information change number 3211 which is identical with the specified configuration information change number of the comparison target, from the management server-side path connection information table 321. Next, the management server 30 selects the records, each including the host name 3219 which is identical with the identifier of the host computer 10 to be compared that is selected in Step S3093, from the selected records.

Further, the management server 30 selects the records (records for the comparison target paths), each including the path ID 3212 which is identical with the selected identifier of the comparison target path, from the selected records. Next, the management server 30 extracts the HBA name 3213, the CHA name 3214, the CHA port name 3215, and the LUN 3216 from the record for the selected comparison target path.

Then, the management server 30 judges whether or not the HBA name 3213, the CHA name 3214, the CHA port name 3215, and the LUN 3216 extracted from the record for the comparison source path are respectively identical with those extracted from the record for the comparison target path.

When even any one of the HBA name 3213, the CHA name 3214, the CHA port name 3215, and the LUN 3216 differs, the management server 30 judges that the connection information of the selected comparison source path is not identical with that of the selected comparison target path.

Therefore, the management server 30 returns to Step S3095. The management server 30 selects a next comparison target path. Then, the management server 30 executes Steps S3096 to S3098 for the selected next comparison target path.

When all the comparison target paths are selected in Step S3095, the management server 30 returns to Step S3094. Then, the management server 30 selects a next comparison source path.

On the other hand, when the HBA name 3213, the CHA name 3214, the CHA port name 3215, and the LUN 3216 are all identical, the management server 30 judges that the connection information of the selected comparison source path and that of the selected comparison target path are identical with each other. Then, the management server 30 judges that the comparison source path and the comparison target path are the same path.

Therefore, the management server 30 stores the identifier of the comparison target path in the identical path ID 3218 of the record for the selected comparison source path. The management server 30 also stores the identifier of the comparison source path in the identical path ID 3218 of the record for the selected comparison target path (S3098).

Next, the management server 30 returns to Step S3094 to select a next comparison source path. The management server 30 executes Steps S3095 to S3098 for the selected comparison source path.

Then, when all the comparison source paths are selected in Step S3094, the management server 30 returns to Step S3093 to select the next host computer 10 to be compared. The management server 30 executes Steps S3094 to S3098 for the selected host computer 10 to be compared.

Then, when all the host computers 10 to be compared are selected in Step S3093, the management server 30 terminates the comparison process.

As described above, the management server 30 specifies the same path as that existing at the first time point from the paths existing at the second time point. When all the components through which the paths pass are the same, the management server 30 judges that the two paths are the same.

Figure 33:
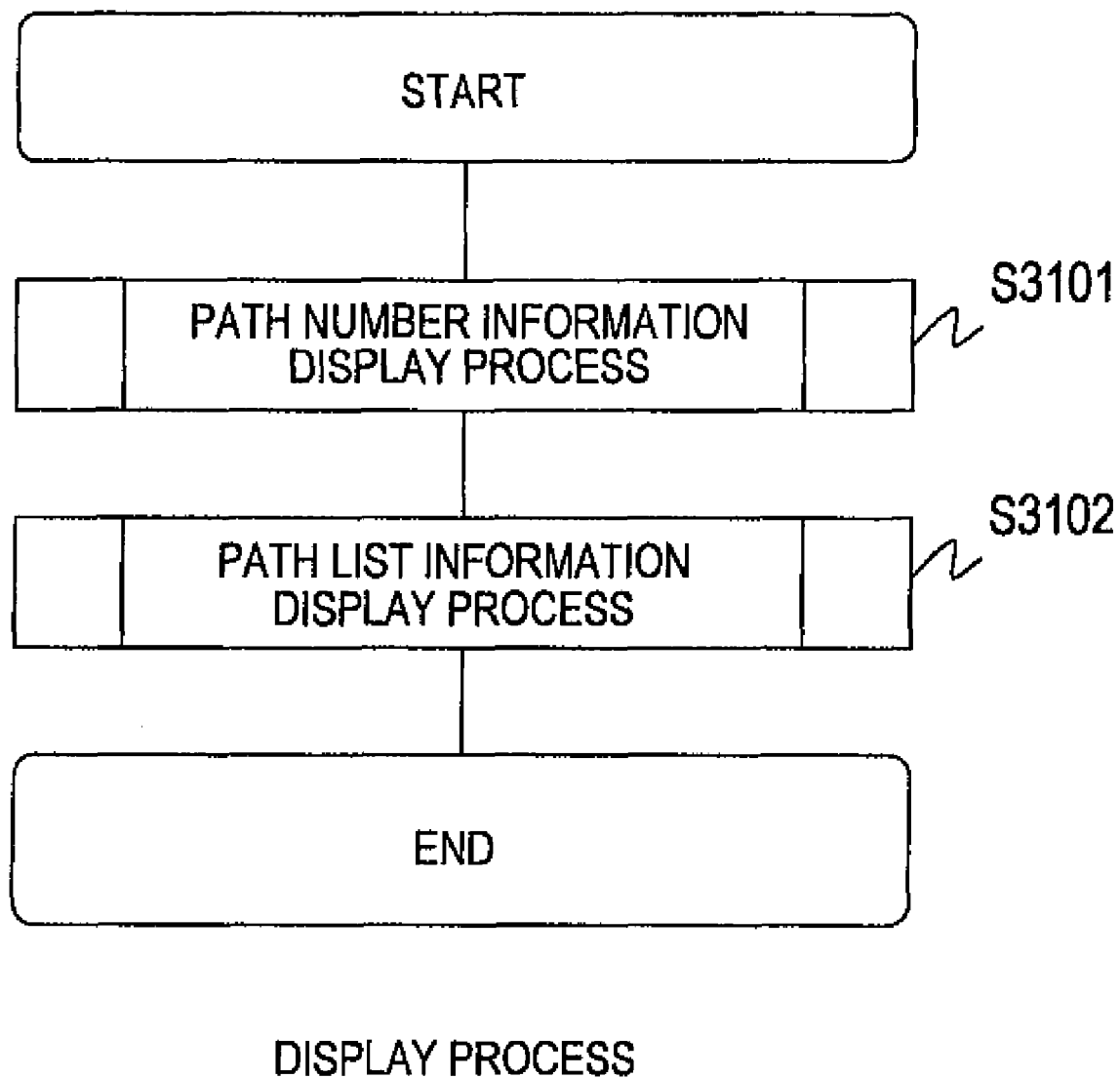
FIG. 33 is a flowchart of the display process executed by the management server according to the second embodiment of this invention.

FIG. 33 is a flowchart of the display process executed by the management server 30 according to the second embodiment of this invention.

The display process is executed in Step S3058 of the path maintenance process shown in FIG. 29.

First, the management server 30 executes the path number information display process (S3171). In this process, the management server 30 displays the number of paths passing through each of the components. The details of the path number information display process will be described with reference to FIG. 35.

Next, the management server 30 executes the path list information display process (S3172). In this process, the management server 30 displays the connection information of the path. The details of the path list information display process will be described with reference to FIG. 36.

Then, the management server 30 terminates the display process. For example, the management server 30 executes the display process to display the path information screen shown in FIG. 34.

Figure 34:
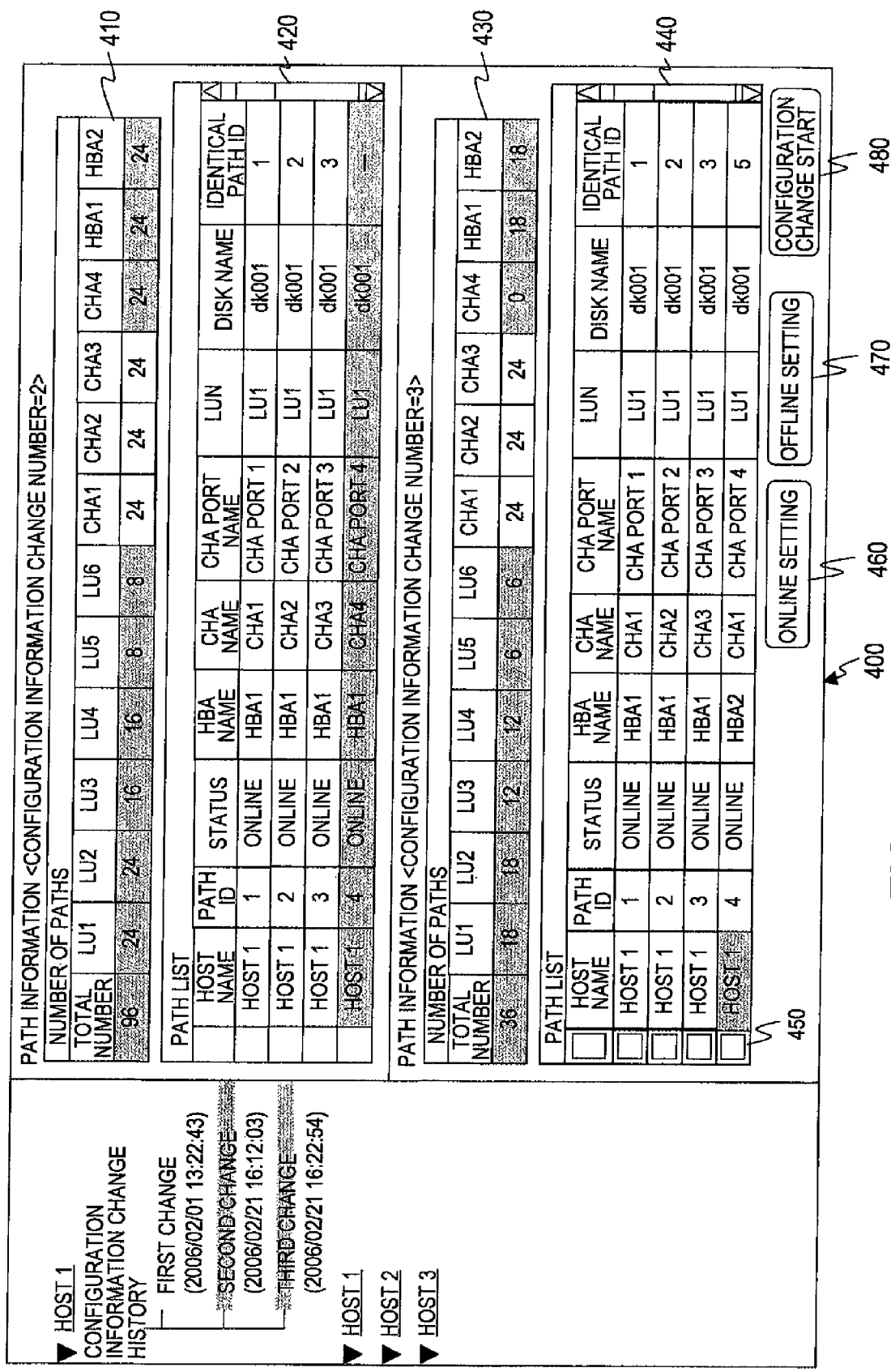
FIG. 34 is an explanatory view of a path information screen displayed on the management server according to the second embodiment of this invention.

FIG. 34 is an explanatory view of a path information screen 400 displayed on the management server 30 according to the second embodiment of this invention.

The path information screen 400 shown in this explanatory view shows the case where all the host computers 10 are selected to be compared. The path information screen 400 shown in this explanatory view also shows the case where the configuration information change number "2" is selected as the comparison source and the configuration information change number "3" is selected as the comparison target.

The path information screen 400 contains information regarding the comparison source path and information regarding the comparison target path.

The information regarding the comparison source path contains path number information 410 and path list information 420.

The path number information 410 contains a total number of paths (comparison source paths) existing at the time corresponding to the configuration information change number of the comparison source. The path number information 410 further contains the number of paths passing through each of the components. To be specific, the path number information 410 contains the number of comparison source paths passing through each of the LUs 25, the number of comparison source paths passing through each of the CHAs 21, and the number of comparison source paths passing through each of the HBAs 14.

In the path number information 410, information regarding the component, for which the number of passing comparison source paths and the number of passing comparison target paths differ from each other, is displayed in an emphasized manner. In the path number information 410 in this explanatory view, the numbers of comparison source paths passing through "LU1", "LU2", "LU3", "LU4", "LU5", "LU6", "CHA4", "HBA1", and "HBA2" are displayed in an emphasized manner.

The path list information 420 contains records for the comparison source paths in the management server-side path connection information table 321. The path list information 420 also contains the status of the comparison source path. The status of the comparison source path indicates whether or not the comparison source path is blocked.

In the path list information 420, the record including the identical path ID which does not store any value is displayed in an emphasized manner. In the path list information 420 in this explanatory view, the record for the path identified by the path ID "4" is displayed in an emphasized manner.

The path list information 420 may contain exclusively the records, each including the identical path ID which does not store any value or may contain exclusively the records, each including the identical path ID which stores a value.

The information for the comparison target path contains the path number information 430 and the path list information 440.

The path number information 430 contains a total number of paths (comparison target paths) existing at the time corresponding to the configuration information change number of the comparison target. The path number information 430 further contains the number of comparison target paths passing through each of the components. To be specific, the path number information 430 contains the number of comparison target paths passing through each of the LUs 25, the number of comparison target paths passing through each of the CHAs 21, and the number of comparison target paths passing through each of the HBAs 14.

In the path number information 430, information regarding the component, for which the number of passing comparison source paths and the number of passing comparison target paths differ from each other, is displayed in an emphasized manner. In the path number information 430 in this explanatory view, the numbers of comparison target paths passing through "LU1", "LU2", "LU3", "LU4", "LU5", "LU6", "CHA4", "HBA1", and "HBA2" are displayed in an emphasized manner.

The path list information 440 contains records for the comparison target paths in the management server-side path connection information table 321. The path list information 440 further contains the status of the comparison target path. The status of the comparison target path indicates whether the comparison target path is blocked or not. The path list information 440 may contain exclusively the records, each including the identical path ID that does not store any value.

In the path list information 440, the record including the identical path ID which does not store any value is displayed in an emphasized manner. In the path list information 440 in this explanatory view, there is no record to be displayed in an emphasized manner because the identical path ID in each of all the records stores a value.

The path list information 440 may contain exclusively the records, each including the identical path ID which does not store any value or may contain exclusively the records, each including the identical path ID which stores a value.

When the configuration information change number of the comparison source is the largest value, the information regarding the comparison source path further contains a check box 450, an online setting button 460, an offline setting button 470, and a configuration change start button 480. When the configuration information change number of the comparison source is the largest value, the time corresponding to the configuration information change number of the comparison source is the latest. To be specific, the SAN configuration is not changed after the time corresponding to the configuration information change number of the comparison source.

In a similar manner, when the configuration information change number of the comparison target is the largest value, the information regarding the comparison target path further contains the check box 450, the online setting button 460, the offline setting button 470, and the configuration change start button 480. When the configuration information change number of the comparison target is the largest value, the time corresponding to the configuration information change number of the comparison target is the latest. To be specific, the SAN configuration is not changed after the time corresponding to the configuration information change number of the comparison target.

In the check box 450, the record in the path list information 420 or 440 is selected. When the online setting button 460 is operated, the management server 30 instructs the host computer 10 to place the path corresponding to the record selected in the check box 450 online. Moreover, when the offline setting button 470 is operated, the management server 30 instructs the host computer 10 to place the path corresponding to the record selected in the check box 450 offline.

When the configuration change start button 470 is operated, the management server 30 judges that the SAN configuration rechange is requested.

The management server administrator refers to the path information screen 400 displayed on the management server 30 to be able to easily judge whether or not the SAN configuration has been correctly changed.

For example, the management server administrator compares the path list information 420 and the path list information 440 with each other. By this comparison, the management server administrator can easily grasp a difference between the paths existing at the first time point and the paths existing at the second time point.

In particular, the management server administrator refers to the identical path ID contained in the path list information 420 and 440 on the path display screen 400. When a value is not stored in the identical path ID, the server administrator can grasp that the path existing at one of the time points does not exist at the other time point.

Moreover, the management server administrator refers to the path number information 410 and 430 on the path display screen to be able to easily specify an erroneous part of setting of the fibre channel switch 40.

As described above, the management server administrator refers to the path information screen 400 to easily and correctly change the SAN configuration.

Figure 35:
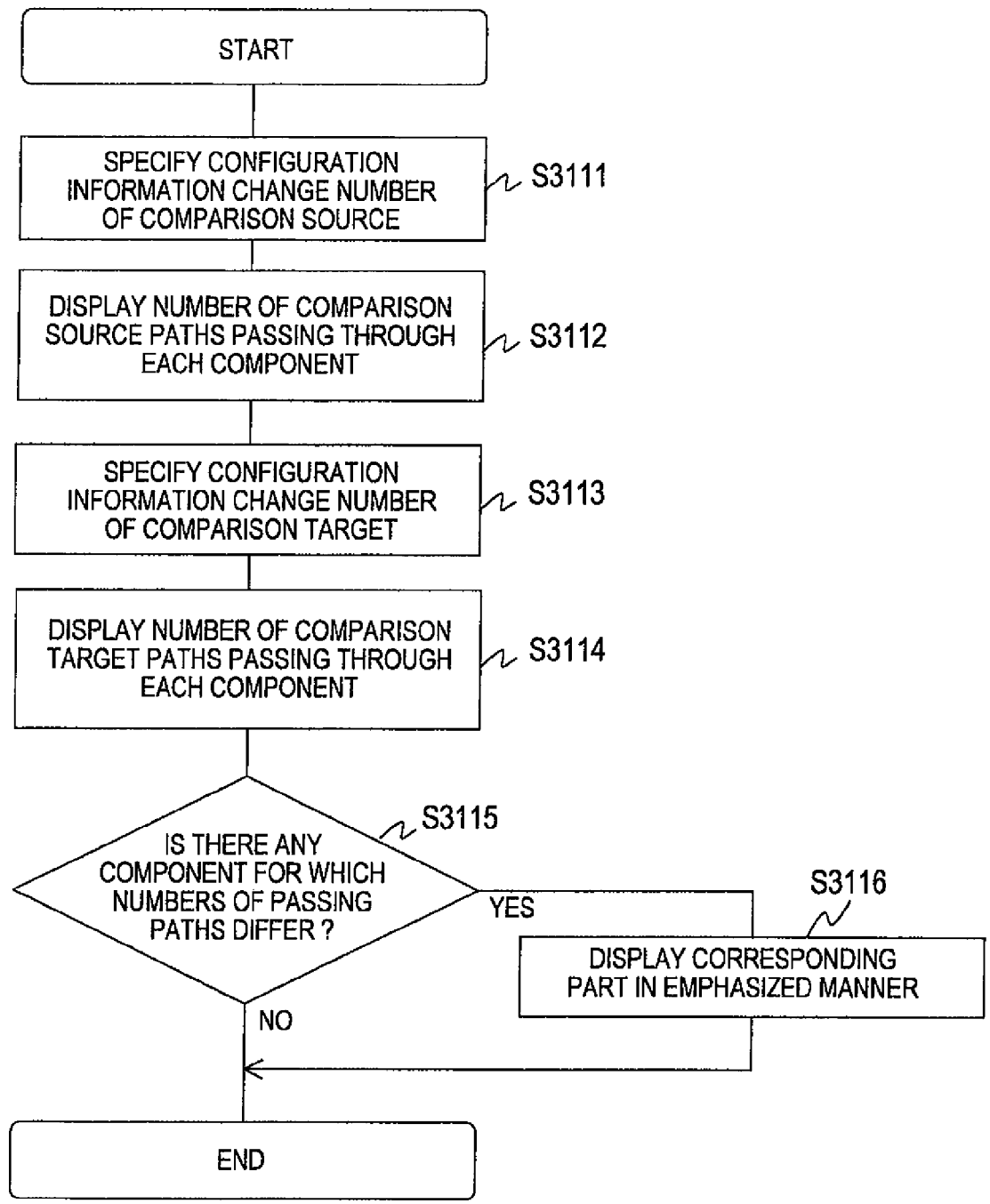
FIG. 35 is a flowchart of the path number information display process executed by the management server according to the second embodiment of this invention.

FIG. 35 is a flowchart of the path number information display process executed by the management server 30 according to the second embodiment of this invention.

The path number information display process is executed in Step S3101 of the display process shown in FIG. 33.

First, the management server 30 specifies the configuration information change number of the comparison source by the same process as that in Step S3091 of the comparison process shown in FIG. 32. Further, the management server 30 specifies the host computer 10 to be compared.

Next, the management server 30 selects all the records, each including the configuration information change number 3211 which is identical with the specified configuration information change number of the comparison source, from the management server-side path connection information table 321.

Next, the management server 30 selects the records (records for the comparison source paths), each including the host name 3219 which is identical with an identifier of the specified host computer 10 to be compared, from the selected records.

Next, the management server 30 calculates a total number of comparison source paths based on the selected records for the comparison source paths. To be specific, the host computer 10 sets the number of selected records for the comparison source paths as a total number of comparison source paths.

When all the host computers 10 are to be compared, the management server 30 selects all the records (records for the comparison source paths), each including the configuration information change number 3211 which is identical with the specified configuration information change number of the comparison source, from the management server-side path connection information table 321. Then, the management server 30 sets the number of selected records for the comparison source paths as a total number of comparison source paths.

Next, the management server 30 calculates the number of comparison source paths passing through each of the components.

To be specific, the management server 30 sequentially selects the identifiers of the LUs 25. Next, the management server 30 specifies the records, each including the LUN 3216 which is identical with the selected identifier of the LU 25, from the selected records for the comparison source paths. Then, the management server 30 sets the number of specified records as the number of comparison source paths passing through the LU 25.

In the same way, the management server 30 sequentially selects the identifiers of the CHAs 21. Next, the management server 30 specifies the records, each including the CHA name 3214 which is identical with the selected identifier of the CHA 21, from the selected records for the comparison source paths. Then, the management server 30 sets the number of specified records as the number of comparison source paths passing through the CHA 21.

In the same way, the management server 30 sequentially selects the identifiers of the HBAs 14 included in the host computer 10 to be compared. Next, the management server 30 specifies the records, each including the HBA name 3213 which is identical with the selected identifier of the HBA 14, from the selected records for the comparison source paths. Then, the management server 30 sets the number of specified records as the number of comparison source paths passing through the HBA 14.

Next, the management server 30 displays the calculated total number of comparison source paths and the number of comparison source paths passing through each of the components (S3112). By this step, the management server 30 displays the path number information 410 on the path information screen 400.

Next, the management server 30 specifies the configuration information change number of the comparison target by the same process as that in Step S3092 of the comparison process shown in FIG. 32 (S3113).

Next, the management server 30 selects all the records, each including the configuration information change number 3211 which is identical with the specified configuration information change number of the specified comparison target, from the management server-side path connection information table 321.

Next, the management server 30 selects the records (records for the comparison target paths), each including the host name 3219 which is identical with an identifier of the specified host computer 10 to be compared, from the selected records.

Next, the management server 30 calculates a total number of comparison target paths based on the selected records for the comparison target paths. To be specific, the host computer 10 sets the number of selected records for the comparison target paths as a total number of comparison target paths.

When all the host computers 10 are to be compared, the management server 30 selects all the records (records for the comparison target paths), each including the configuration information change number 3211 which is identical with the specified configuration information change number of the comparison target, from the management server-side path connection information table 321. Then, the management server 30 sets the number of selected records for the comparison target paths as a total number of comparison target paths.

Next, the management server 30 calculates the number of comparison target paths passing through each of the components.

To be specific, the management server 30 sequentially selects the identifiers of the LUs 25. Next, the management server 30 specifies the records, each including the LUN 3216 which is identical with the selected identifier of the LU 25, from the selected records for the comparison target paths. Then, the management server 30 sets the number of specified records as the number of comparison target paths passing through the LU 25.

In the same way, the management server 30 sequentially selects the identifiers of the CHAs 21. Next, the management server 30 specifies the records, each including the CHA name 3214 which is identical with the selected identifier of the CHA 21, from the selected records for the comparison target paths. Then, the management server 30 sets the number of specified records as the number of comparison target paths passing through the CHA 21.

In the same way, the management server 30 sequentially selects the identifiers of the HBAs 14 included in the host computer 10 to be compared. Next, the management server 30 specifies the records, each including the HBA name 3213 which is identical with the selected identifier of the HBA 14, from the selected records for the comparison target paths. Then, the management server 30 sets the number of specified records as the number of comparison target paths passing through the HBA 14.

Next, the management server 30 displays the calculated total number of comparison target paths and the number of comparison target paths passing through each of the components (S3114). By this display, the management server 30 displays the path number information 430 on the path information screen 400.

Next, the management server 30 judges whether or not there is any component for which the number of passing comparison source paths and that of passing comparison target paths differ from each other (S3115).

When there is no component for which the number of passing comparison source paths and that of passing comparison target paths differ from each other, the management server 30 does not need to display in an emphasized manner. Therefore, the management server 30 terminates the path number information display process without any further process.

On the other hand, when there is a component for which the number of passing comparison source paths and that of passing comparison target paths differ from each other, the management server 30 displays the number of comparison source paths and that of comparison target paths passing through the component in an emphasized manner (S3116). Then, the management server 30 terminates the path number information display process.

Figure 36:
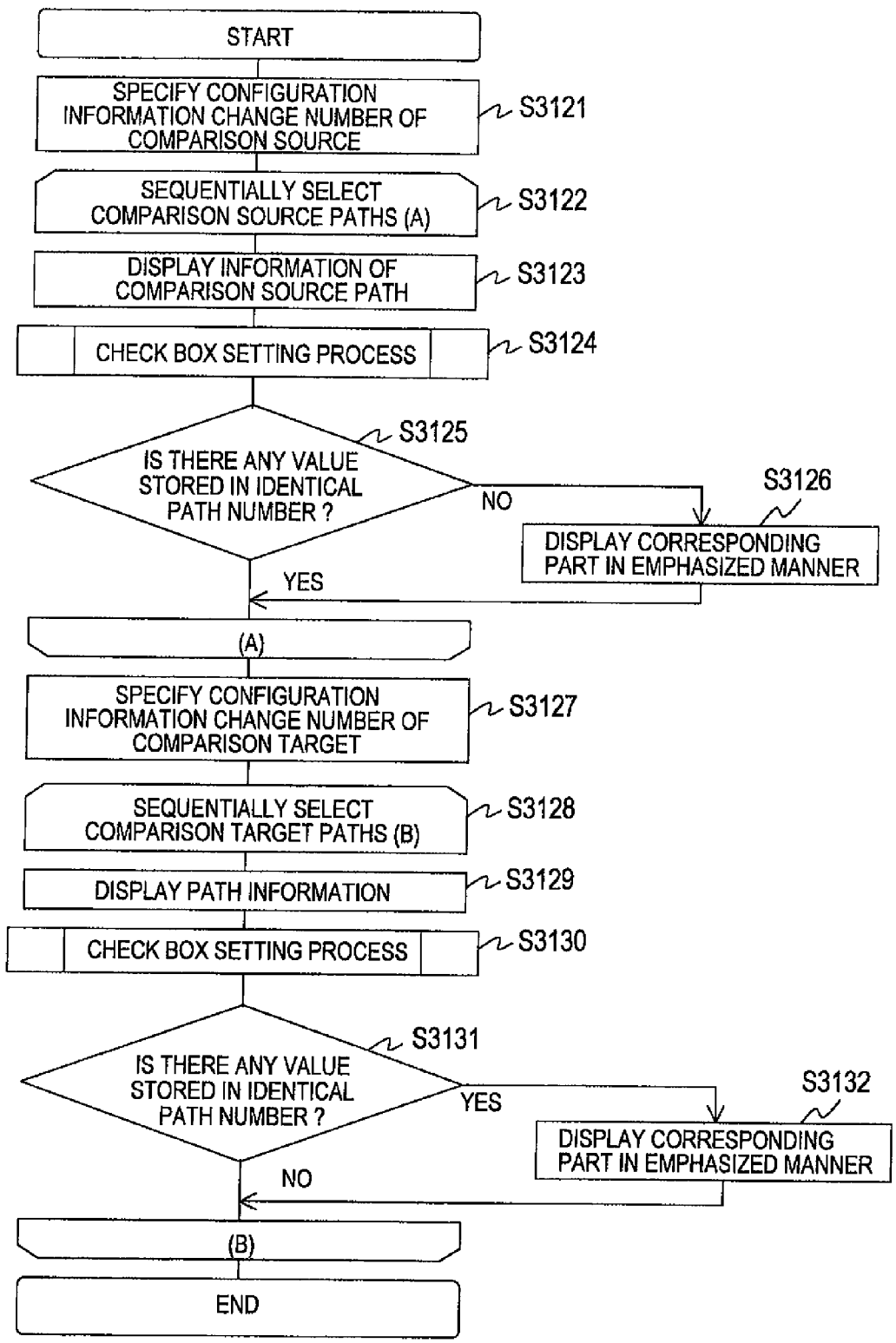
FIG. 36 is a flowchart of the path list information display process executed by the management server according to the second embodiment of this invention.

FIG. 36 is a flowchart of the path list information display process executed by the management server 30 according to the second embodiment of this invention.

The path list information display process is executed in Step S3102 of the display process shown in FIG. 33.

First, the management server 30 specifies the configuration information change number of the comparison source by the same process as that in Step S3091 of the comparison process shown in FIG. 32 (S3121). Further, the management server 30 specifies the host computer 10 to be compared.

Next, the management server 30 sequentially selects the paths (comparison source paths) which exist at the time corresponding to the specified configuration information change number of the comparison source and are connected to the specified host computer 10 to be compared (S3122).

Next, the management server 30 extracts the record for the selected comparison source path from the management server-side path connection information table 321. Then, the management server 30 displays information contained in the extracted record for the comparison source path (S3123).

To be specific, the management server 30 selects the records, each including the configuration information change number 3211 which is identical with the specified configuration information change number of the comparison source, from the management server-side path connection information table 321. Next, the management server 30 sequentially extracts the records (records for the comparison source paths), each including the host name 3219 which is identical with the identifier of the specified host computer 10 to be compared, from the selected records. Then, the management server 30 displays information contained in the extracted record for the comparison source path.

The management server 30 may display all the information contained in the extracted records for the comparison source paths or may display only a part thereof.

Moreover, the management server 30 may also display the status of the selected comparison source path.

To be specific, the management server 30 selects the records, each including the host name 3243 which is identical with the identifier of the specified host computer 10 to be compared, from the management server-side path management table 324. Next, the management server 30 selects the records, each including the path ID 3241 which is identical with the path ID 3212 of the record extracted from the management server-side path connection information table 321, from the selected records. Next, the management server 30 extracts the status 3242 from the selected record. Then, the management server 30 displays the extracted status 3242.

As a result, the management server 30 displays the path list information 420 on the path information screen 400.

Next, the management server 30 executes the check box setting process (S3124). The details of the check box setting process will be described with reference to FIG. 37.

Next, the management server 30 judges whether or not a value is stored in the identical path ID 3218 of the extracted record for the comparison source path (S3125).

When a value is stored in the identical path ID 3218, the same path as the selected comparison source path exists even at the time corresponding to the configuration information change number of the comparison target. Therefore, the management server 30 is not required to display the extracted record for the comparison source path in an emphasized manner. Therefore, the management server 30 terminates the process for the comparison source path selected in Step S3122.

On the other hand, when no value is stored in the identical path ID 3218, the same path as the selected comparison source path does not exist at the time corresponding to the configuration information change number of the comparison target. Therefore, the management server 30 displays the extracted record for the comparison source path in an emphasized manner (S3126). Then, the management server 30 terminates the process for the comparison source path selected in Step S3122.

Next, the management server 30 returns to Step S3122 to select a next comparison source path. Then, the management server 30 executes Steps S3123 to S3126 with respect to the selected comparison source path.

When all the comparison source paths are selected in Step S3122, the management server 30 proceeds to Step S3127.

Next, by the same process as that in Step S3092 of the comparison process shown in FIG. 32, the management server 30 specifies the configuration information change number of the comparison target (S3127). Further, the management server 30 also specifies the host computer 10 to be compared.

Next, the management server 30 sequentially selects paths (comparison target paths) which exist at the time corresponding to the specified configuration information change number of the comparison target and are connected to the specified host computer 10 to be compared (S3128).

Next, the management server 30 extracts the selected record for the comparison target path from the management server-side path connection information table 321. Then, the management server 30 displays information contained in the extracted records for the comparison target paths (S3129).

To be specific, the management server 30 sequentially extracts the records, each including the configuration information change number 3211 which is identical with the specified configuration information change number of the comparison target, from the management server-side path connection information table 321. Next, the management server 30 sequentially displays the records (records for comparison target paths), each including the host name 3219 which is identical with the specified host computer 10 to be compared, from the selected records. Then, the management server 30 displays information contained in the extracted record for the comparison target path.

The management server 30 may display all the information contained in the extracted record for the comparison target path or may display only a part thereof.

The management server 30 may also display the status of the selected comparison target path.

To be specific, the management server 30 selects the records, each including the host name 3243 which is identical with the identifier of the specified host computer 10 to be compared, from the management server-side path management table 324. Next, the management server 30 selects the record including the path ID 3241 which is identical with the path ID 3212 of the record extracted from the management server-side path connection information table 321, from the selected records. Next, the management server 30 extracts the status 3242 from the selected record. Then, the management server 30 displays the extracted status 3242.

As a result, the management server 30 displays the path list information 440 on the path information screen 400.

Next, the management server 30 performs the check box setting process (S3130). The details of the check box setting process will be described with reference to FIG. 37.

Next, the management server 30 judges whether or not a value is stored in the identical path ID 3218 of the extracted record for the comparison target path (S3131).

When a value is stored in the identical path ID 3218, the same path as the selected comparison target path exists even at the time corresponding to the configuration information change number of the comparison source. Therefore, the management server 30 is not required to display the extracted record for the comparison target path in an emphasized manner. Accordingly, the management server 30 terminates the process for the comparison target path selected in Step S3128.

On the other hand, when no value is stored in the identical path ID 3218, the same path as the selected comparison target path does not exist at the time corresponding to the configuration information change number of the comparison source. Therefore, the management server 30 displays the extracted record for the comparison target path in an emphasized manner (S3132). Then, the host computer 10 terminates the process for the comparison target path selected in Step S3128.

Subsequently, the management server 30 returns to Step S3128 to select a next comparison target path. Then, the management server 30 executes Steps S3129 to S3132 with respect to the selected comparison target path.

When all the comparison target paths are selected in Step S3128, the management server 30 terminates the path list information display process.

Figure 37:
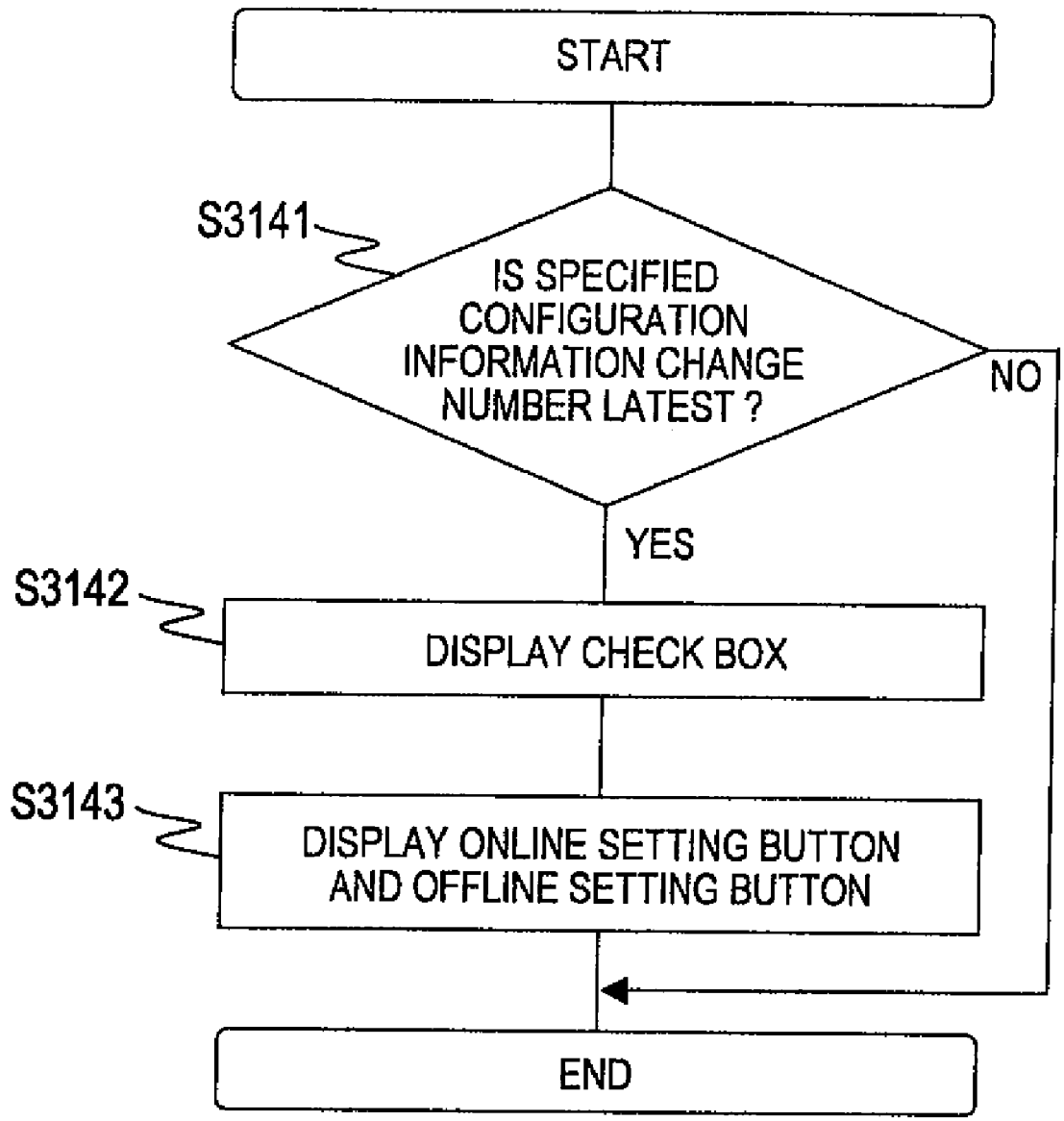
FIG. 37 is a flowchart of the check box setting process executed by the management server according to the second embodiment of this invention.

FIG. 37 is a flowchart of the check box setting process executed by the management server 30 according to the second embodiment of this invention.

The check box setting process is executed in Steps S3124 and S3130 of the path list information display process shown in FIG. 36.

First, the management server 30 judges whether or not the specified configuration information change number is the largest value (S3141).

When the check box setting process is executed in Step S3124 of the path list information display process shown in FIG. 36, the management server 30 judges whether or not the configuration information change number of the comparison source, which is specified in Step S3121 of the path list information display process, is the largest value.

On the other hand, when the check box setting process is executed in Step S3130 of the path list information display process shown in FIG. 36, the management server 30 judges whether or not the configuration information change number of the comparison target, which is specified in Step S3127 of the path list information display process, is the largest value.

When the specified configuration information change number is not the largest value, the time corresponding to the configuration information change number is not the latest. To be specific, the SAN configuration is changed after the time corresponding to the configuration information change number. Therefore, since the management server 30 is not required to display a check box and the like, the management server 30 terminates the check box setting process without any further process.

On the other hand, when the specified configuration information change number is the largest value, the time corresponding to the configuration information change number is the latest. To be specific, the SAN configuration is not changed after the time corresponding to the configuration information change number. Therefore, the management server 30 displays the check box 450 on the path information screen 400 as shown in FIG. 34 (S3142).

Further, the management server 30 displays the online setting button 460, the offline setting button 470, and the configuration change start button 480 on the path information screen 400 (S3143). Then, the management server 30 terminates the check box setting process.

Figure 38:
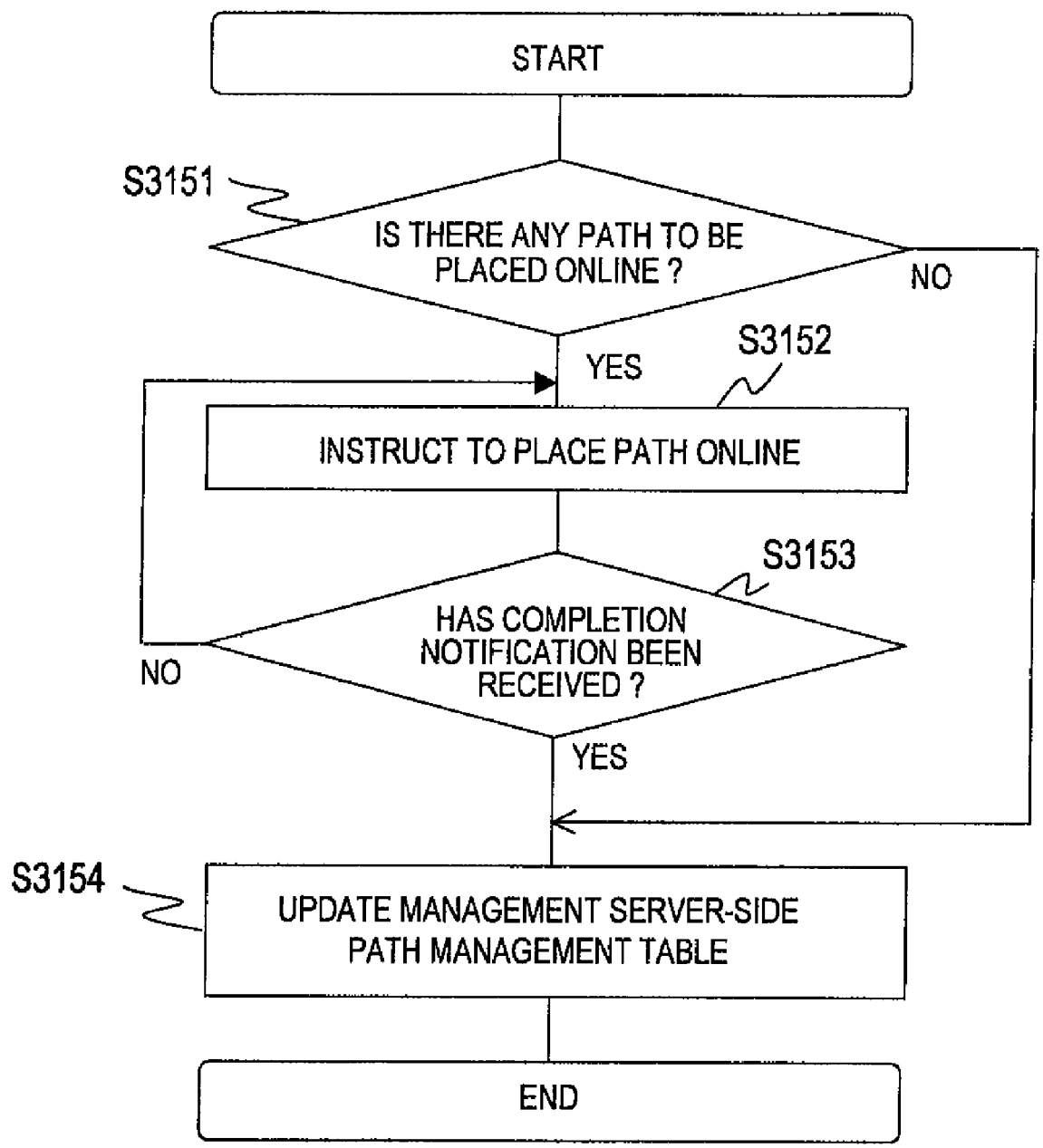
FIG. 38 is a flowchart of the activation process executed by the management server according to the second embodiment of this invention.

FIG. 38 is a flowchart of the activation process executed by the management server 30 according to the second embodiment of this invention.

The activation process is executed in Step S3059 of the path maintenance process shown in FIG. 29.

First, the management server 30 judges whether or not there is any path to be placed online (S3151).

The management server administrator selects the check box 450 corresponding to the path desired to be placed online from the check boxes 450 displayed on the path information screen 400. Then, the host administrator operates the online setting button 460 to request the management server 30 to place the path online.

Therefore, when the online setting button 460 is operated by the management server administrator, the management server 30 judges that there is a path to be placed online.

When there is no path to be placed online, the management server 30 terminates the activation process without any further process.

On the other hand, when there is a path to be placed online, the management server 30 instructs the host computer 10 to place the path online (S3152). To be specific, the management server 30 extracts the path ID from the record selected in the check box 450 on the path information screen 400. Then, the management server 30 instructs the host computer 10 to place the path identified by the extracted path ID online.

Upon reception of the instruction of placing the path online, the host computer 10 updates the host-side path management table. Then, the host computer 10 places the designated path online.

To be specific, the host computer 10 selects the records, each including the path ID 1241 which is identical with the identifier of the path instructed to be placed online, from the host-side path management table 124. Next, the host computer 10 stores "online" in the status 1242 of the selected record. As a result, the host computer 10 places the designated path online. After placing all the designated paths online, the host computer 10 transmits an online completion notification to the management server 30.

On the other hand, the management server 30 judges whether or not the online completion notification has been received from the host computer 10 which had instructed to place the path online (S3153). In the case where the online completion notification has not been received, the management server 30 waits for reception of the notification.

On the other hand, upon reception of the online completion notification, the management server 30 updates the management server-side path management table 324 (S3154).

To be specific, the management server 30 selects the records, each including the host name 3243 which is identical with the identifier of the host computer 10 which has instructed to place the path online, from the management server-side path management table 324. Next, the management server 30 selects the record including the path ID 3241 which is identical with the extracted path ID, from the selected records. Next, the management server 30 stores "online" in the status 3242 of the selected record. Then, the management server 30 terminates the activation process.

According to the second embodiment, the management server 30 specifies and outputs a difference between the paths existing at the first time point and those existing at the second time point. To be specific, the management server 30 displays the path information screen 400. The management server administrator refers to the path information screen 400 displayed on the management server 30 to easily judge whether or not the SAN configuration has been correctly changed.

While the present invention has been described in detail and pictorially in the accompanying drawings, the present invention is not limited to such detail but covers various obvious modifications and equivalent arrangements, which fall within the purview of the appended claims.

What is claimed is:

1. A computer system, comprising:
at least one host computer including a processor, a memory, a display and an interface; and
at least one storage system coupled to the host computer,
wherein the storage system comprises a physical disk which stores data requested to be written by the host computer and a disk controller which controls the physical disk, and provides the host computer with a storage area of the physical disk as at least one logical unit,
wherein the processor obtains, at a first time point and a second time point different from the first time point, a relation between a logical path serving as an access route from the host computer to the logical unit and at least one component through which the logical path passes,
wherein the processor stores the relations obtained at the first time point and the second time point,
wherein the processor displays on the display logical path connection information including a Path ID, an identifier of said logical unit, said at least one component through which the logical path passes and an Identical Path ID for each said logical path from the relations obtained at the first time point and the second time point to compare the logical paths existing at the first time point and the logical paths existing at the second time point with each other, and
wherein the processor specifies on the display the logical paths existing at the second time point that differ from the logical paths existing at the first time point.

\* \* \* \* \*